US012475151B1

(12) United States Patent
Madisetti et al.

(10) Patent No.: US 12,475,151 B1
(45) Date of Patent: Nov. 18, 2025

(54) FAULT TOLERANT MULTI-AGENT GENERATIVE AI APPLICATIONS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 18/921,852

(22) Filed: Oct. 21, 2024

Related U.S. Application Data

(63) Continuation-in-part of application No. 18/812,707, filed on Aug. 22, 2024, which is a continuation-in-part of application No. 18/470,487, filed on Sep. 20, 2023, now Pat. No. 12,147,461, which is a continuation of application No. 18/348,692, filed on Jul. 7, 2023, now Pat. No. 12,001,462.

(60) Provisional application No. 63/693,351, filed on Sep. 11, 2024, provisional application No. 63/647,092, filed on May 14, 2024, provisional application No. 63/607,647, filed on Dec. 8, 2023, provisional application No. 63/607,112, filed on Dec. 7, 2023, provisional application No. 63/535,118, filed on Aug. 29, 2023, provisional application No. 63/534,974, filed on Aug. 28, 2023, provisional application No.
(Continued)

(51) Int. Cl.
*G06F 16/3329* (2025.01)
*G06F 40/284* (2020.01)
(52) U.S. Cl.
CPC ........ *G06F 16/3329* (2019.01); *G06F 40/284* (2020.01)

(58) Field of Classification Search
None
See application file for complete search history.

(56) References Cited

U.S. PATENT DOCUMENTS 5,410,475 A    4/1995  Lu et al.
8,346,791 B1   1/2013  Shukla et al.
(Continued)

OTHER PUBLICATIONS

A. Lavinia, C. Dobre, F. Pop and V. Cristea, "A Failure Detection System for Large Scale Distributed Systems," 2010 International Conference on Complex, Intelligent and Software Intensive Systems, Krakow, Poland, 2010, pp. 482-489, doi: 10.1109/CISIS.2010.29. (Year: 2010).*

(Continued)

*Primary Examiner* — Laura Yesildag
(74) *Attorney, Agent, or Firm* — Daniel C. Pierron; Widerman Malek, PL

(57) ABSTRACT

A method for agent failure detection including listening for an agent heartbeat signal from an agent, updating a most recent heartbeat timestamp for the agent upon receiving the agent heartbeat signal from the agent or, upon not receiving the agent heartbeat signal, probing the agent for a response. Upon receiving the response from the agent, the suspect agent designation is removed from the agent and the most recent heartbeat timestamp is updated. Upon not receiving the response, the method further includes designating the agent as a failed agent, sending a message to a service mesh and/or a message pool regarding the agent being designated a failed agent, activating a shadow agent associated with the agent, and resuming operation with the shadow agent replacing the agent.

14 Claims, 67 Drawing Sheets

Related U.S. Application Data

63/529,177, filed on Jul. 27, 2023, provisional application No. 63/469,571, filed on May 30, 2023, provisional application No. 63/463,913, filed on May 4, 2023.

(56) References Cited

U.S. PATENT DOCUMENTS

| | | |
|---|---|---|
| 8,775,436 B1 | 7/2014 | Zhou et al. |
| 11,194,868 B1 | 12/2021 | Paka et al. |
| 11,765,207 B1 | 9/2023 | McCarthy |
| 11,928,569 B1 | 3/2024 | Douthit |
| 11,995,411 B1 | 5/2024 | Qadrud-Din et al. |
| 12,020,140 B1 | 6/2024 | Mondlock |
| 12,039,263 B1 | 7/2024 | Mondlock et al. |
| 12,242,503 B1 | 3/2025 | Kelsey et al. |
| 2007/0244937 A1* | 10/2007 | Flynn, Jr. ............ G06F 11/2048 714/E11.073 |
| 2008/0015808 A1 | 1/2008 | Wilson et al. |
| 2008/0077569 A1 | 3/2008 | Lee et al. |
| 2008/0140616 A1 | 6/2008 | Encina et al. |
| 2009/0182741 A1 | 7/2009 | Chen et al. |
| 2009/0254512 A1 | 10/2009 | Broder et al. |
| 2009/0271700 A1 | 10/2009 | Chen |
| 2010/0138531 A1* | 6/2010 | Kashyap ............ H04L 67/1008 709/227 |
| 2011/0179075 A1 | 7/2011 | Kikuchi |
| 2012/0023073 A1 | 1/2012 | Dean et al. |
| 2012/0290521 A1 | 11/2012 | Frank et al. |
| 2014/0297845 A1* | 10/2014 | Tamura ............... H04L 43/0817 709/224 |
| 2016/0226710 A1 | 8/2016 | Cha et al. |
| 2018/0095845 A1* | 4/2018 | Sanakkayala ....... G06F 9/45558 |
| 2018/0314703 A1 | 11/2018 | Bull et al. |
| 2019/0081959 A1* | 3/2019 | Yadav .................... H04L 63/02 |
| 2019/0130006 A1 | 5/2019 | Raviv et al. |
| 2019/0130902 A1 | 5/2019 | Itoh et al. |
| 2019/0354630 A1 | 11/2019 | Guo et al. |
| 2021/0240818 A1 | 8/2021 | Seksenov et al. |
| 2021/0303558 A1 | 9/2021 | Setlur et al. |
| 2021/0406735 A1 | 12/2021 | Nahamoo et al. |
| 2022/0124013 A1* | 4/2022 | Chitalia ............. G06F 11/3452 |
| 2022/0156262 A1 | 5/2022 | Chen et al. |
| 2024/0289560 A1 | 8/2024 | Kelly et al. |
| 2024/0354130 A1 | 10/2024 | Cadoni et al. |
| 2024/0354490 A1 | 10/2024 | Chauvin et al. |
| 2024/0386038 A1 | 11/2024 | Amershi et al. |
| 2024/0403567 A1 | 12/2024 | Dressler, II |
| 2024/0403634 A1 | 12/2024 | Hawes et al. |
| 2024/0404687 A1 | 12/2024 | Bell et al. |
| 2024/0412029 A1 | 12/2024 | Yang et al. |
| 2024/0412040 A1 | 12/2024 | Radmilac et al. |
| 2025/0005523 A1 | 1/2025 | Katta et al. |
| 2025/0036866 A1 | 1/2025 | Tunstall-Pedoe et al. |
| 2025/0036878 A1 | 1/2025 | Marwah et al. |
| 2025/0045256 A1 | 2/2025 | Gottlob et al. |
| 2025/0068665 A1 | 2/2025 | Chandel et al. |

OTHER PUBLICATIONS

M. N. Yanhaona, M. A. T. Prodhan and A. S. Grimshaw, "An agent-based distributed monitoring framework (Extended abstract)," 2015 International Conference on Networking Systems and Security (NSysS), Dhaka, Bangladesh, 2015, pp. 1-10, doi: 10.1109/NSysS.2015.7043515. (Year: 2015).*

K. M. Sim, "Agent-Based Approaches for Intelligent Intercloud Resource Allocation," in IEEE Transactions on Cloud Computing, vol. 7, No. 2, pp. 442-455, Apr. 1-Jun. 2019, doi: 10.1109/TCC.2016.2628375. (Year: 2019).*

G. Koppensteiner, M. Merdan, W. Lepuschitz and I. Hegny, "Hybrid based approach for fault tolrance in a multi-agent system," 2009 IEEE/ASME International Conference on Advanced Intelligent Mechatronics, Singapore, 2009, pp. 679-684, doi: 10.1109/AIM.2009.5229934. (Year: 2009).*

Non Final Office Action received in related U.S. Appl. No. 19/056,496 issued Apr. 17, 2025; 11 pages.

Non Final Office Action received in related U.S. Appl. No. 18/812,707 issued on Feb. 19, 2025; 14 pages.

Non Final Office Action received in related U.S. Appl. No. 19/040,471 issued on Apr. 9, 2025; 11 pages.

Non Final Office Action received in related U.S. Appl. No. 19/051,820 issued Apr. 14, 2025; 16 pages.

Notice of Allowance received in related U.S. Appl. No. 19/051,820 issued May 7, 2025; 23 pages.

Notice of Allowance received in related U.S. Appl. No. 18/812,707 issued on May 20, 2025; 26 pages.

G.A.S. Torrellas and L.B. Sheremetov, "An authentication protocol for agent platform security manager," EFTA 2003. 2003 IEEE Conference on Emerging Technologies and Factory Automation. Proceedings (Cat. No. 03TH8696), Lisbon, Portugal, 2003, pp. 623-628 vol. 1, doi: 10.1109/ETFA.2003.1247764. (Year: 2003).

Notice of Allowance received in related U.S. Appl. No. 19/249,448 issued on Sep. 11, 2025; 25 pages.

* cited by examiner

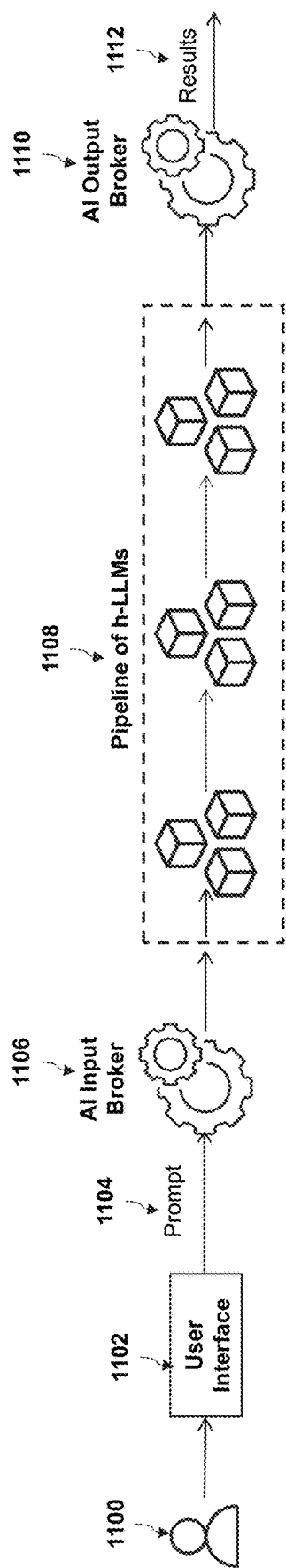
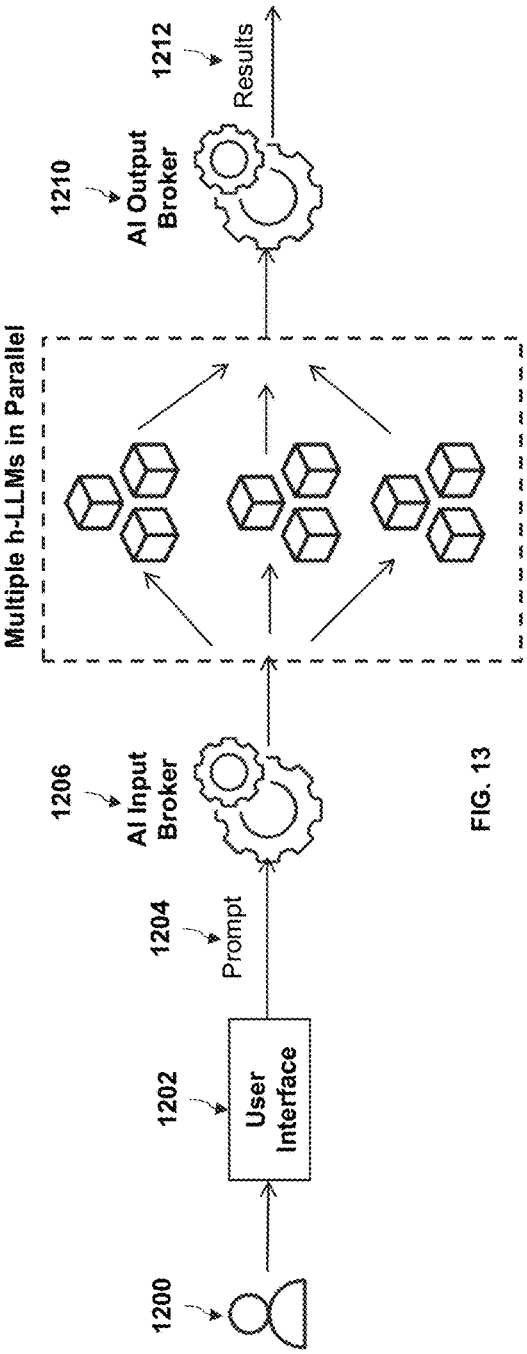
FIG. 12
FIG. 13

FAULT TOLERANT MULTI-AGENT GENERATIVE AI APPLICATIONS

RELATED APPLICATIONS

This application claims priority under 35 U.S.C. § 119 (e) of U.S. Provisional Patent Application Ser. No. 63/693,351 filed on Sep. 11, 2024 and titled Fault Tolerant MultiAgent Generative AI Applications. This application also is a continuation-in-part application of and claims priority under 35 U.S.C. § 120 of U.S. patent application Ser. No. 18/812,707 filed on Aug. 22, 2024 and titled Method and Systems for Optimizing User of Retrieval Augmented Generation Pipelines in Generative Artificial Intelligence Applications, which in turn is a continuation-in-part application of and claims priority under 35 U.S.C. § 120 of U.S. patent application Ser. No. 18/470,487 filed on Sep. 20, 2023 and titled Method and System for Multi-Level Artificial Intelligence Supercomputer Design, which in turn is a continuation application of and claims priority under 35 U.S.C. § 120 of U.S. patent application Ser. No. 18/348,692, now U.S. Pat. No. 12,001,462, issued Jun. 4, 2024 filed on Jul. 7, 2023 and titled Method and System for Multi-Level Artificial Intelligence Supercomputer Design, which in turn claims priority under 35 U.S.C. § 119 (e) of U.S. Provisional Patent Application Ser. No. 63/463,913 filed on May 4, 2023 and titled New Tools for Document Analysis in CatchUp and U.S. Provisional Patent Application Ser. No. 63/469,571 filed on May 30, 2023 and titled Multilevel AI PSupercomputer Design. The '707 application also claims priority under 35 U.S.C. § 119 (e) of U.S. Provisional Patent Application Ser. No. 63/535,118 filed on Aug. 30, 2023 and titled Networked LLMs and Focused LLMs, U.S. Provisional Patent Application Ser. No. 63/529,177 filed on Jul. 27, 2023 and titled Using LLMs to Create Projects and Tasks in an Optimized Way, U.S. Provisional Patent Application Ser. No. 63/534,974 filed on Aug. 28, 2023 and titled Using Prompts to Generate Search Queries for Context Generation in LLMs, U.S. Provisional Patent Application Ser. No. 63/647,092 filed on May 14, 2024 and titled Using LLMs to Influence Users and Organizations, U.S. Provisional Patent Application Ser. No. 63/607,112 filed on Dec. 7, 2023 and titled Long Document Attention Span Enhancement for LLMs, and U.S. Provisional Patent Application Ser. No. 63/607,647 filed on Dec. 8, 2023 and titled High-Level UI for Prompt Generation for LLMs. The contents of these applications are incorporated herein by reference.

FIELD OF THE INVENTION

The present invention primarily relates to artificial intelligence and large language models (LLMs) for generative AI applications.

BACKGROUND

Large Language Models (LLMs) are generative Artificial Intelligence (AI) models which are trained on limited amounts of data and can perform language processing tasks (with multimodal inputs—text, and more recently, image inputs as in Microsoft's Kosmos-1) and generate human-like text (and associated multimedia material, like images, video and advertisements). LLMs have many parameters (from millions to billions). LLMs can capture complex patterns in language and produce text that closely resembles human language.

The high-level goal of an LLM is to predict the text (and other multimedia material) that is likely to come next in a sequence. The applicants recognize that LLMs are a type of generative AI that is in usually different from traditional machine learning and AI applications. LLM also stands for Learning with Limited Memory and implies that LLM's are closely tied to their training data and make decisions based on the limited amount of data. Both generative AI and LLM generate content, but LLM does it in a manner that improves computational and memory efficiency.

Traditional machine learning type algorithms focus on analysis, such as statistical regression or clustering, and are usually again different from Generative AI and LLMs, which focus on generating content. LLMs have immediate practical implication in generation of new content that matches associated or preceding/future content in an optimized manner, such as legal briefs or computer code, based on training with a limited amount of data, such as existing briefs or code, both from private and public sources. In this invention, we focus on LLM models as the primary focus of these improvements, though we do not disclaim other AI models, unless expressly done as part of the claims . . .

LLMs are created with complex architectures such as transformers, encoders and decoders. LLMs, typically, use a technique of natural language processing called Tokenization that involves splitting the input text (and images) and output texts into smaller units called tokens. Tokens can be words, characters, sub-words, or symbols, depending on the type and the size of the model. Tokenization helps to reduce the complexity of text data, making it easier for LLMs to process and understand data thus reducing the computational and memory costs. Another important component of an LLM is Embedding, which is a vector representation of the tokens. The Encoder, within the Transformer architecture, processes the input text and converts it into a sequence of vectors, called embeddings, that represent the meaning and context of each word. The Decoder, within the Transformer architecture, generates the output text by predicting the next word in the sequence, based on the embeddings and the previous words. LLMs use Attention mechanisms that allow the models to focus selectively on the most relevant parts of the input and output texts, depending on the context of the task at hand, thus capturing the long-range dependencies and relationships between words.

LLMs are designed to learn the complexity of the language by being pre-trained on vast amounts of text (and multimedia) data from sources such as Wikipedia, books, articles on the web, social media data and other sources. The training procedure can be decomposed into two stages:

1. Pre-training on a large amount of unlabeled plain text; and
2. Supervised fine-tuning Through training on limited amounts of data, the models are able to learn the statistical relationships between words, phrases, and sentences and other multimedia content. The trained models can then be used for generative AI applications such as Question Answering, Instruction Following, Inferencing, for instance, where an input is given to the model in the form of a prompt and the model is able to generate coherent and contextually relevant responses based on the query in the prompt.

Popular LLM models include GPT (Generative Pre-trained Transformer), BERT (Bidirectional Encoder Representations from Transformers), BART (Bidirectional and Auto-Regressive Transformers) and PaLM (Pathways Language Model). See, for example, public domain websites, such as openai.com or bard.google.com for more information as to how a person of ordinary skill in the art may use these models. Public domain and company-specific LLMs, such as GPT4All, MiniGPT4, RMKV, BERT, MPT-7B, Kosmos-1 (which accepts image and multimodal inputs), YaLM, are also available for wide use, as for example, described in medium.datadriveninvestor.com/list-of-open-source-large-language-models-llms-4eac551bda2e.

Current AI generative models and LLMs require supercomputing efforts to compute results and an efficient way to improve response times, accuracies, and reduce computational load is required to improve both cost and scalability and expandability of existing AI models and their use.

LLMs have ushered in a new era of AI-based applications, where specialized LLMs act as agents with provided relevant contexts (referred to as "Agents") that perform (and can also generate) specialized tasks, referred to as "derived tasks," and interact with users and environments in unprecedented ways as shown by the inventive systems and methods and LLM Generative AI/stacks that we introduce and describe in this specification. However, as these systems grow in complexity and are deployed in critical applications, the need for robust fault tolerance mechanisms increases. Traditional fault tolerance approaches often fall short when applied to the dynamic and complex nature of LLM-based agent systems. These systems face unique challenges such as maintaining consistency across distributed agents, handling the stochastic nature of LLM outputs, and ensuring seamless operation in the face of both soft failures (performance degradation) and hard failures (complete agent malfunction). The lack of comprehensive fault tolerance frameworks specifically designed for LLM-based agent systems poses a significant risk to their reliability, scalability, and adoptability in mission-critical scenarios.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for multi-level generative AI and large language models (LLM) for generative AI applications, that utilize the following techniques:

Derived Requests: An initial level of generative AI software program, or AI broker, evaluates the incoming client request (maybe a conversational query or through an API, such as OpenAI API) and identifies its specific AI "characteristics" that may make it suitable for one or other or both or multiple AI language models and checks its "derived requests" categories to see if the query suits one of the "derived requests" categories and/or it can or should create a new request.

Multiple h-LLMs: If the new request does is not assigned to one or more of the "derived requests) categories, it evaluates the request and selects one or more AI h-LLM model categories for its evaluation. An h-LLM is a family of models, such as GPT-4, that (in addition) have been trained according to a particular training set T1. A family of generative models, LLM1, trained with a data set T1, can be represented as h-LLM1, while a family of models, LLM2, trained with data set T2, can be represented as h-LLM12. Further, a family of models, LLM1, trained with a data set T3, can be represented as h-LLM35. The combination of models and their training sets (T1 could be a subset of T3, for example, or they can be different) may be used in our proposed invention and they are referred to as h-LLMs, throughout. A family of LLMs that operate at a lower arithmetic precision, on computer CPUs or graphical processing units (GPUs, such as Nvidia's H100), may also be called by a different identifier, e.g., h-LLM14, when trained with its corresponding data set.

Choosing h-LLMs with varying levels of accuracy: It further checks the workload of the AI h-LLM models in the one or more categories and its level of training and its accuracy—called its workload scores or its technical accuracy scores, or its business value metrics or a combination of these scores, and then assigns the request (or its derived form) to one or more of the AI h-LLM models within the selected AI h-LLM model categories.

Assigning weights to results: It then receives the results from the AI models in the AI h-LLM models categories and weights them to compute a result that could be returned to the requester program, or it could resend the request back to the AI h-LLM models/categories hierarchy till it reaches a certain level of service level assurance.

Use of Local Database: It also updates a local database with the results of the request's path through its hierarchy and create an index of "derived requests" that may be used in future to select which set of "derived requests" an incoming request may fall into for further processing.

Distributed Architecture: The tasks may be implemented as containers within Kubernetes environment and a service mesh, that we call an agent mesh, similar in some aspects and different in others to service meshes like Istio, may be used to instrument and parameterize the metrics and log collections, but not limited to these cloud models for implementation.

Embodiments of the present invention are directed to a system and associated methods for Fault-Tolerant Generative Agents Frameworks. The invention provides robust mechanisms for ensuring continuous operation and reliability in multi-agent systems powered by LLMs.

In one embodiment, Shadow Generative Agents for Fault Tolerance are described. This embodiment introduces a system where each primary agent is mirrored by a shadow agent. The shadow agent maintains an up-to-date representation of the primary agent's state through periodic checkpointing. In the event of a primary agent failure, the corresponding shadow agent can seamlessly take over, ensuring uninterrupted system operation.

In another embodiment, Checkpointing, State Saving, and Message Pool Management techniques are presented. This embodiment outlines a system where agents regularly save their state to a central checkpoint storage. It also describes a shared message pool with replication, integrity checking, and priority queuing features, ensuring reliable inter-agent communication and facilitating quick recovery in case of failures.

In another embodiment, a Failure Detection Algorithm is detailed. This algorithm describes a systematic approach to monitoring agent health through heartbeats, detecting potential failures, and initiating recovery processes. It includes steps for marking suspects, probing potentially failed agents, and triggering recovery mechanisms when failures are confirmed.

In another embodiment, Flexible Agent Replacement mechanisms are described. This embodiment presents a system capable of replacing failed agents with either similar agents/agents with a relatively lesser degree of similarity to the agent or exact replicas/agents with a relatively greater degree of similarity to the agent, depending on the specific requirements of the application.

In another embodiment, soft failure handling techniques are presented. This embodiment describes a system for managing performance degradation and overload scenarios without complete agent failure. It includes mechanisms for load redistribution, dynamic resource allocation, and agent scaling to address performance issues proactively.

In another embodiment, hard failure handling procedures are detailed. This embodiment presents a comprehensive approach to recovering from severe failures such as process termination or complete loss of communication. It includes steps for failure detection, agent isolation, state recovery, agent relaunching, and system reintegration.

These embodiments, individually and in combination, provide a robust and flexible framework for ensuring fault tolerance in generative agent systems. The invention addresses various failure scenarios, from performance degradation to complete agent failures, thereby significantly enhancing the reliability and resilience of multi-agent systems powered by LLMs.

BRIEF DESCRIPTION OF THE DRAWINGS

FIG. 12 is an illustration of the combining h-LLMs in series, according to an embodiment of the present invention.

FIG. 13 is an illustration of combining h-LLMs in parallel, according to an embodiment of the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
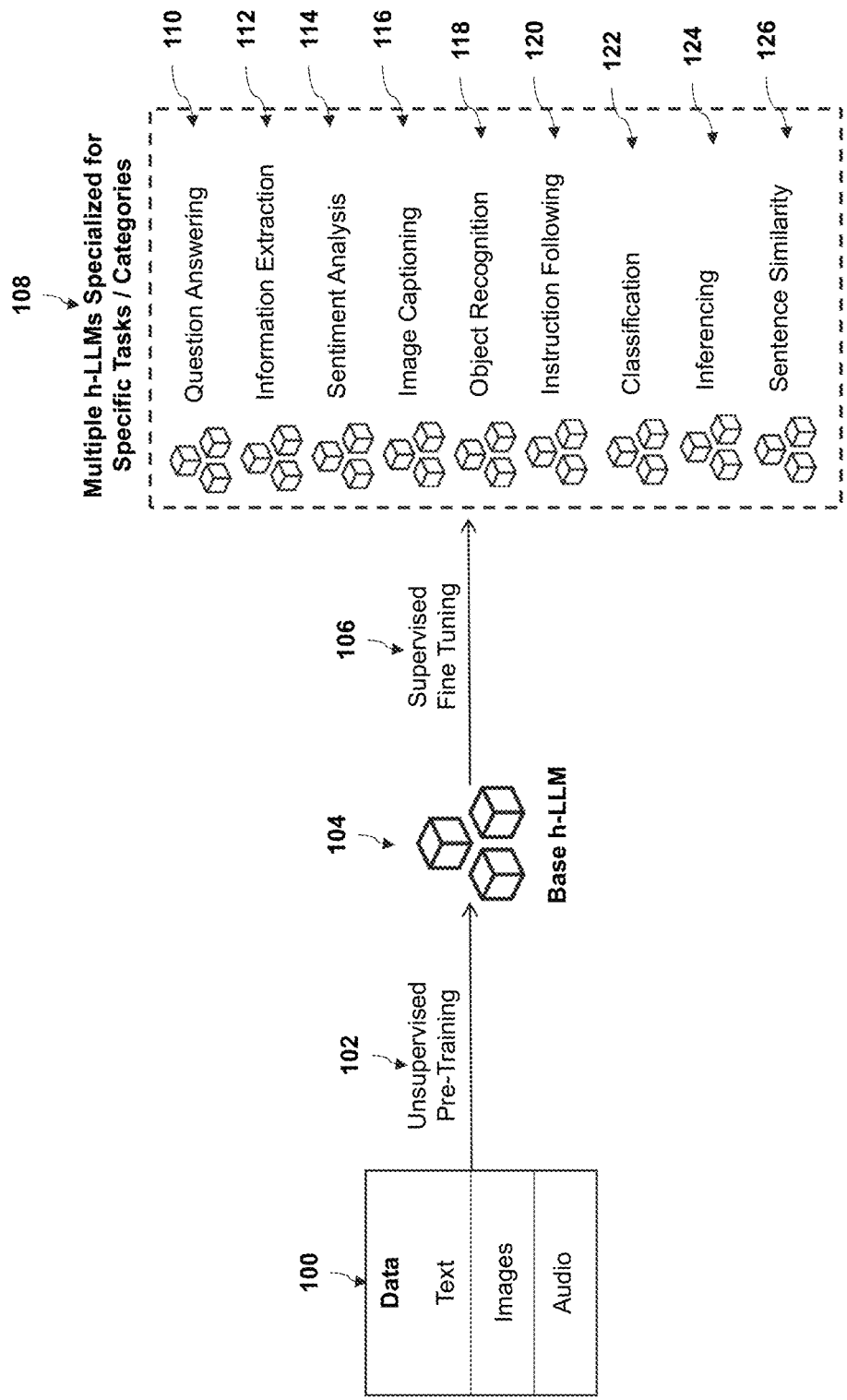
FIG. 1 is an illustration of the training process for creating multiple specialized large language models for specific tasks/categories, according to an embodiment of the present invention.

Referring now to FIG. 1 is an illustration of the training process for creating multiple specialized large language models for specific tasks/categories, is described in more detail. Data 100 (such as text, images, and audio) is used to pre-train a model in a process called unsupervised pre-training 102 which generates a base h-LLM model 104. The pre-training process is referred to as unsupervised as unlabeled data is used at this step. The base h-LLM model 104 is then fine-tuned in a process called supervised fine-tuning 106. The fine-tuning process uses smaller labeled data sets. The base h-LLM model 104 is fine-tuned to generate multiple h-LLM models which are specialized to perform specific tasks such as Question Answering, Information Extraction, Sentiment Analysis, Image Captioning, Object Recognition, Instruction Following, Classification, Inferencing, and Sentence Similarity, for instance.

Figure 2:
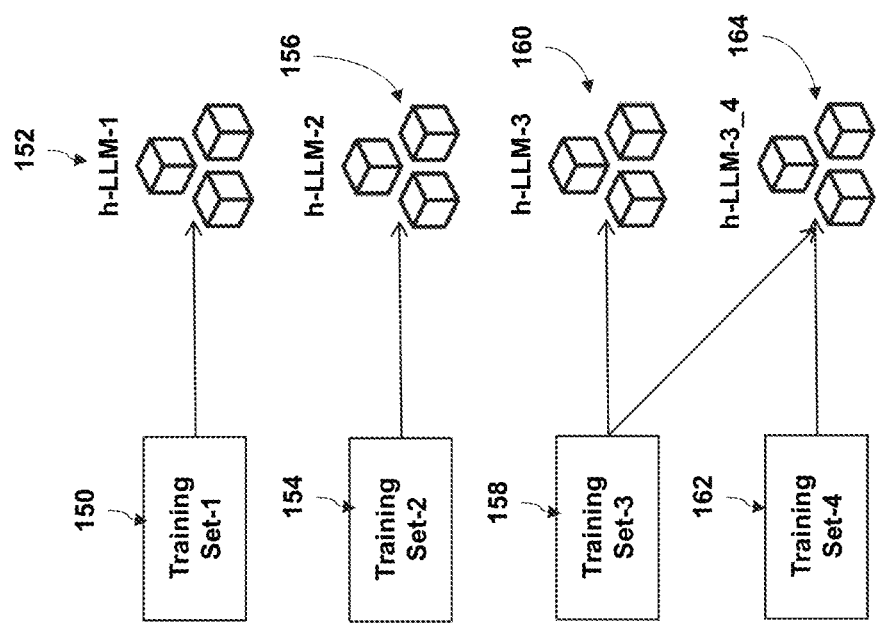
FIG. 2 is an illustration of h-LLMs trained with different training sets, according to an embodiment of the invention.

Referring now to FIG. 2 is an illustration of h-LLMs trained with different training sets, is described in more detail. As used in this specification h-LLM usually refers to a family of LLMs, such as those used in Google's Bard or OpenAI's GPT-4, that have been trained on a particular training set T. Therefore, the same family of LLMs (e.g., GPT) if trained on a different training set, T1, as opposed to GPT trained on training set T2 could be differentiated as a separate h-LLM). The training sets can be private within an organization or public datasets.

For example, as shown in FIG. 2, h-LLM-1 152 is trained with training set-1 150, h-LLM-2 156 is trained with training set-2 154, h-LLM-3 160 is trained with training set-3 158, and h-LLM-3_4 164 is trained with training set-3 158 and training set-4 162.

An h-LLM can be described as a combination of LLM families and the training dataset used as follows:

h-LLM=LLM family (X) trained with Training Set (Y)

Figure 3:
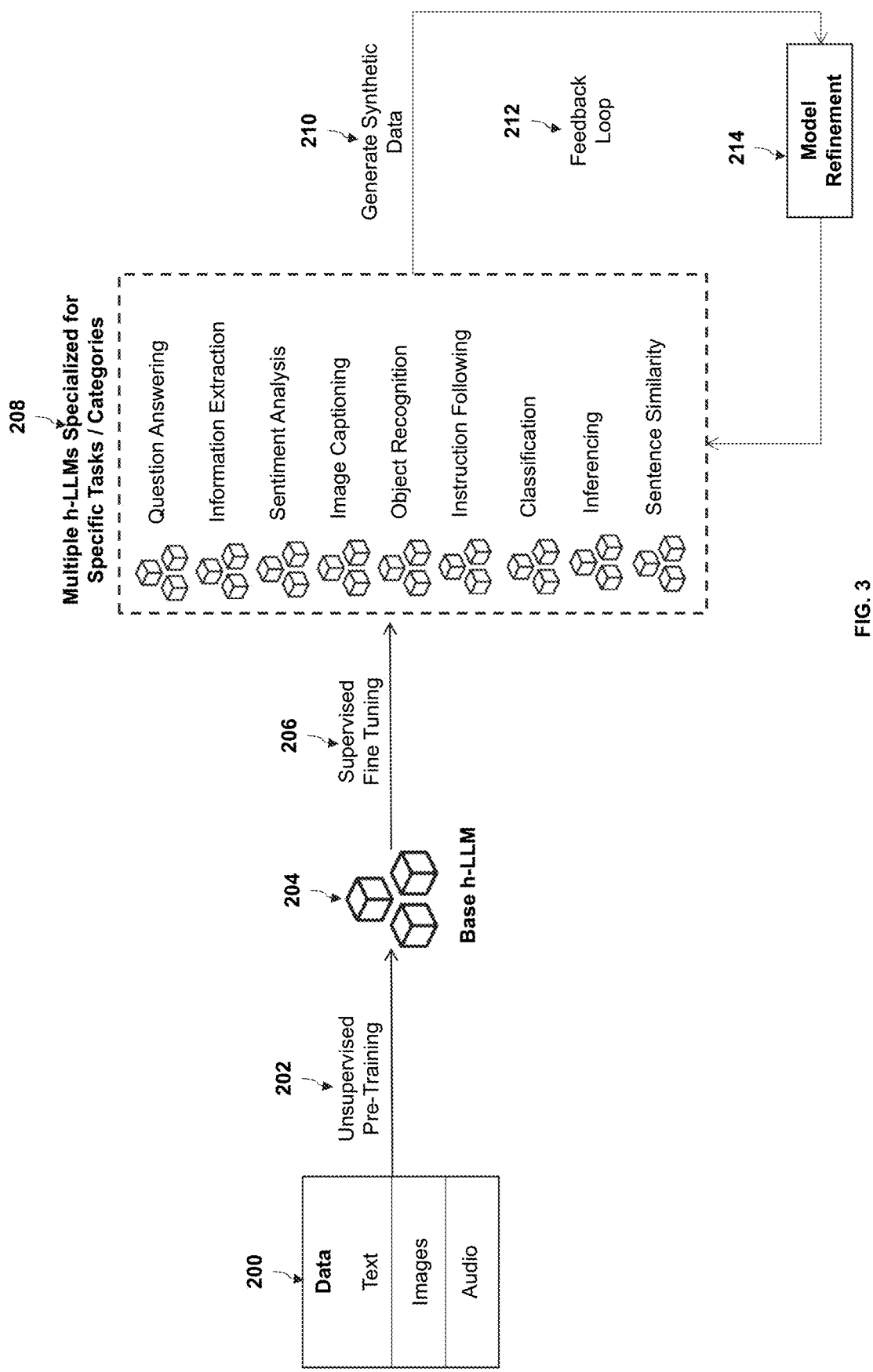
FIG. 3 is an illustration of the process for generating synthetic data from multiple h-LLMs and using it for model refinement, according to an embodiment of the invention.

For example,
h-LLM_1=PaLM-2 may be trained with training set T12
h-LLM_2-PaLM-2 may be trained with training set T12+T45
h-LLM_3=GPT-4 may be trained with Training Set T65
h-LLM_4=GPT-4 may be trained with ANY data set Referring now to FIG. 3, an illustration of the process for generating synthetic data from multiple h-LLMs and using it for model refinement, is described in more detail. Data 200 is used to train a base h-LLM model 204 using unsupervised pre-training 202 which is then fine-tuned in a supervised fine-tuning process 206 to generate multiple h-LLMs 208 specialized for specific tasks or categories. Each of these h-LLMs 208 are used to generate synthetic data 210 which is then fed back to the models in feedback loop 212 through a process called model refinement 214.

Figure 4:
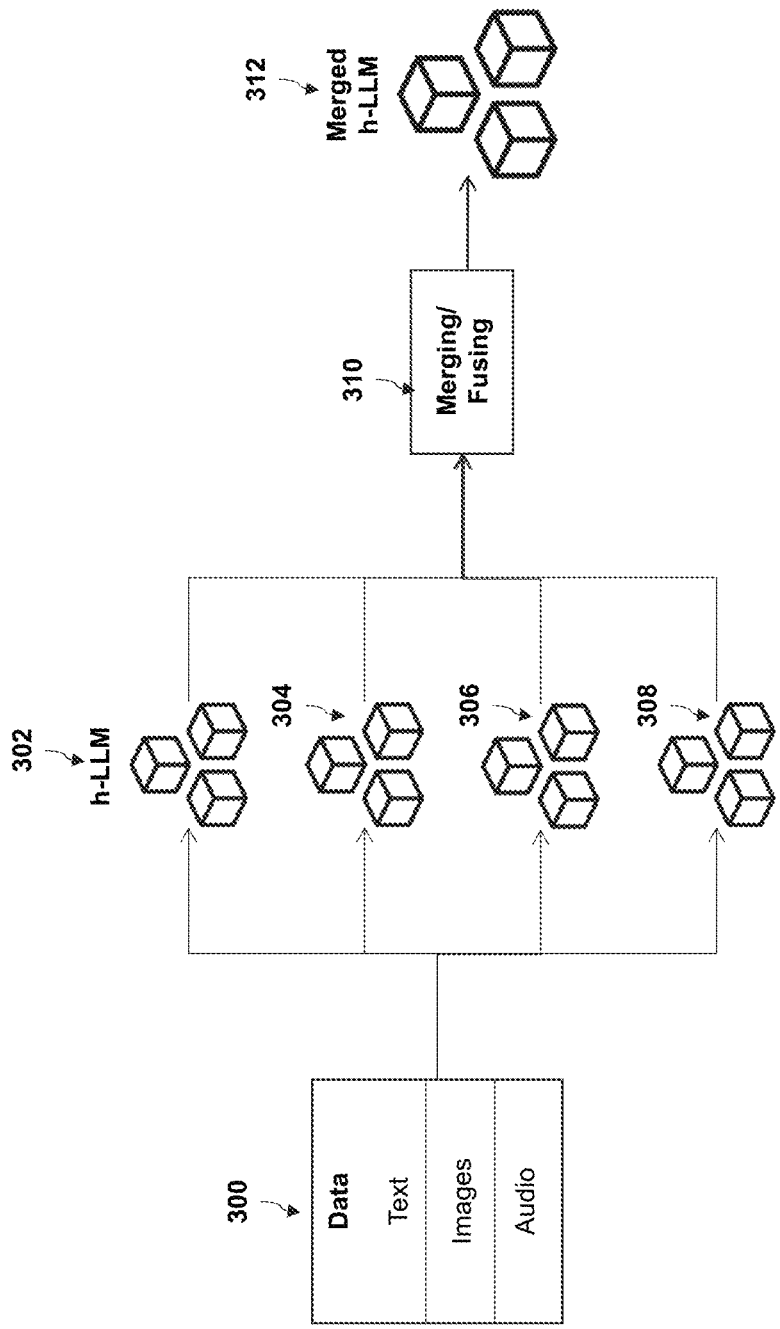
FIG. 4 is an illustration of a "bagging" approach where multiple h-LLMs with lower precision and accuracy are merged/fused to create a merged h-LLM with higher precision and accuracy, according to an embodiment of the invention.

Referring now to FIG. 4 is an illustration of a bagging approach, that has some similarity to what was originally used in the context of machine learning models in a different way (for analytics as opposed to generative AI applications, such as LLMs) that are described in this invention, where multiple h-LLMs with lower precision and accuracy are merged/fused to create a merged h-LLM with higher precision and accuracy, is described in more detail. Bagging is a machine learning technique which improves the stability and accuracy of machine learning models. Using the input data 300, multiple subsets of the data are created which are used to train multiple h-LLMs (302, 304, 306, 308) in parallel. These models are then combined in a process called merging or fusing 310 to create a merged h-LLM 312.

Figure 5:
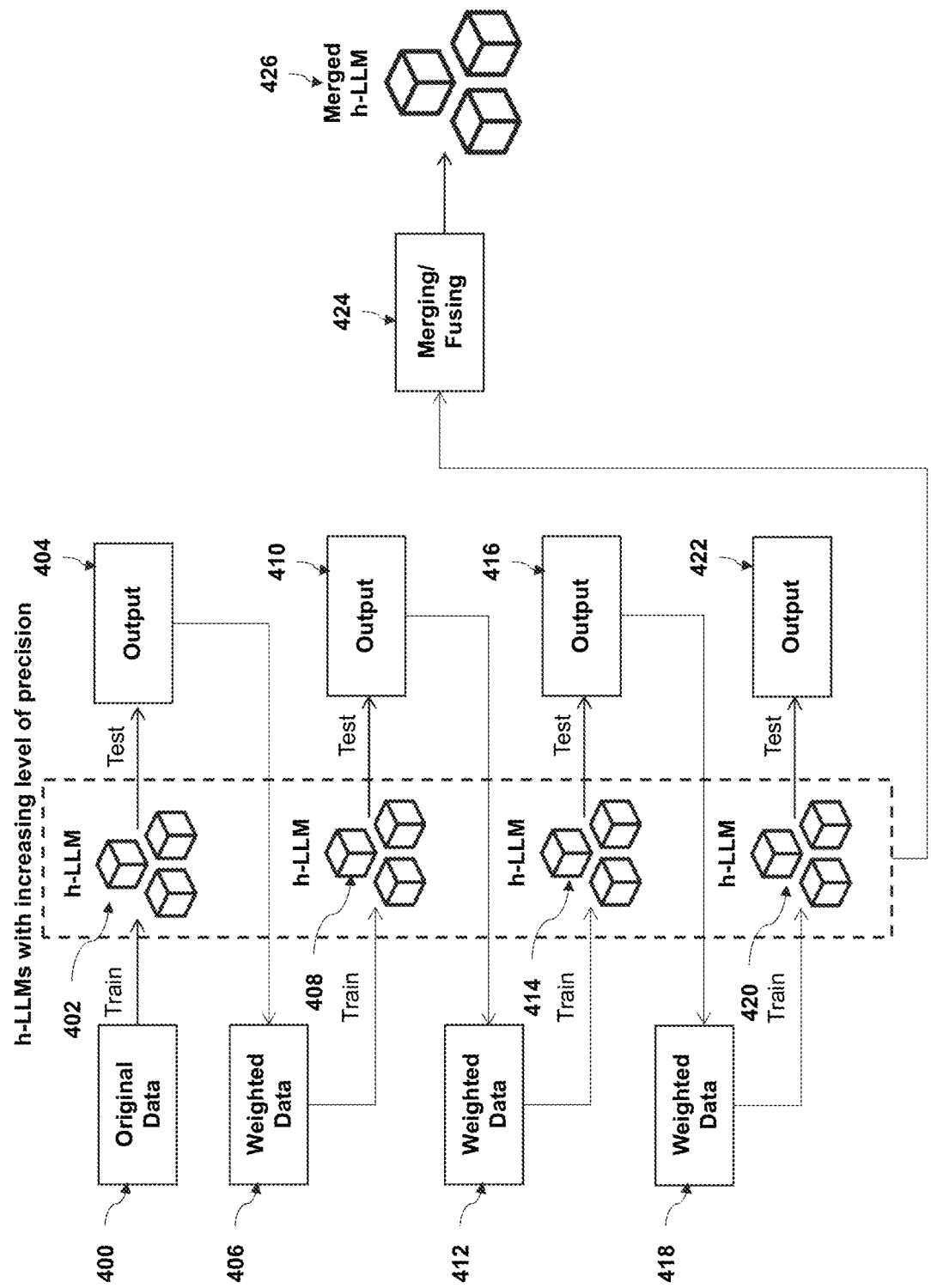
FIG. 5 is an illustration of a "boosting" approach where multiple h-LLMs of increasing precision and accuracy are created in a sequential manner and then merged/fused to create a merged h-LLM, according to an embodiment of the invention.

Referring now to FIG. 5 is an illustration a boosting approach, that has some similarities to that originally used in the context of machine learning models in a different way (for analytics as opposed to generative AI applications used in this invention) where multiple h-LLMs of increasing precision and accuracy are created in a sequential manner and then merged/fused to create a merged h-LLM, is described in more detail. Boosting is a machine learning technique that involves creating a stronger and more accurate model from a number of weaker models. The original data 400 is used to train an h-LLM 402. The h-LLM 402 is tested and the output 404 is assigned weights to generate weighted data 406. The weighted data 406 is then used to train h-LLM 408. The same process is then repeated and h-LLMs 414 and 420 are generated in a sequence. The h-LLMs 402, 408, 414 and 420 are then combined in a process called merging or fusing 424 to create a merged h-LLM 426.

Figure 6:
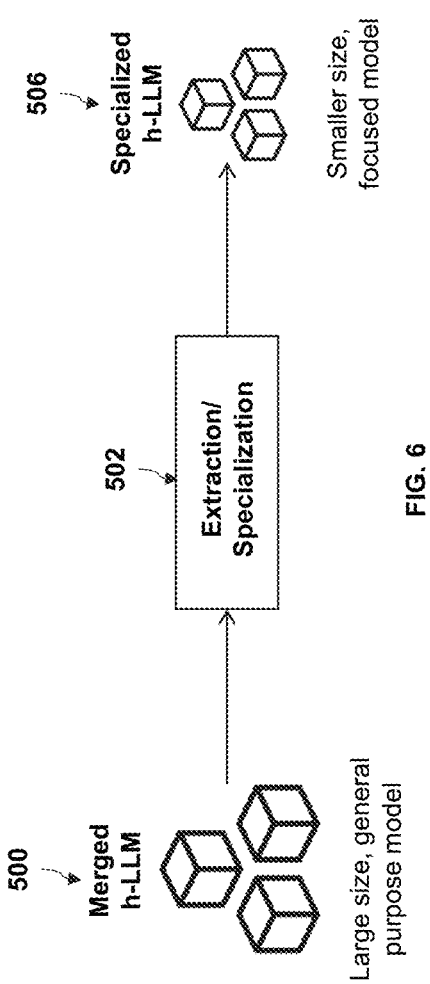
FIG. 6 is an illustration of creating a smaller and more specialized h-LLM through extraction/specialization process from a larger h-LLM, according to an embodiment of the invention.

Referring now to FIG. 6 is an illustration of creating a smaller and more specialized h-LLM through extraction/specialization process from a larger h-LLM, is described in more detail. The extraction/specialization process 502 extracts the specific knowledge required for a task from a big, general-purpose model, and creates a smaller h-LLM 506. For example, a specific task can be sentiment analysis of input text, for which a smaller model 506 is more efficient as compared to a large, general-purpose model.

Figure 7:
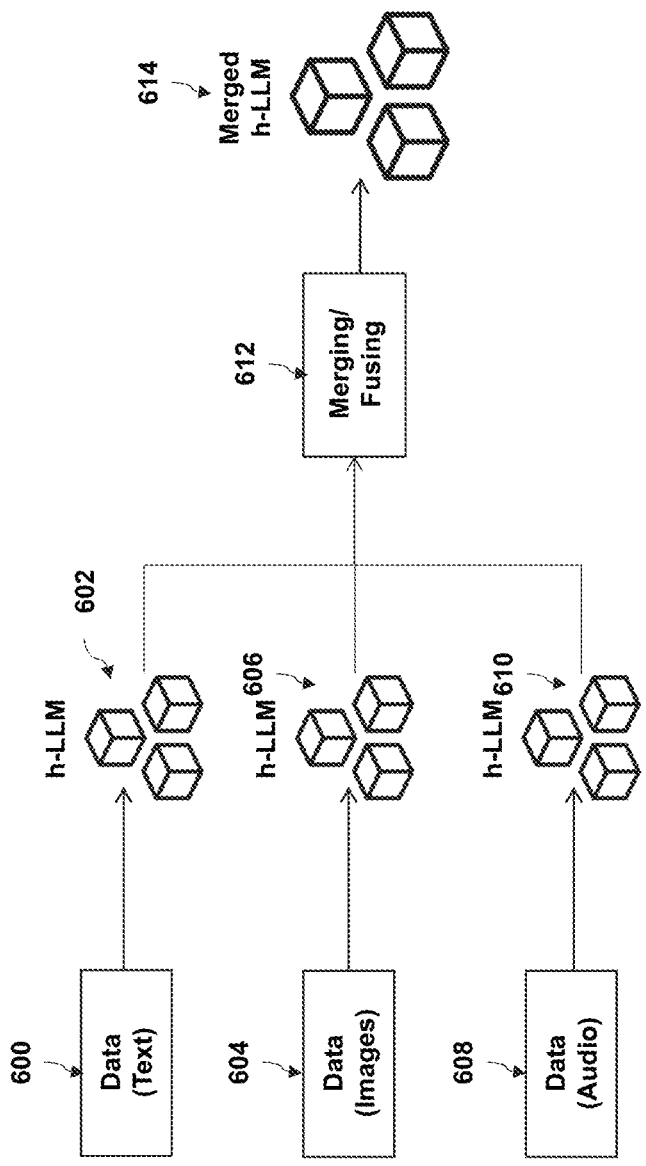
FIG. 7 is an illustration of combining h-LLMs trained with text, image and audio data to create a merged h-LLM, according to an embodiment of the invention.

Referring now to FIG. 7 is an illustration of combining h-LLMs trained with text, image and audio data to create a merged h-LLM, is described in more detail. Text data 600 is used to train h-LLM 602, image data 604 is used to train h-LLM 606 and audio data 608 is used to train h-LLM 610. The h-LLMs 602, 606, 610 are combined in a process called merging/fusing to create a merged h-LLM 614.

Model merging and fusing are used to combine multiple models (LLMs or h-LLMs), to create a single, more powerful or specialized model. These processes leverage the strengths of individual models and create a unified model that can perform better or handle a wider range of tasks. Merging, in the context of the present invention, refers to combining models with similar architectures, while fusing refers to integrating models with different architectures or modalities, at a high-level. Merging and/or fusing of models helps in enhancing the overall performance, expanding the model capabilities across different domains or tasks, and reducing computational requirements by creating more efficient models.

As part of our inventive approaches, we identify different approaches to merging and/or fusing generative LLM models include (but not limited to):

1. Weight Averaging: This approach involves taking the average of the weights of multiple models. It can be effective when models have similar architectures and have been trained on similar data.

2. Weight Consolidation: This method aims to merge models while preserving important knowledge from each.
3. Knowledge Distillation: This technique involves training a smaller model (student) to mimic the behavior of a larger model or ensemble of models (teacher). The merged model learns to produce similar outputs as the original models.
4. Layer-wise Merging: In this approach, corresponding layers from different models are combined using various strategies such as averaging, concatenation, or more sophisticated attention mechanisms.
5. Attention-based Fusion: This method uses attention mechanisms to dynamically weight the contributions of different models or components during inference.
6. Cross-stitch Networks: These networks learn to combine multiple task-specific networks by using trainable scalar values to control information flow between different network streams.
7. Progressive Neural Networks: This approach involves adding new columns to an existing network for new tasks while keeping the previously learned features frozen, allowing for transfer learning without forgetting.
8. Mixture of Experts (MoE): In this approach, multiple "expert" models are combined with a gating network that learns to select or blend the outputs of the experts based on the input.
9. Evolutionary Merging: This method uses evolutionary algorithms to optimize the combination of different model components or layers, searching for the most effective merged architecture.
10. Modality-specific Fusion: For multi-modal models like the one described in FIG. 7, specialized techniques are used to fuse representations from different modalities (text, image, audio) effectively. This can involve cross-modal attention mechanisms or joint embedding spaces.

The choice of merging or fusing technique depends on factors such as the similarity of the models being combined, the desired outcome (e.g., performance improvement, task expansion, model compression), and the computational resources available. The merged h-LLM 614 resulting from these processes can potentially handle a wider range of inputs and tasks more effectively than any of the individual models, leveraging the combined strengths of text, image, and audio understanding.

Figure 8:
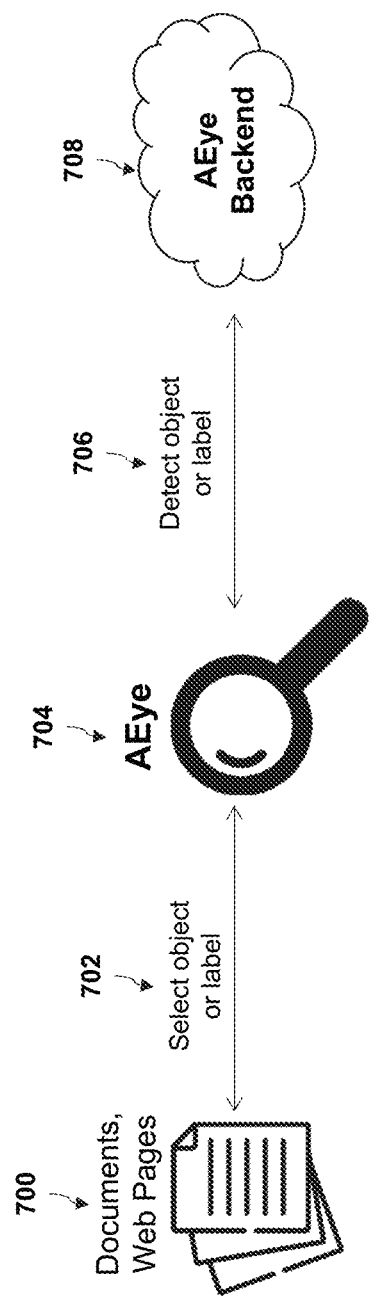
FIG. 8 is an exemplary illustration of an application of using AI models for detecting labels in PDF files, according to an embodiment of the invention.

Referring now to FIG. 8 is an exemplary illustration of an application of using AI models for detecting labels in PDF files, is described in more detail. Patent documents (such as PDF files) have figures in which various entities/blocks/items are labeled using numeric labels (for instance 110, 120 and so on). These labels are referenced and described in the patent text specification. When reviewing multiple documents, readers find it difficult to quickly lookup the labels mentioned in the figures (and what they refer to) from the text, as they need to go back and forth between a figure and the text in the specification. A novel PDF Label search solution is offered within CatchUp which allows quick lookup of labels in a figure using an innovative "AI Magnifier" approach. The user can select one or more labels using the Magnifier tool in the CatchUp GlassViewer (a PDF viewer tool within CatchUp that has annotation and other AI features). When one or more labels are selected using the Magnifier tool, the labels are searched within the PDF and the search results are returned. The PDF Label Search tool is built upon a novel AI Magnifier technology (which we refer to as AEye). AEye serves as a gateway to the world of Artificial Intelligence (AI) for documents and web pages. AEye can be used for a wide range of applications such as detecting objects in images, labels in documents, for instance. Documents or web pages 700 can be searched using an AEye application 704 which detects objects or labels utilizing an AEye backend 708.

Figure 9:
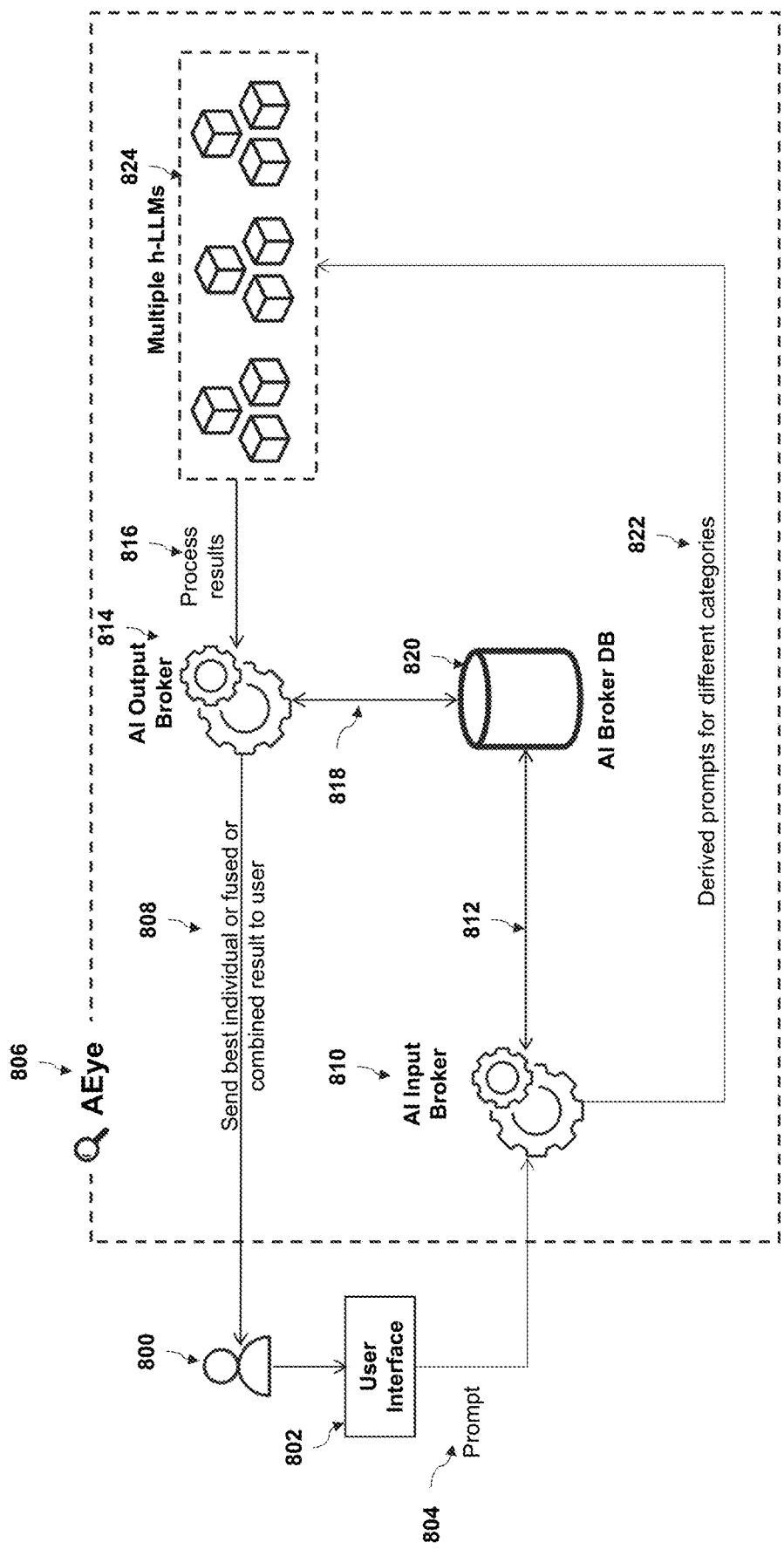
FIG. 9 is an illustration of generating derived prompts for different categories and using them with multiple h-LLMs to generate the best results, according to an embodiment of the present invention.

Referring now to FIG. 9 is an illustration of generating derived prompts for different categories and using them with multiple h-LLMs to generate the best results, is described in more detail. User 800 enters a prompt in user interface 802. The prompt is sent to the AI Input Broker 810, which may be an agent that generates multiple derived prompts for different categories. The derived prompts 822 are sent to brokers or agents comprising one or multiple h-LLMs 824 which produce the results. The results 816 are sent to the AI Output Broker 814 which processes the results and performs tasks such as filtering, ranking, weighting, assigning priorities, and then sends the best results to the user 800. The h-LLMs 824 can have varying levels of accuracy, and optimized for different tasks such as Question Answering, Information Extraction, Sentiment Analysis, Image Captioning, Object Recognition, Instruction Following, Classification, Inferencing, and Sentence Similarity, for instance. The AI Output Broker 814 computes various scores and assigns weights for ranking the results, in addition to other tasks, such as model fusing and merging. The results may be sent back to the h-LLMs till a certain level of accuracy or service level assurance is reached. The AI Input Broker 810 and Output Broker 814 update a local AI Broker Database 820 with the results of the request's path through its hierarchy and create an index of "derived requests" that may be used in future to select which set of "derived requests" an incoming request may fall into for further processing.

Figure 10:
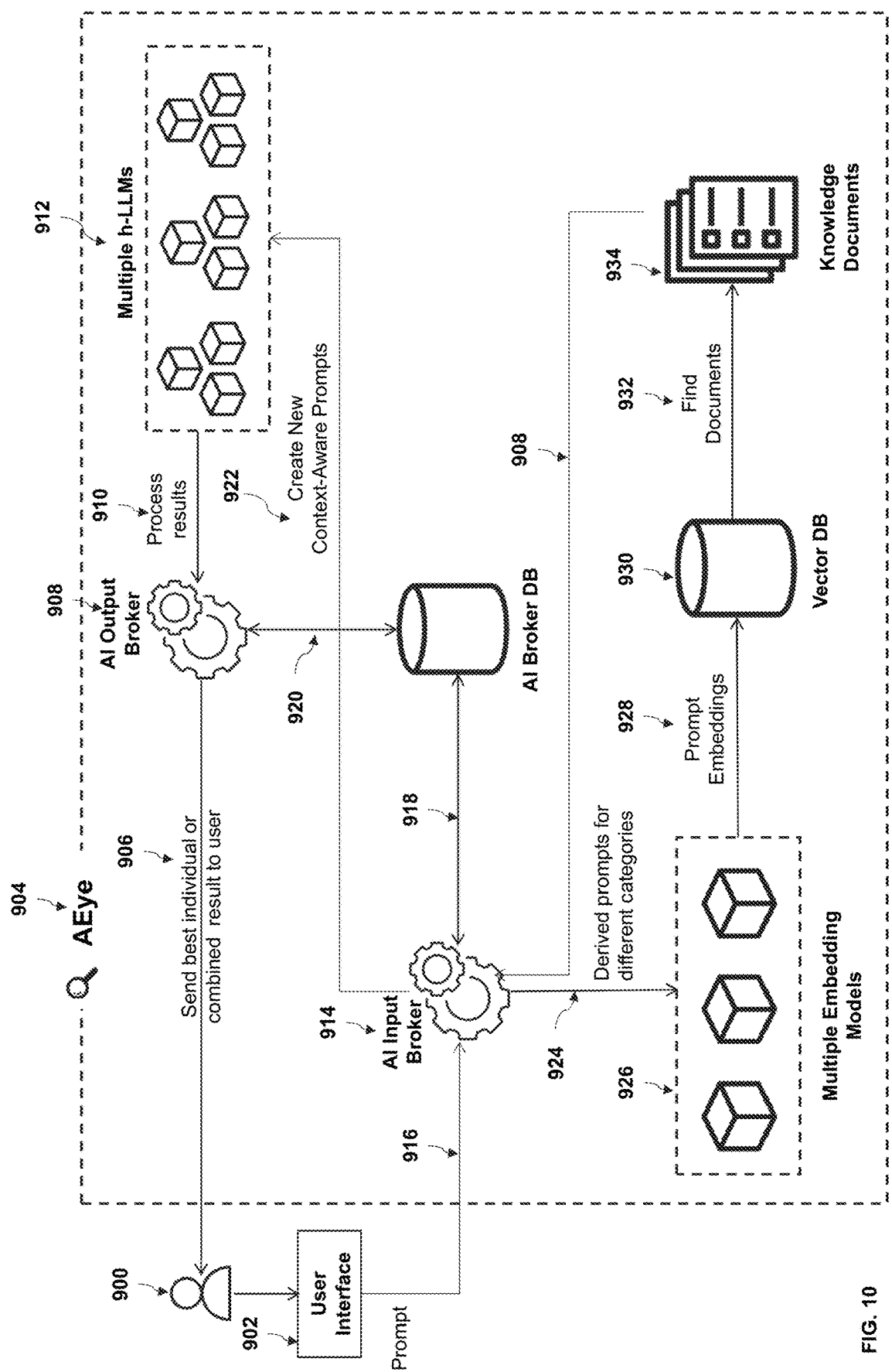
FIG. 10 is an illustration of using multiple h-LLMs to answer questions from specific input documents, according to an embodiment of the present invention.

Referring now to FIG. 10 is an illustration of using agents or brokers comprising multiple h-LLMs to answer questions from specific input documents, is described in more detail. User 900 enters a prompt in user interface 902. The prompt is sent to AI Input Broker 810 which generates multiple derived prompts 924 for different categories. The prompts are converted into embeddings using multiple embedding models 926. The prompt embeddings 928 are sent to a vector database 930 which returns a list of knowledge documents 934 that are relevant to the prompt or relevant derived prompts based on the similarity of their embeddings to the user's prompt. The knowledge documents 934 are sent to the AI Input Broker 810 which creates new context-aware prompts based on the user's initial prompt 916, derived prompts 924 and the retrieved knowledge documents 934 as context and sends it to multiple h-LLMs 912. The results produced by multiple h-LLMs are processed by the AI Output Broker 908 and the best result is sent to the user 900 along with citations from the knowledge documents 934.

Figure 11:
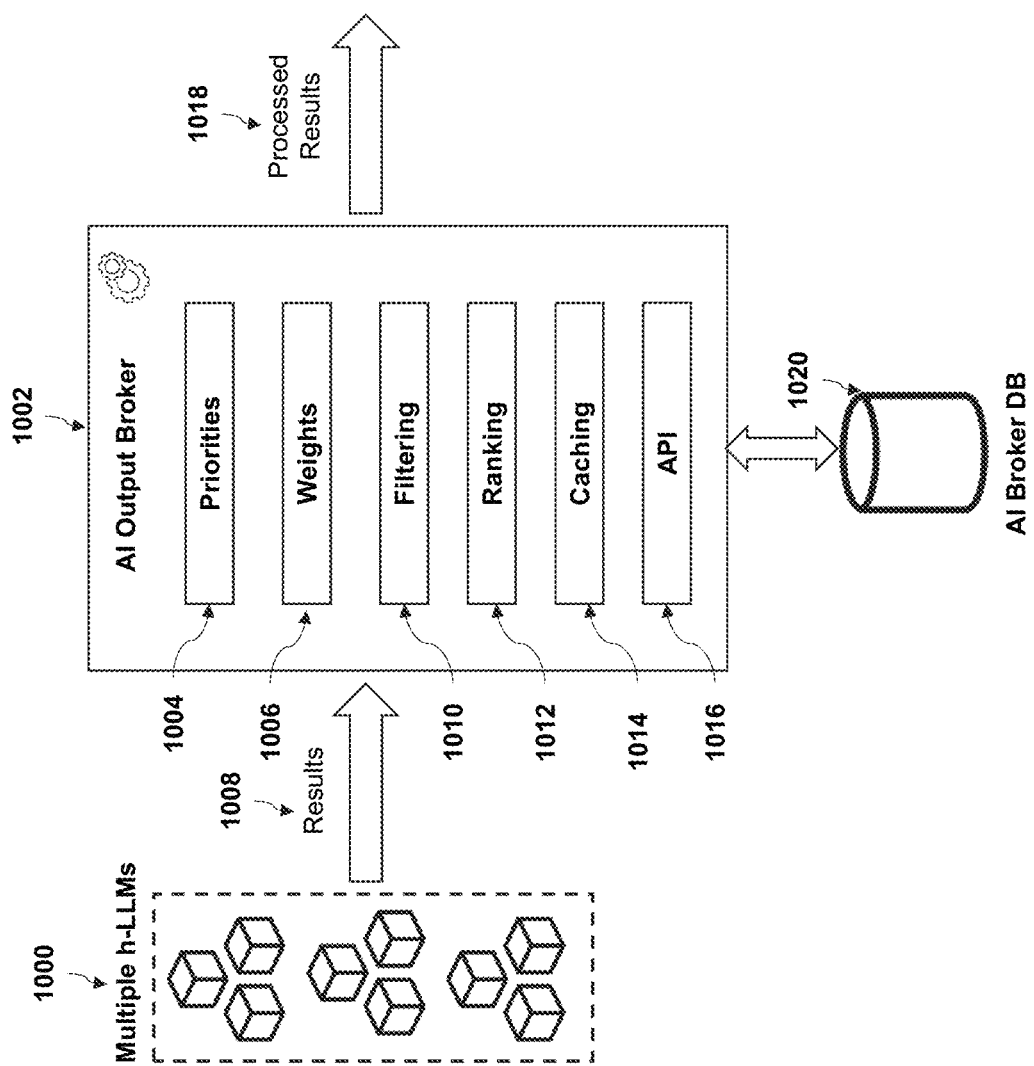
FIG. 11 is an illustration of an AI Broker for processing results from multiple h-LLMs, according to an embodiment of the present invention.

Referring now to FIG. 11 is an illustration of an AI Broker for processing results from multiple h-LLMs, is described in more detail. Results produced by multiple h-LLMs 1000 are sent to an AI Output Broker 1002 which performs tasks such as assigning priorities 1004 and weights 1006 to the results, filtering 1010, ranking 1012 and caching 1014. The AI Output Broker 1002 provides an API interface 1016 for configuring and managing various aspects of the broker. An AI Broker Database 1020 stores the results along with the meta-data information such as the request path. AI Broker Database 1020 creates an index of "derived requests" that may be used in future to select which set of "derived requests" an incoming request may fall into for further processing.

Referring now to FIG. 12 is an illustration of the combining h-LLMs in series, is described in more detail. User 1100 enters a prompt in user interface 1102. The prompt 1104 is sent to an AI Input Broker 1106 which generates a derived prompt by adding more contextual information. The derived prompt is sent to multiple h-LLMs 1108 connected in series. The derived prompt goes to the first h-LLM in the sequence which generates results. The results of the first h-LLM are sent to the second h-LLM in the sequence for refinement/enhancement and then to the third h-LLM and so on. The AI Output Broker 1110 processes the results 1112 and sends the processed results to user 1200.

Referring now to FIG. 13 is an illustration of combining h-LLMs in parallel, is described in more detail. User 1200 enters a prompt in user interface 1202. The prompt 1204 is sent to an AI Input Broker 1206 which generates multiple derived prompts by adding more contextual information. The derived prompts are sent to multiple h-LLMs 1208 which process the prompt in parallel generating multiple results. The AI Output Broker 1210 processes the results and sends the processed results 1212 to the user 1200.

Figure 14:
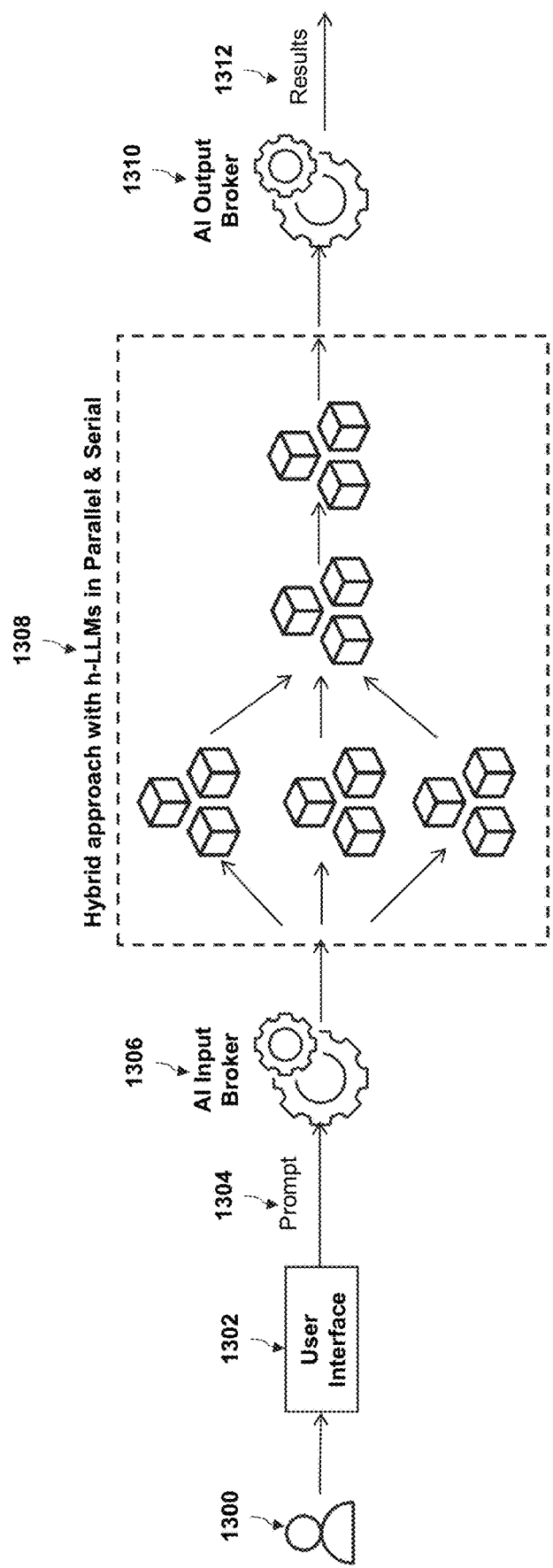
FIG. 14 is an illustration of a hybrid approach of combining h-LLMs in series and parallel, according to an embodiment of the present invention.

Referring now to FIG. 14 is an illustration of a hybrid approach of combining h-LLM in series and parallel, is described in more detail. User 1300 enters a prompt in user interface 1302. The prompt 1304 is sent to an AI Input Broker 1306 which generates multiple derived prompts by adding more contextual information. The derived prompts are sent to multiple h-LLMs 1308 which processes the prompts generating one or more results. The AI Output Broker 1310 processes the results and sends the processed results 1312 to the user 1300.

Figure 15:
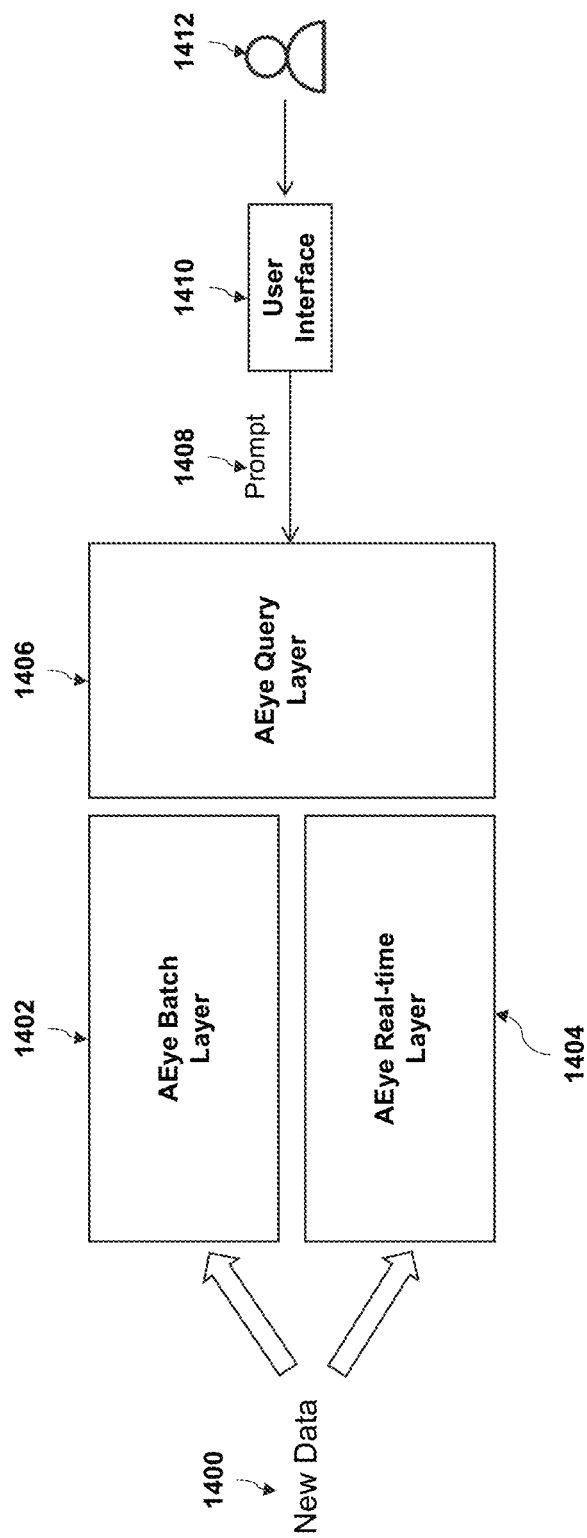
FIG. 15 is an illustration of the lambda architecture for h-LLMs, according to an embodiment of the present invention.

Referring now to FIG. 15 is an illustration of the lambda architecture for h-LLMs, is described in more detail. Lambda architecture is a way of processing massive quantities of data that provides access to batch-processing and stream-processing methods with a hybrid approach, often utilizing in-memory storage instead of disks for speedier processing. Such in-memory processing may be accomplished using a volatile memory device such as random-access memory (RAM) devices, static random-access memory (SRAM) devices, dynamics random-access memory (DRAM) devices, magnetoresistive random-access memory (MRAM) devices, and the like, or a non-volatile random-access memory (NVRAM) device. Such processing may be done partially or entirely in-memory.

This figure illustrates a lambda architecture for h-LLMs comprising batch layer 1402, real-time layer 1404 and a query layer 1406. New input data 1400 comes in continuously and is fed to the batch layer 1402 and real-time layer 1404 simultaneously. The batch layer 1402 maintains one or more h-LLMs which are updated/fine-tuned with the new data on a fixed schedule. Data is aggregated from the new input data 1400 over an aggregation duration that is tied to the fixed schedule. The real-time layer 1404 deals only with recent data which is not processed in the batch layer. The real-time layer 1404 maintains and updates smaller h-LLMs with incremental updates. The real-time layer 1404, also utilizes Map Reduce type analytics and computing and processing (See for example, tutorialspoint.com/map_reduce/map_reduce_introduction.htm) of tokens in the tokenization processes to improve speeds by which tokens are merged or otherwise aggregated in a distributed GPU computing environment, User 1412 sends a prompt 1408 through user interface 1410 to the query layer 1406. The query layer 1406 forwards the original prompt or creates one or more derived prompts which are sent to the batch and real-time layers. The query layer receives the results from the batch and real-time layers and performs tasks such as combining, ranking, filtering, assigning weights and priorities to the results and sends the best results to the user.

Figures 16, 17:
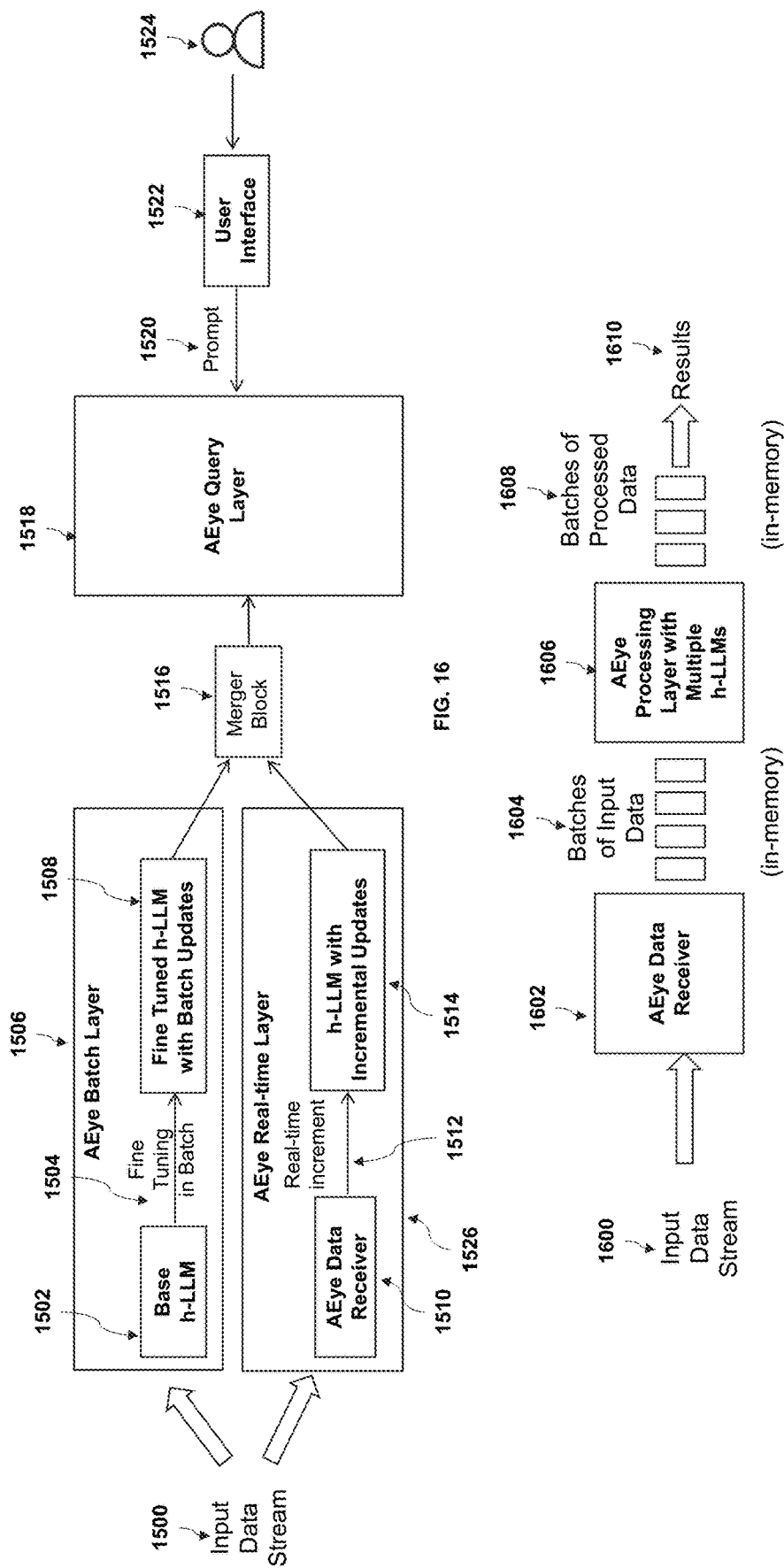
FIG. 16 is an illustration of batch and real-time processing architecture for h-LLMs, according to an embodiment of the present invention.
FIG. 17 is an illustration of an in-memory processing architecture for h-LLMs, according to an embodiment of the present invention.

Referring now to FIG. 16 is an illustration of batch and real-time processing architecture for h-LLMs, is described in more detail. The input data stream 1500 is sent to batch layer 1506 and real-time layer 1526. The batch layer 1506 maintains a base h-LLM 1502 which is fine tuned 1504 in batch to generate fine-tuned h-LLM 1508. The real-time layer 1526 generates smaller h-LLMs with incremental updates 1514 in real-time increments 1512. The merger block 1516 combines and merges the h-LLMs from the batch layer and real-time layer to produce a combined h-LLM. The merged h-LLM is used with the query layer 1518 to respond to prompts 1520 sent by user 1524 through the user interface 1522.

Referring now to FIG. 17, an illustration of an in-memory processing architecture for h-LLMs, is described in more detail. The input data stream 1600 is sent to the data receiver 1602 which breaks the data into small batches 1604 which can be processed at least partially, and in some embodiments entirely, in-memory. The processing layer 1606 includes multiple h-LLMs which process the batches on input data and produce the batches of processed data 1608. Such batches may be produced after aggregating data from the input data stream 1600 over an aggregation duration.

Figure 18:
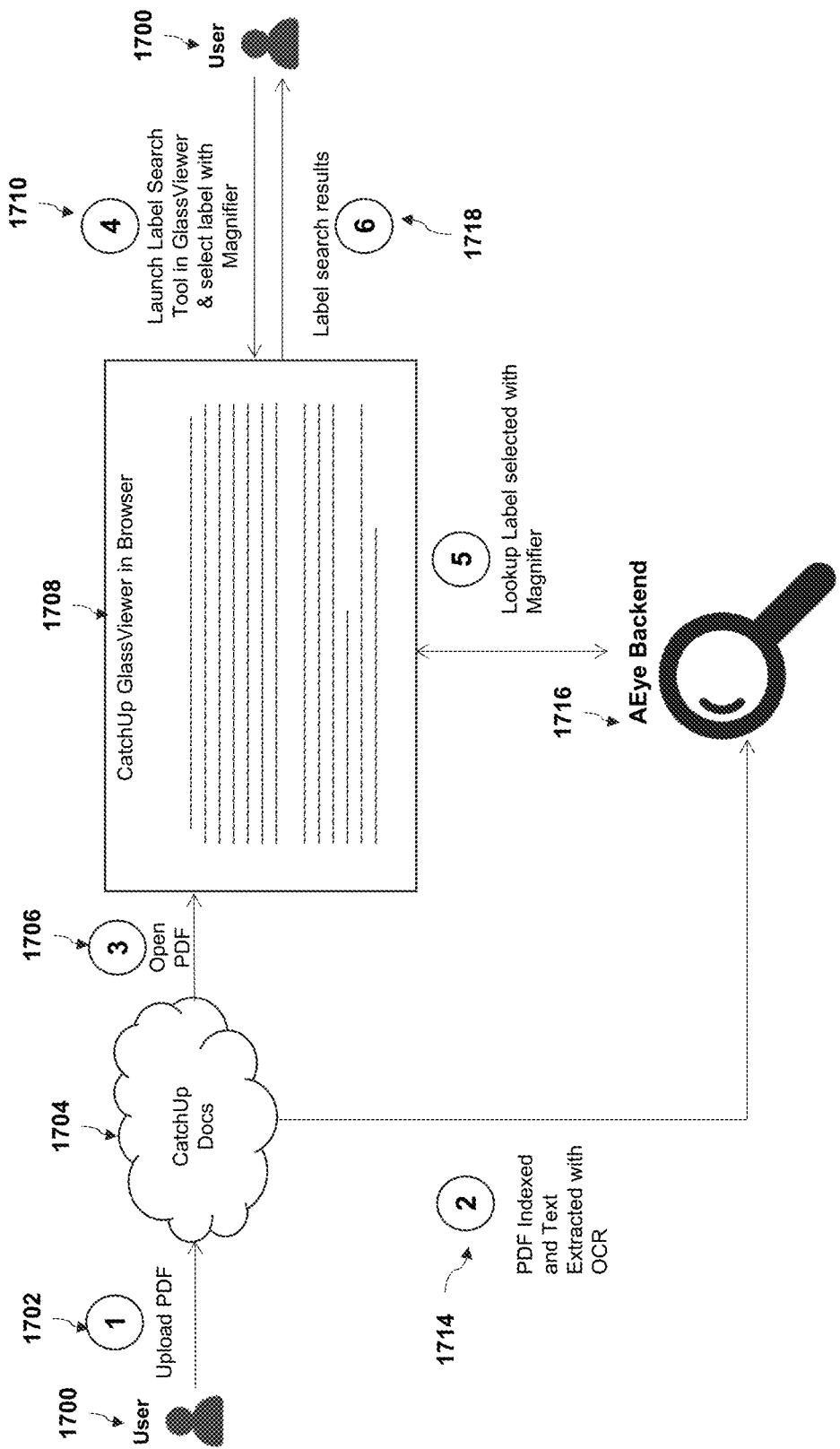
FIG. 18 is an illustration of the architecture of PDF label search tool with CatchUp GlassViewer, according to an embodiment of the invention.

Referring now to FIG. 18 is an illustration of the architecture of PDF label search tool with CatchUp GlassViewer, is described in more detail. User 1700 uploads a PDF document 1702 to the CatchUp document management system 1704. The text of the PDF document is extracted and indexed 1714 in the AEye backend system 1716. Such extraction and indexing may be performed using character recognition analysis, including optical character recognition analysis. The user opens the PDF document 1706 with the CatchUp GlassViewer application 1708 in a browser. User 1700 launches the label search tool 1710 within the CatchUp GlassViewer application 1708 and selects a label using the magnifier tool. The selected label is sent to the AEye backend system 1716 which retrieves and returns 1718 all occurrences of the label.

Figure 19:
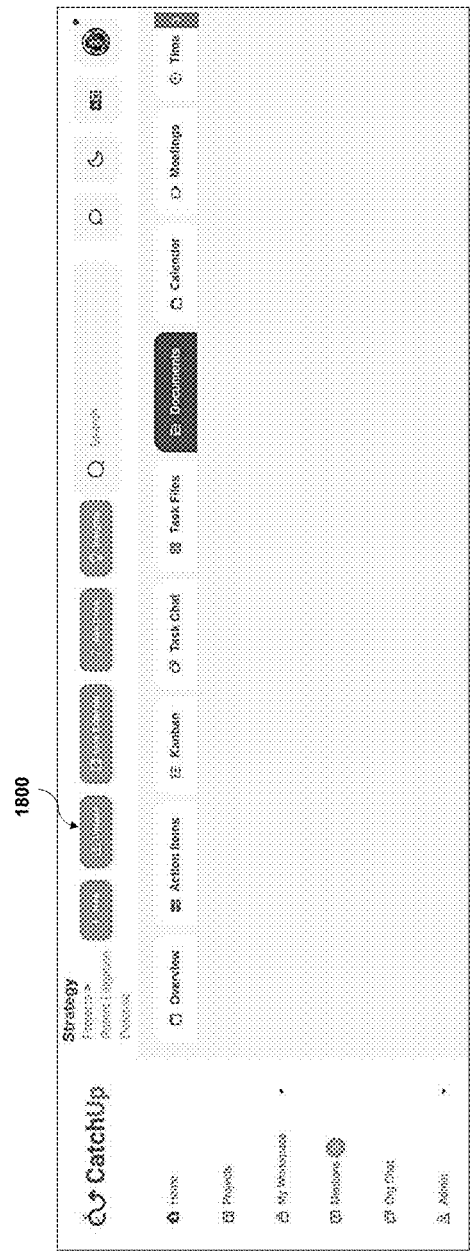
FIG. 19 is an exemplary interface of the CatchUp platform showing the document management system, according to an embodiment of the invention.

Referring now to FIG. 19 is an exemplary interface 1800 of the CatchUp platform showing the document management system, is described in more detail. Within this interface users can create new documents, upload existing documents, view and edit the documents.

Figure 20:
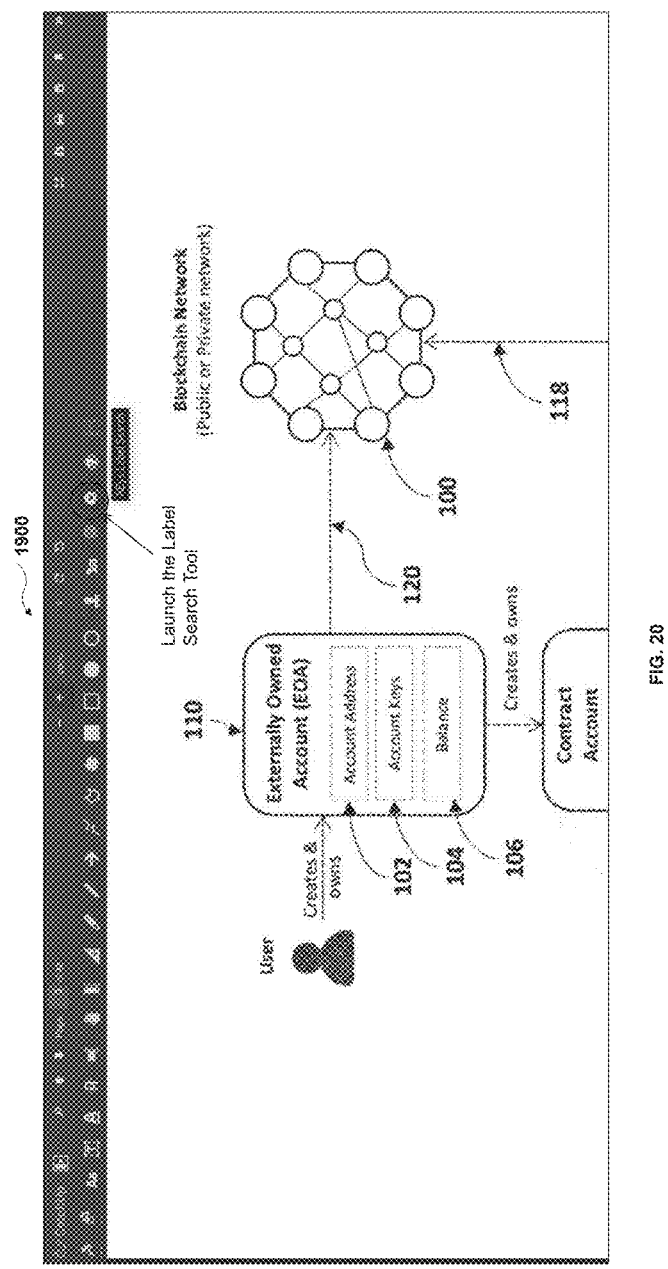
FIG. 20 is an exemplary interface of the CatchUp platform showing the PDF viewer (GlassViewer), according to an embodiment of the invention.

Referring now to FIG. 20 is an exemplary interface 1900 of the CatchUp platform showing the PDF viewer (GlassViewer), is described in more detail. GlassViewer is a PDF viewer application with CatchUp that allows annotating and commenting PDF files. The annotations and comments are stored in a separate layer which is rendered above the PDF document.

Figure 21:
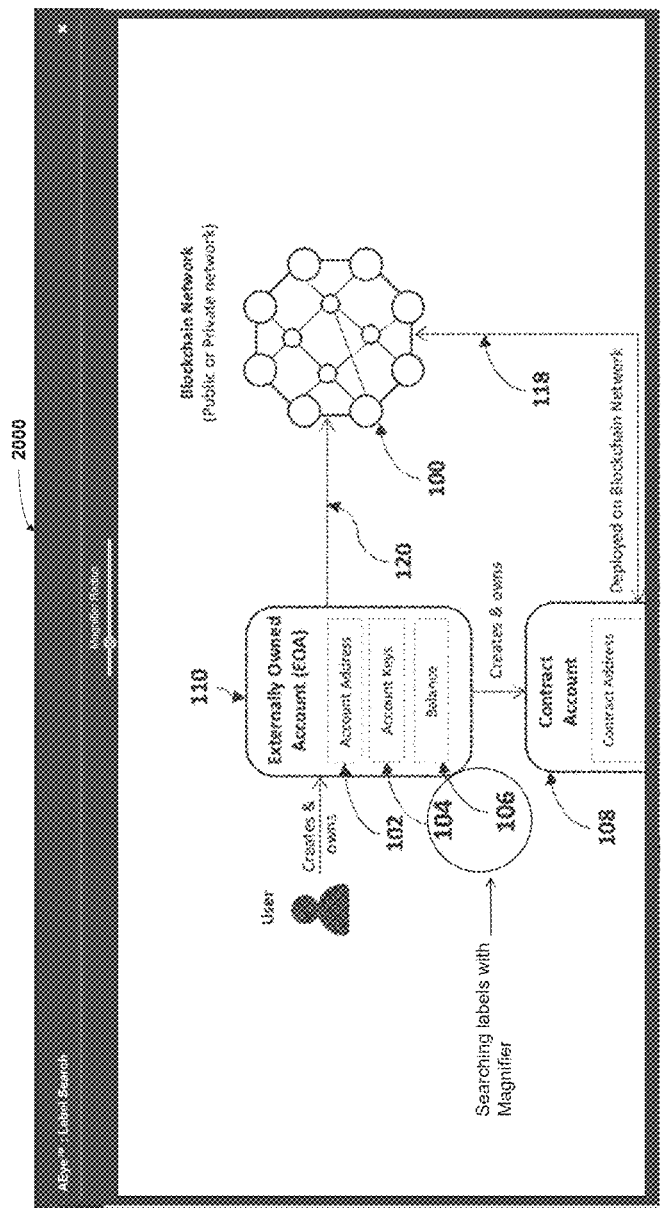
FIG. 21 is an exemplary interface of the CatchUp platform showing a magnifier tool within the GlassViewer for searching labels, according to an embodiment of the invention.

Referring now to FIG. 21 is an exemplary interface 2000 of the CatchUp platform showing a magnifier tool 2002 within the GlassViewer for searching labels, is described in more detail. GlassViewer includes a PDF label searching tool called AEye Label Searcher that allows quickly searching for all occurrences of selected labels within the PDF. AEye Label Searcher uses a magnifier to select specific labels within a region of the PDF which are sent to the AEye backend for processing, and the results are then displayed, which include excerpts from the document where the labels are mentioned. In some embodiments, the AEye backend may lookup labels within multiple documents or return additional information generated from one or more h-LLM models as taught elsewhere in other embodiments of this invention. For example, a legal brief may be first generated using a local (in-house) database of briefs and then supplemented by h-LLMs that are trained on public-domain training sets of legal briefs, and the combination may be merged as needed.

Figure 22:
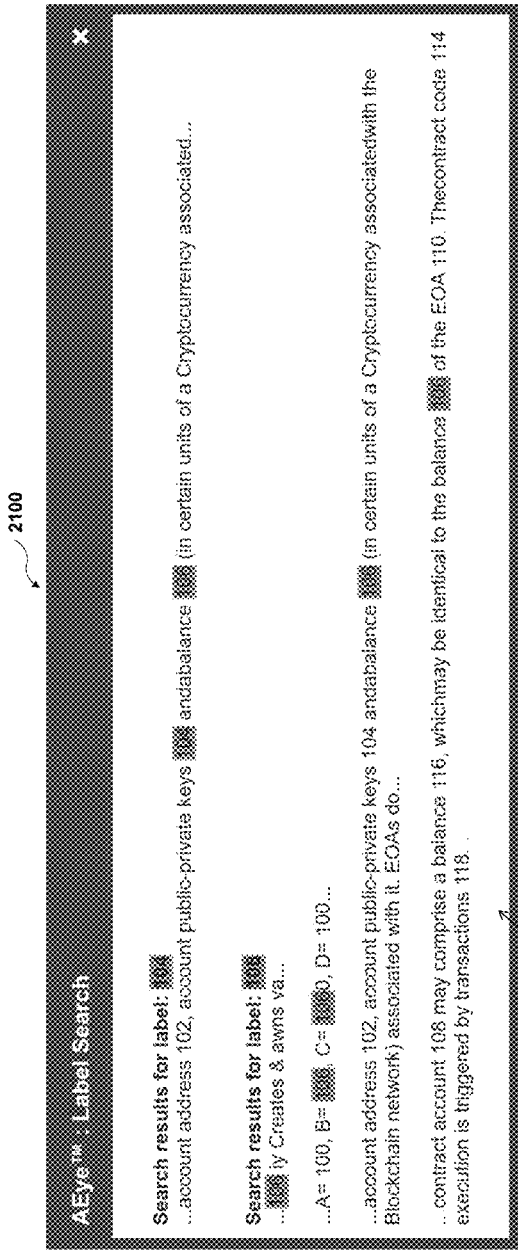
FIG. 22 is an exemplary interface of the CatchUp platform showing label search results within GlassViewer, according to an embodiment of the invention.
Figure 23:
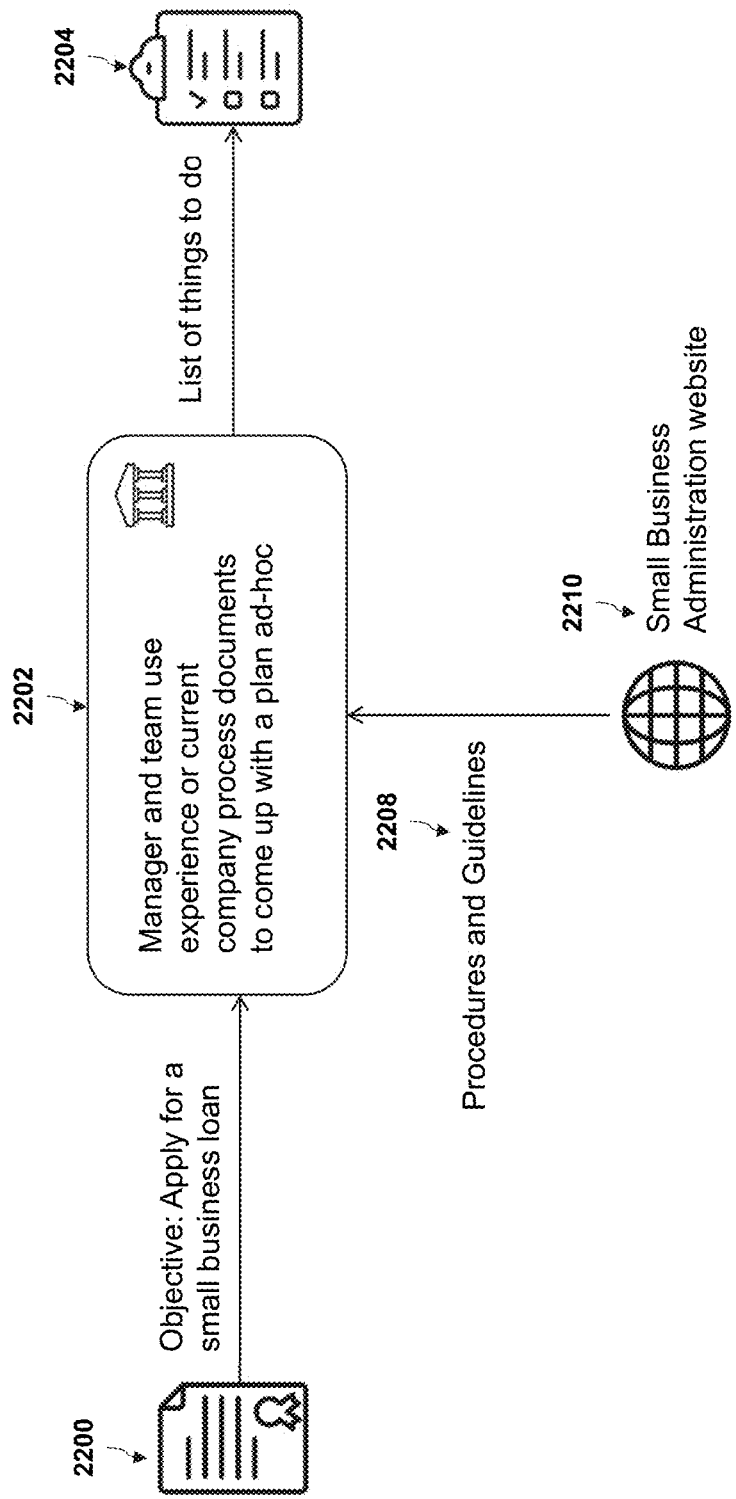
FIG. 23 is an illustration of the process used by organizations to decide the list of tasks for a project, according to an embodiment of the invention.
Figure 24:
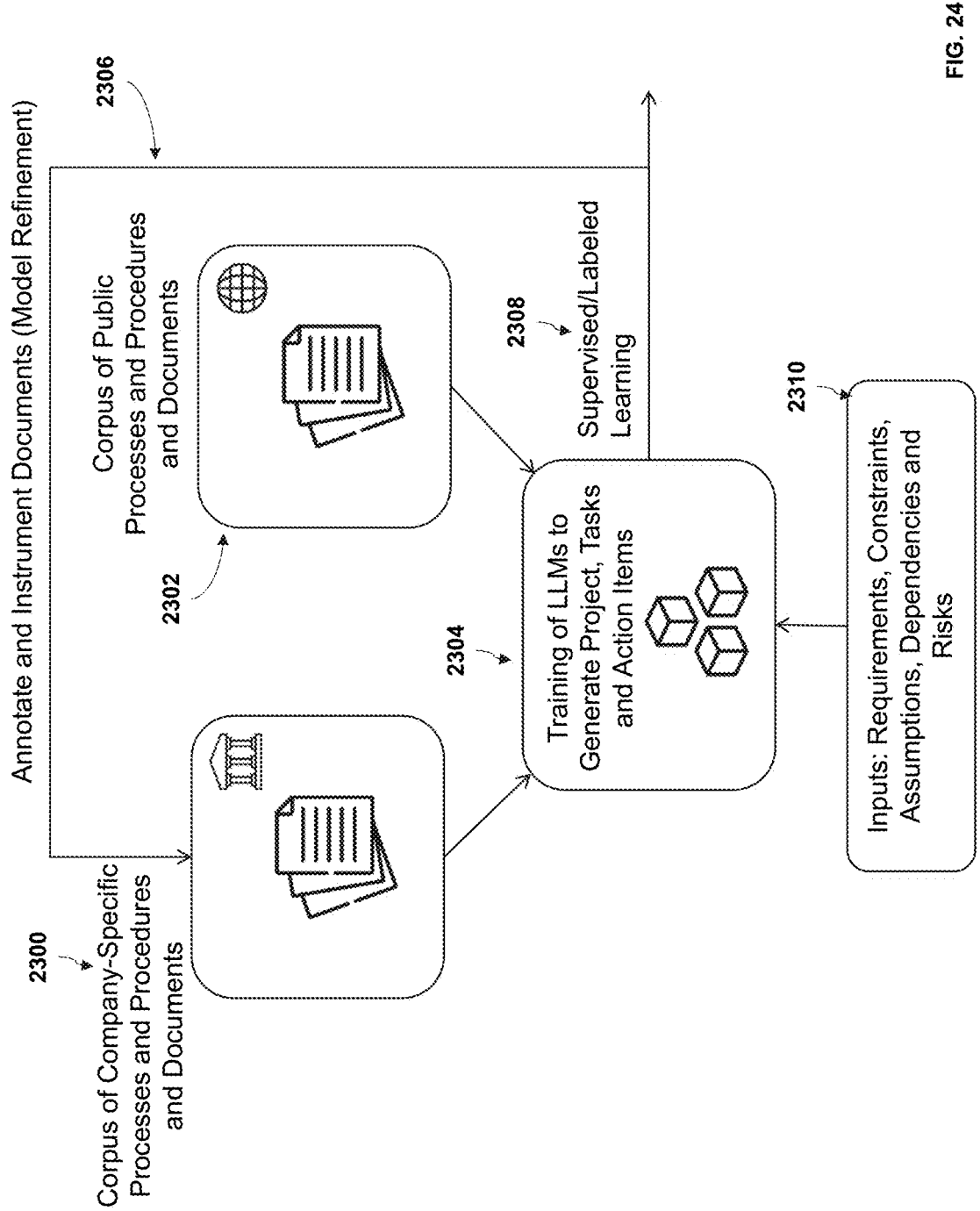
FIG. 24 is an illustration of the process of training LLMs to generate project, tasks and action items, according to an embodiment of the invention.
Figure 25:
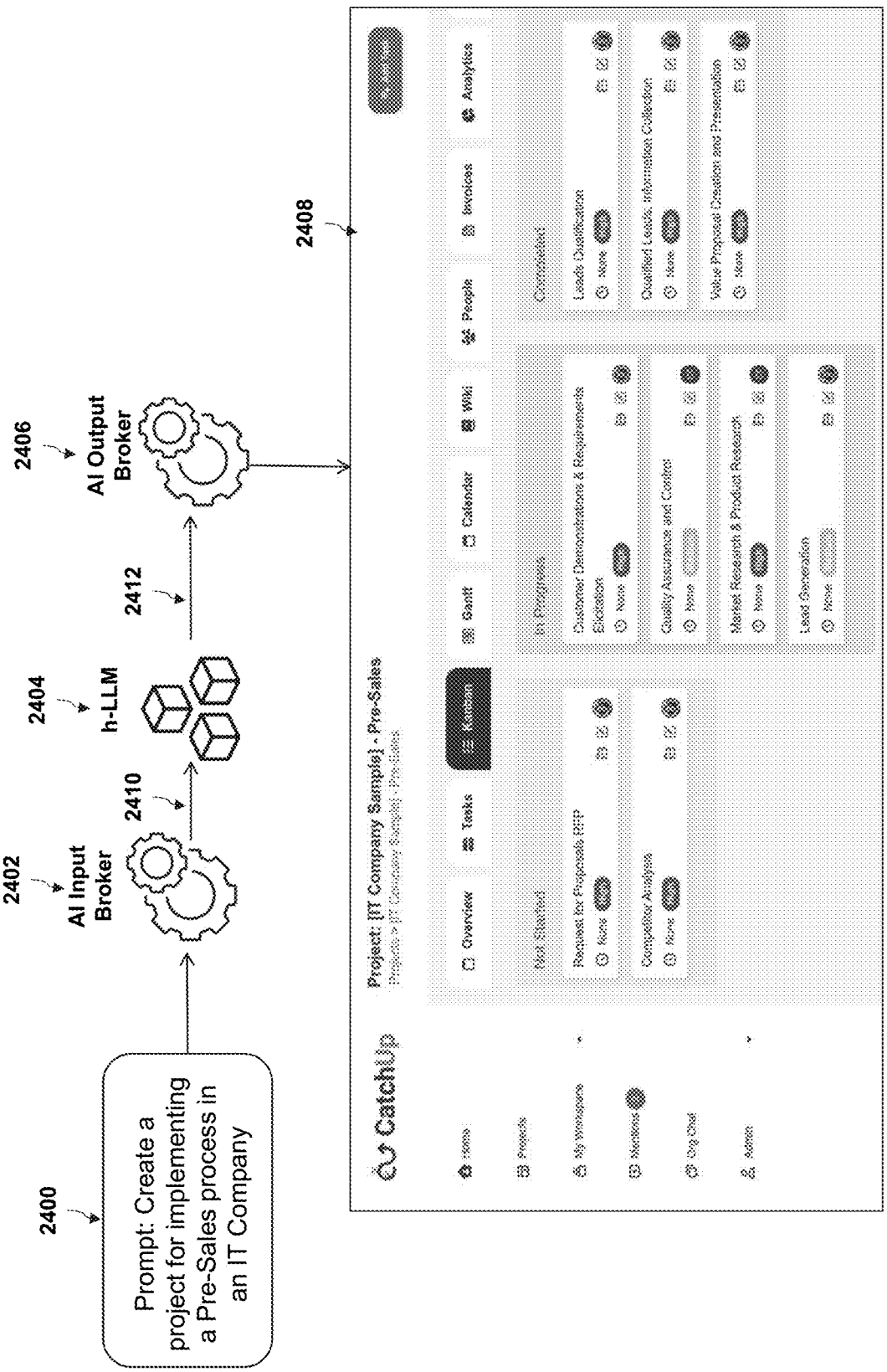
FIG. 25 is an illustration of the process of creating a project within CatchUp using a prompt, according to an embodiment of the invention.
Figure 26:
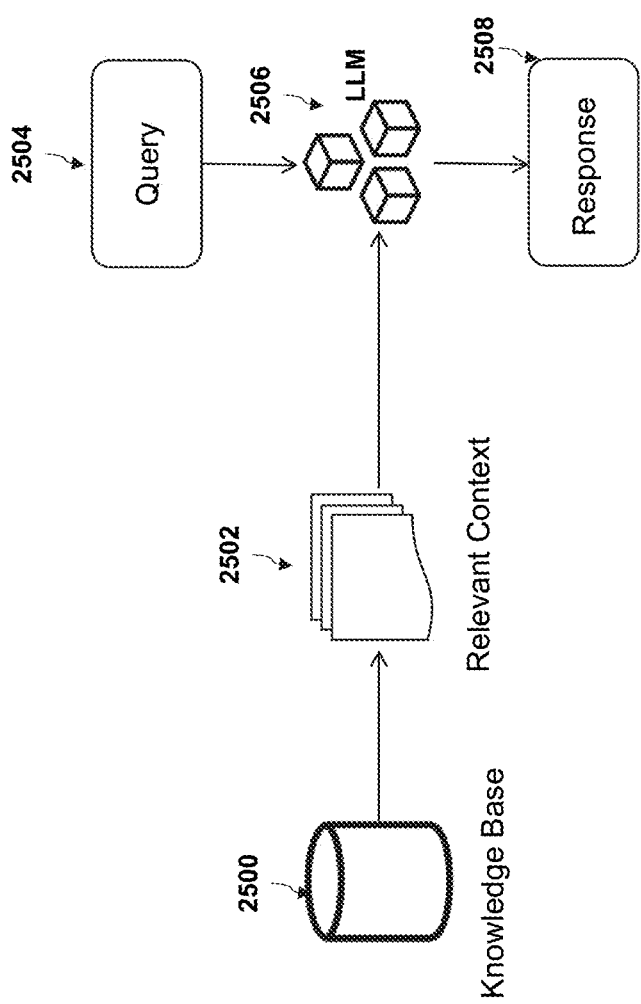
FIG. 26 is an illustration of the process of Retrieval Augmented Generation (RAG), according to an embodiment of the invention.
Figure 27:
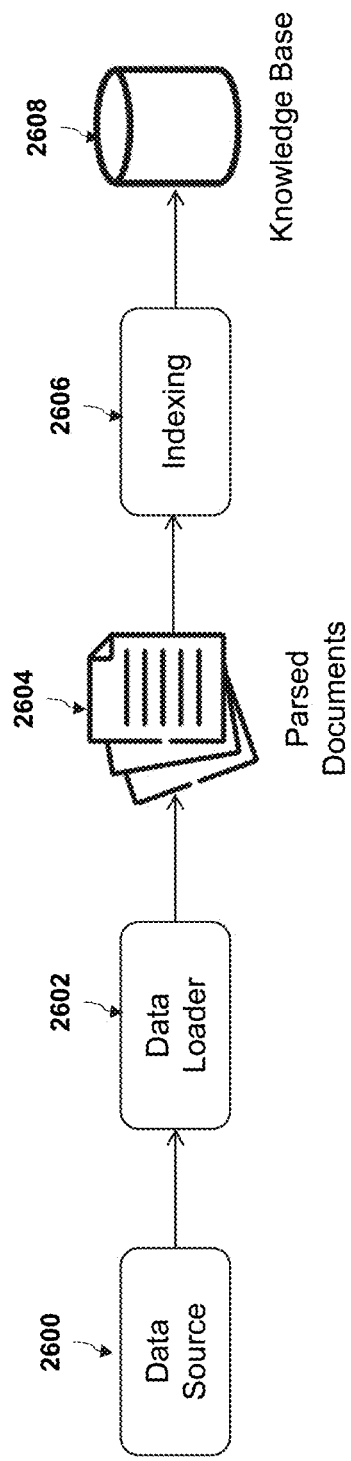
FIG. 27 is an illustration of the process of indexing documents RAG, according to an embodiment of the invention.
Figure 28:
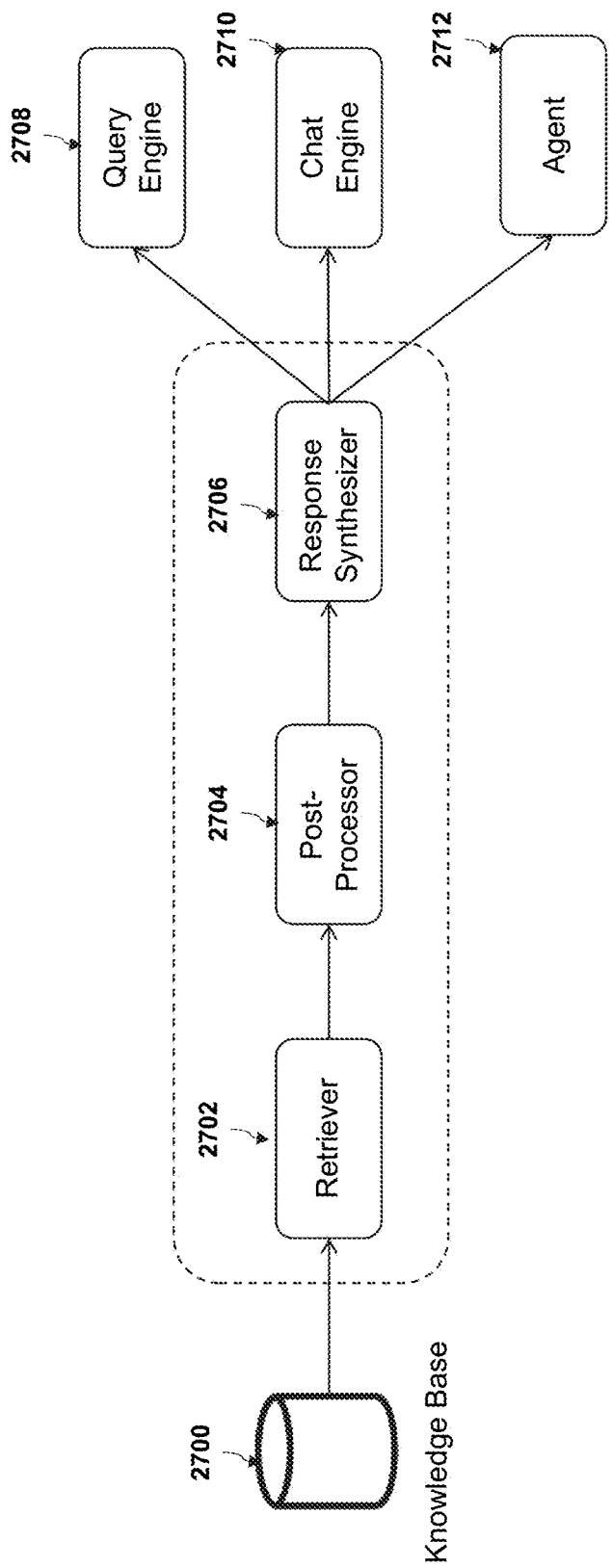
FIG. 28 is an illustration of the process of querying documents in RAG, according to an embodiment of the invention.
Figure 29:
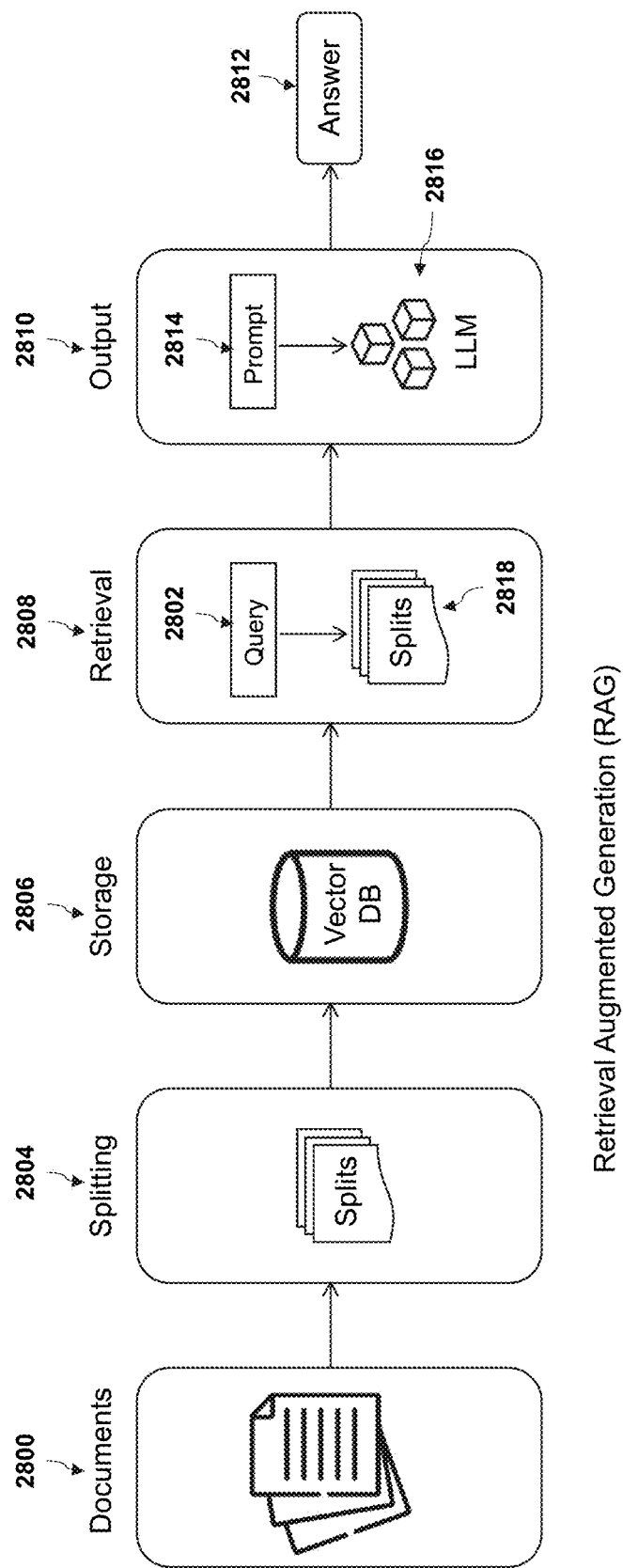
FIG. 29 is an illustration of the Retrieval Augmented Generation RAG pipeline, according to an embodiment of the invention.

Referring now to FIG. 22 is an exemplary interface of the CatchUp platform showing label search results within GlassViewer, is described in more detail. The labels selected using the magnifier within the AEye Label Searcher are sent to the AEye backend for processing and the results are then displayed as shown in this figure.

a) properties of the information.
b) Content Safety Screening 5340: Content safety screening to prevent the inclusion of explicit, violent, or otherwise inappropriate material.
c) Security Checks 5342: Security checks to detect and remove potential malware, phishing attempts, or other security threats.
d) Fact-Checking 5344: Fact-checking to flag or filter out misinformation or unverified claims.
e) Bias Detection 5346: Bias detection and mitigation to ensure a balanced representation of information.

Superchunks may further comprise monetization characteristics 5308. Superchunks may be associated with advertising content based on their composition or categorization, including (but not limited to):

a) Content-Based Ads 5348: Inserting relevant advertisements into superchunks based on the topical content. For example, a superchunk about natural farming practices might include or be associated with advertisements from organic fertilizer companies.
b) Category-Linked Ads 5350: Linking advertisements to the category or classification of the superchunk. For instance, a superchunk related to rent control laws in a specific city might be associated with advertisements for local legal services.
c) Ad Bidding System 5352: Implementing a bidding or auction system for advertisers to target specific types or categories of superchunks.

This advertisement feature can generate advertisements that are relevant to the user query, user interests, user intentions, or user past history of interactions. As part of the derived queries, certain queries may be made by the AI brokers to the user to identify their specific goals and intentions (for example, the AI brokers may ask the user if they are interested in buying a new car in the next six months, given that the user query appears to research and compare various brands of automobiles). The two-way interaction between the AI brokers and the user is seen as another novelty of certain embodiments of the present invention, compared to the one way interaction users currently have with generative AI LLMs.

Superchunks may further comprise processing characteristics 5310 The processing of superchunks may include multiple stages of enhancement and screening, including, but not limited to:

a) Privacy Enhancements 5354: Implementation of privacy enhancements, including, detection and removal of PII, data anonymization or pseudonymization techniques.
b) Ad Integration 5356: Ad generation and integration based on content analysis and categorization.
c) Safety Guardrails 5358: Application of safety and security guardrails to filter or flag potentially harmful or inappropriate content.
d) Tiered Access 5360: The system may employ different strategies for superchunk creation, maintenance, and utilization based on factors such as user authentication level, subscription tier, or specific privacy and security requirements of the use case.

These variations and implementations of superchunks are not mutually exclusive, and the present invention incorporates systems that may include multiple approaches or allow for dynamic switching between different superchunk paradigms based on context or requirements.

Figure 56:
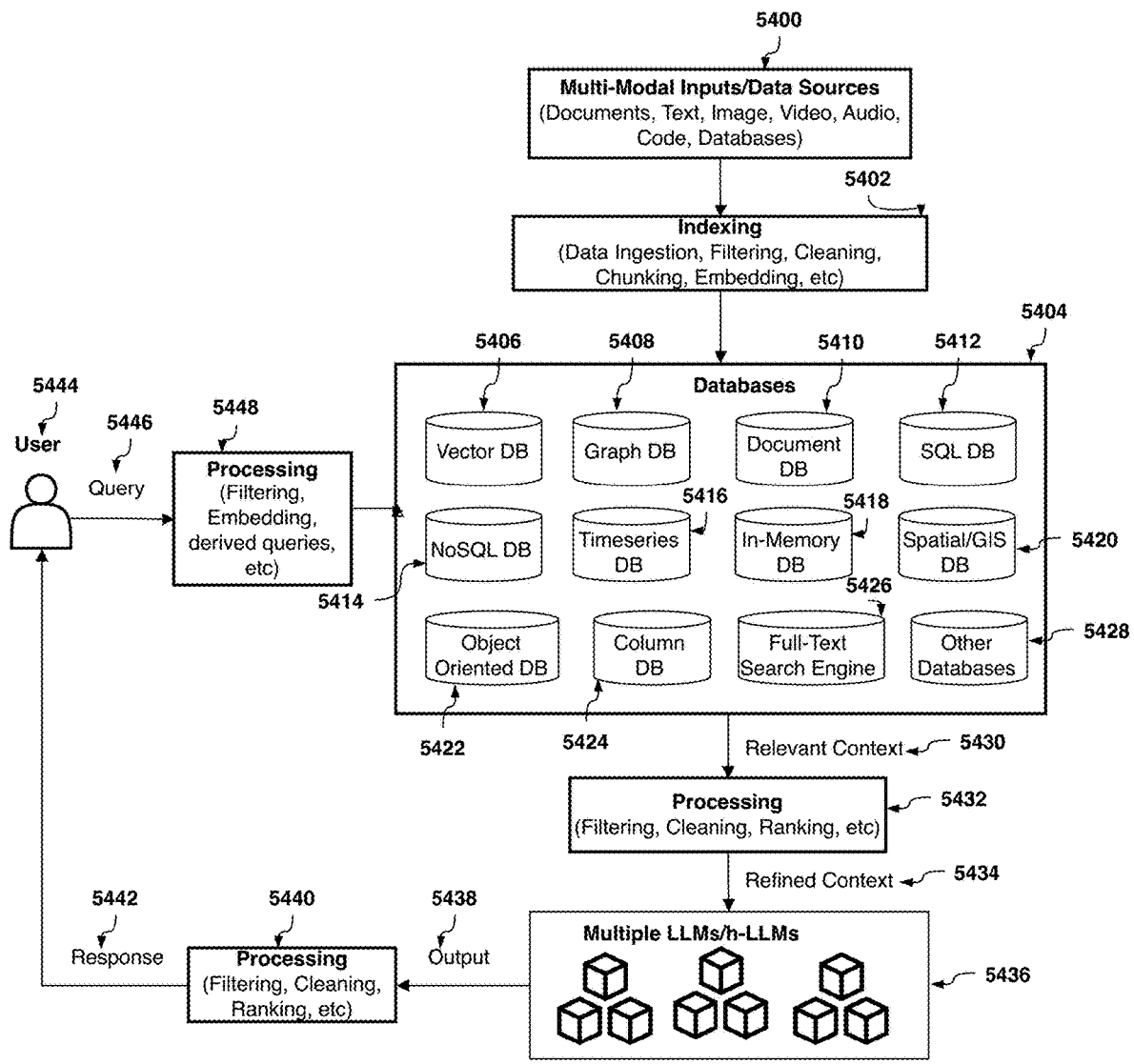
FIG. 56 is an illustration of the architecture of a Hybrid-RAG system according to an embodiment of the invention.

Referring now to FIG. 56, an illustration of an architecture of a Hybrid-RAG system is described in more detail. A Hybrid Retrieval-Augmented Generation (Hybrid-RAG) system is designed to process and generate multi-modal data, including but not limited to text, documents, images, audio, video, and code. The system leverages a combination of various database types and LLMs to overcome the limitations of traditional Vector-RAG or Graph-RAG systems, providing enhanced performance and versatility across diverse data types and query scenarios. The Hybrid-RAG system comprises multiple components designed to efficiently process, store, retrieve, and generate multi-modal data.

To achieve optimal performance for multi-modal data, Hybrid-RAG employs multiple embedding models and specialized databases, each fine-tuned for a specific content type such as text, audio, images, video, or code. This specialized approach ensures that the unique characteristics and nuances of each content modality are accurately captured and indexed. The system begins with the indexing of multi-modal data 5400, which may include text, documents, audio, video, code, and other data types. The indexing process 5402 involves several steps:

1. Data Ingestion: Raw multi-modal data is ingested into the system.
2. Preprocessing: This step includes chunking, filtering, and cleaning of the ingested data.
3. Embedding Generation: Specialized embedding models generate vector representations for each data type.

The processed and embedded data is stored in a variety of database types 5404, including: a Vector Databases 5406 (e.g., Pinecone, Milvus) for efficient similarity search; Graph Databases 5408 (e.g., Neo4j, TigerGraph) for relationship-based queries; Document Databases 5410 (e.g., MongoDB, Couchbase) for unstructured data; Relational Databases 5412 (e.g., PostgreSQL, MySQL) for structured data; Non-Relational Databases 5414 (e.g., DynamoDB) for unstructured or semi-structured data; Time-Series Databases 5416 (e.g., InfluxDB, TimescaleDB) for temporal data; In-Memory Databases 5418 (e.g., Redis, Memcached) for high-speed data access; Spatial/GIS Databases 5420 (e.g., PostGIS) for location-based data; Object-Oriented Databases 5422 (e.g., ObjectDB) for complex object storage; Column-Oriented Databases 5424 (e.g., Apache Cassandra) for wide-column storage; Full-Text Search Engines 5426 (e.g., Elasticsearch, Solr) for keyword-based retrieval; and Other specialized database types 5428 (e.g. NewSQL, multi-modal databases, RDF stores, XML databases, etc).

When a user 5444 submits a query 5446, the system pre-processes the query. Query Preprocessing 5448 involves filtering, embedding generation, and the creation of derived queries. Based on the preprocessed query, the system determines which database(s) are most suitable for retrieval in a query routing process. The system then queries the selected databases to retrieve relevant context 5430. The retrieved context 5430 undergoes processing 5432 including filtering, cleaning, and ranking to generate the refined context 5434. One or more appropriate LLMs or h-LLMs 5436 are then selected based on the query type and refined context 5434.

The responses 5438 generated by the LLMs or h-LLMs 5436 undergo filtering, cleaning, and ranking at a post-processing step 5440. The final processed response 5442 is then delivered to the user. The previously used contexts may also be stored in-memory (for example, a cache) for faster and more accurate processing times.

For the generation phase, the Hybrid-RAG utilizes an ensemble of LLMs or h-LLMs 5436, each specialized for different tasks. These may include models optimized for question-answering, code generation, image interpretation, audio transcription, and video analysis, among others. This multi-faceted approach allows Hybrid-RAG to not only process a wide range of input types but also to generate appropriate and context-aware multi-modal outputs.

The Hybrid-RAG system addresses limitations of traditional RAG systems by utilizing the most appropriate database(s) for each data type and query scenario. Hybrid-RAG enables multi-modal data processing and generation, thus providing more comprehensive and accurate responses through the integration of multiple data sources and LLMs.

Figure 57:
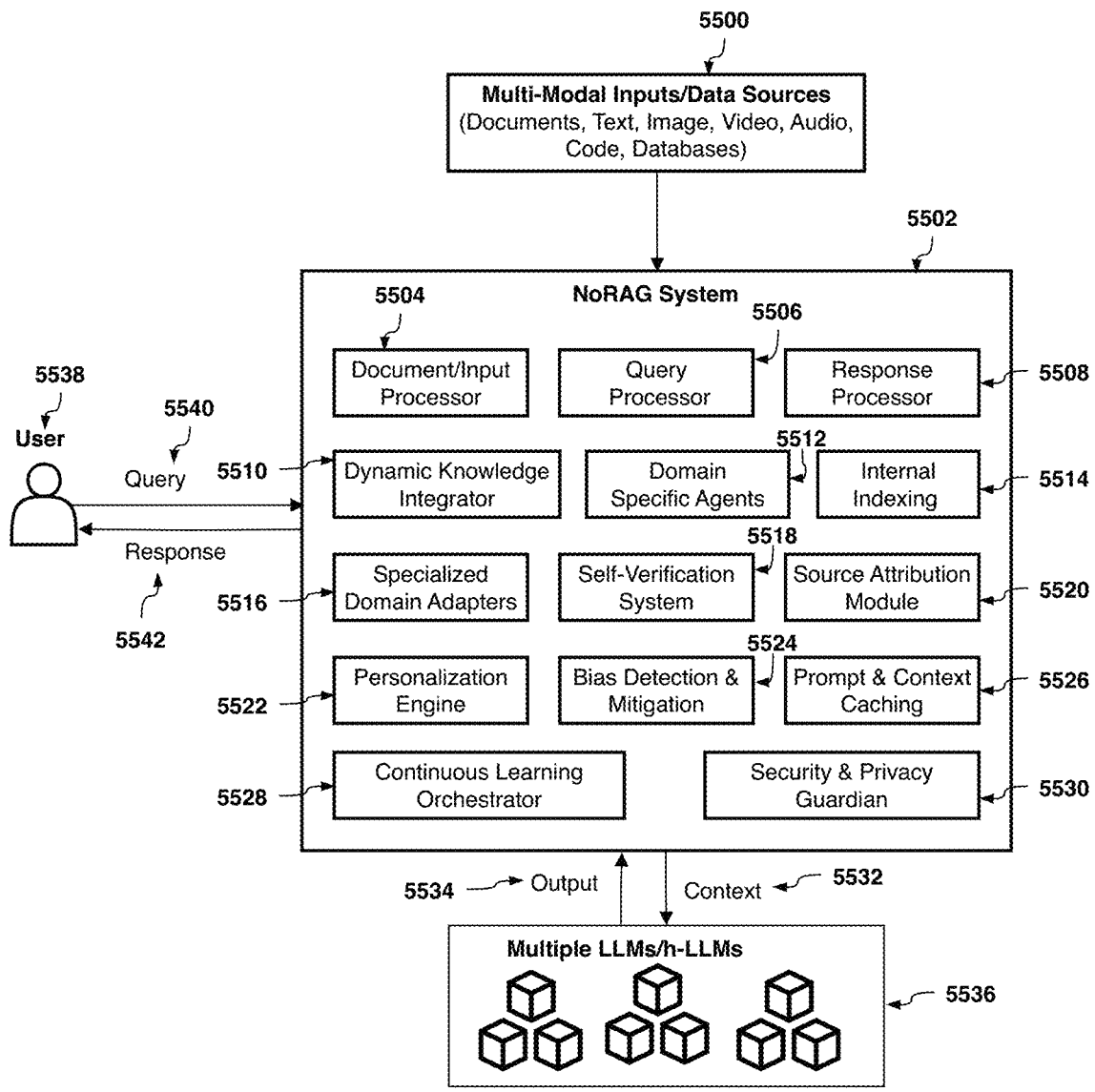
FIG. 57 is an illustration of an architecture of a NoRAG system according to an embodiment of the invention.

Referring now to FIG. 57, an illustration of an architecture of a NoRAG system according to an embodiment of the invention is described in more detail. LLMs face limitations in accessing current information, maintaining factual accuracy, and providing transparent, attributable responses. RAG systems address these limitations of LLMs. RAG is useful for tasks requiring current or specialized knowledge, as it allows language models to draw upon external, updatable sources of information. However, RAG often introduces complexities in implementation and maintenance. Users may, depending on their design options, have to address complexities of chunking, embedding, indexing documents, maintaining vector databases, for instance. NoRAG system provides an approach to enhance LLMs without the need for RAG systems, hence the name NoRAG. By integrating functionalities directly in a plug-in manner into the LLM architecture, in some embodiments as a license-able plugin to LLMs, NoRAG offers improved performance, reduced complexity, and enhanced user experience compared to traditional RAG systems.

The NoRAG system begins with ingesting multi-modal data 5500, which may include text, documents, images, audio, video, code, and other data types. The NoRAG system 5502 comprises several modules, each designed to perform specific functions in the overall process of enhancing LLM capabilities.

The NoRAG system comprises a Document/Input Processor 5504 module.

The Input Processor module 5504 is responsible for processing input documents and data sources. It handles various file formats, extracts relevant information, and prepares the data for integration into the NoRAG system.

The NoRAG system further comprises a Query Processor module 5506: The Query Processor module 5506 handles user queries, performing sophisticated analysis to improve them for the LLM 5536. It breaks down complex queries into manageable parts and generates derived queries when necessary.

The NoRAG system further comprises a Response Processor module 5508.

The Response Processor module 5508 performs post-processing on the LLM's 5536 output 5534 before sending it to the user. This module refines the generated content, ensures coherence, and applies any necessary formatting or style adjustments to enhance the quality and relevance of the final response.

The NoRAG system further comprises Dynamic Knowledge Integrator component 5510. The Dynamic Knowledge Integrator component 5510 interfaces directly with the LLM 5536, providing relevant information during the generation process. It acts as a bridge between the LLM's 5536 inherent knowledge and the additional information processed by the NoRAG system, improving integration of external knowledge into the LLM's 5536 responses 5534.

The NoRAG system further comprises a Domain Specific Agents module 5512: The Domain Specific Agents module 5512 comprises several domain specific agents which retrieve appropriate specialized knowledge on the query context (e.g. web search agent, stock market agent, weather data agent, IoT data, etc). It enables the NoRAG system to adapt its responses to specific domains, improving accuracy and relevance in specialized fields.

The NoRAG system further comprises an Internal Indexing module 5514. The Internal Indexing module 5514 utilizes a combination of diverse database types, including, but not limited, to vector databases, graph databases, document databases, time-series databases, full-text search engines, in-memory databases, object databases, spatial databases, SQL databases, NoSQL databases, and column databases. This approach ensures efficient indexing and retrieval of information, improving the NoRAG system's performance across various data types and query patterns.

The NoRAG system further comprises Specialized Domain Adapters modules 5516: These plug-in modules 5516 contain specialized knowledge for specific domains. They can be dynamically loaded and unloaded based on the query context, allowing the NoRAG system to provide expert-level responses in various fields without overburdening the core LLM.

The NoRAG system further comprises a Self-Verification system 5518. The Self-Verification system 5518 checks facts and reduces hallucinations in the LLM's 5536 outputs 5534. It employs internal consistency checks and compares generated content against the system's knowledge base to ensure accuracy and reliability in the responses.

The NoRAG system further comprises a Source Attribution module 5520: The Source Attribution module 5520 tracks and cites internal knowledge sources used in generating responses. It enhances the transparency and credibility of the NoRAG system's outputs by providing citations for the information used.

The NoRAG system further comprises a Personalization Engine 5522. The Personalization Engine 5522 adapts responses 5542 based on user preferences and interaction history. It maintains user profiles and adjusts the system's outputs to match individual user needs, enhancing the relevance and usefulness of the responses. This module may optionally inject advertisements in responses based on the user's subscription tier or preferences or queries sent to the user 5538 by the LLM 5536 to identify the user's attitudes, intentions, and predict behavior and future actions.

The NoRAG system further comprises a Bias Detection & Mitigation module 5524. The Bias Detection & Mitigation module 5524 identifies potential biases in the NoRAG system's responses and works to balance them. It employs advanced algorithms to recognize various types of bias and adjusts the output to provide more neutral and fair responses.

The NoRAG system further comprises a Prompt, Derived Prompts, and Context Caching module 5526: This module 5526 caches user queries, derived prompts, and the relevant context used (including previously used contexts) that may be used to generate responses. By storing this contextual information for in-memory processing, the NoRAG system can improve response times for similar queries and maintain consistency in its outputs over time.

The NoRAG system further comprises a Continuous Learning Orchestrator 5528: The Continuous Learning Orchestrator 5528 manages the ongoing learning process of the model. It identifies knowledge gaps, prioritizes learning objectives, and coordinates the integration of new information across all modules, ensuring that the NoRAG system remains up-to-date and continues to improve over time.

The NoRAG system further comprises a Security and Privacy Guardian module 5530: The Security and Privacy Guardian module 5530 ensures data privacy and security in knowledge storage and retrieval. Privacy and security guardrails are implemented to filter sensitive data in the query and responses (such as personally identifiable information (PII)).

When a user 5538 submits a query 5540, the NoRAG system processes the query and generates a relevant context 5532 which is passed to one or more LLMs or h-LLMs 5536. NoRAG utilizes an ensemble of LLMs or h-LLMs 5536, each specialized for different tasks. These may include models optimized for question-answering, code generation, image interpretation, audio transcription, and video analysis, among others. The processed response 5542 is then returned to the user.

The NoRAG plug-in and/or integrated LLM system may provide several advantages over traditional RAG approaches:
1. Reduced Complexity: By integrating functionalities directly into the LLM architecture, the NoRAG system eliminates the need for external retrieval systems, simplifying implementation and maintenance. The NoRAG system works like a plugin system enhancing the capabilities of an LLM.
2. Improved Performance: The tight integration of agents, domain adapters, knowledge and processing modules allows for faster response times and more coherent outputs.
3. Enhanced Customization: The modular architecture of the NoRAG system allows for easy addition or modification of specialized knowledge domains without requiring changes to the core LLM.
4. Improved Privacy and Security: By internalizing data storage and retrieval, the NoRAG system provides improved control over sensitive information and reduces potential vulnerabilities associated with external data sources.
5. Seamless Updates: The Continuous Learning Orchestrator module 5528 enables the NoRAG system to incorporate new information more efficiently than traditional RAG systems, which often require separate update processes for external knowledge bases.
6. Use in Network of LLM Agents: The NoRAG plug-in module can be used as a series or parallel network when connected to LLMs that operate as a network of LLM agents performing specialized tasks in a coordinated sequence (managed by AI brokers or LLMs, for example). Each specialized LLM agent may use a different NoRAG plugin, and NoRAG plugins may be mapped to different LLMs, depending on the type of task being done. A library of NoRAG modules may be developed in a generic manner and also with a target LLM family as an objective, and NoRAG modules for billing, advertisement generation, fault-tolerance, and security may also be added on in a plug-in manner.

Figure 58:
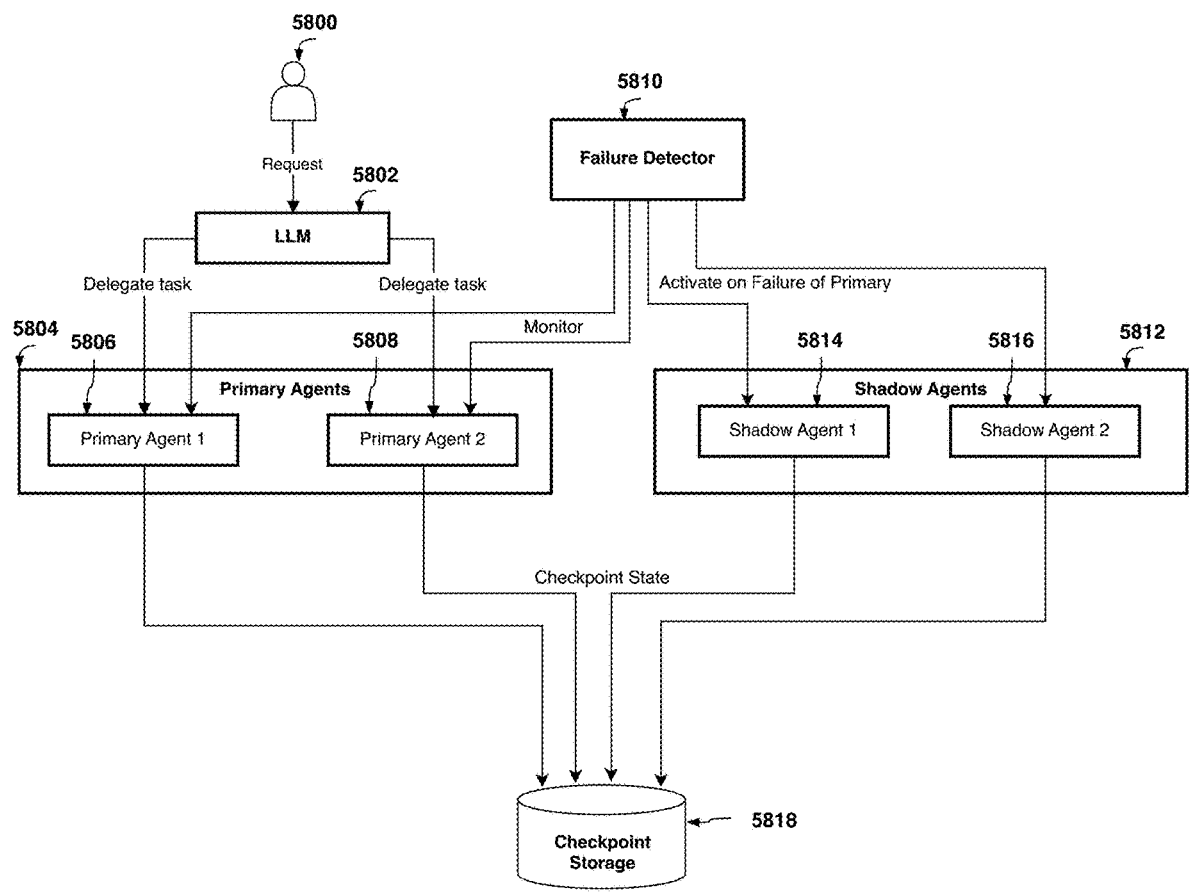
FIG. 58 is an illustration of the use of shadow agents for fault tolerance, according to an embodiment of the invention.

Referring now to FIG. 58, an illustration of the use of Shadow Agents for fault tolerance is described in more detail. The system comprises a Large Language Model (LLM) 5802 which receives requests from a User 5800 and delegates tasks to Primary Agents 5804 (5806, 5808). For each Primary Agent 5806, 5808, a corresponding Shadow Agent 5814, 5816 is created to mirror the state of the Primary Agent (5806, 5808). A Failure Detector 5810 continuously monitors the Primary Agents. In the event of a Primary Agent 5804 failure, the Failure Detector 5810 activates the corresponding Shadow Agent 5812. The activated Shadow Agent 5812 then takes over the role of the failed Primary Agent 5804, ensuring continuity of system operation. Primary Agents 5804 periodically checkpoint their state to a Checkpoint Storage 5818. This checkpointing ensures that Shadow Agents 5812 can fetch the up-to-date representation of the Primary Agents' 5804 states from the checkpoint storage 5818, allowing for seamless transition in case of failure. The system thus provides redundancy through Shadow Agents 5812, continuous monitoring via the Failure Detector 5810, state preservation through regular checkpointing to Checkpoint Store 5818, and seamless transition capabilities, all contributing to a robust fault-tolerant architecture.

Figure 59:
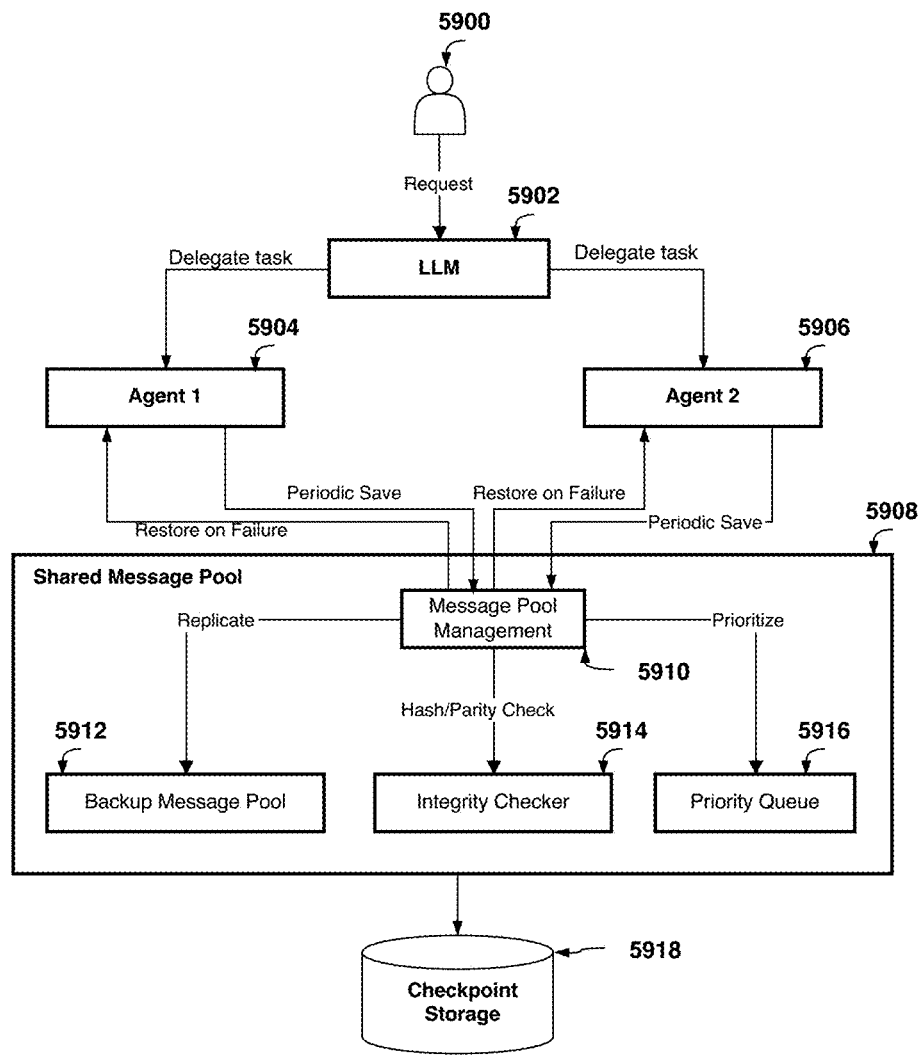
FIG. 59 is an illustration of a checkpointing, state saving, and message pool management for fault tolerance in agents, according to an embodiment of the invention.

Referring now to FIG. 59, an illustration of the Checkpointing, State Saving, and Message Pool Management for fault tolerance in agents is described in more detail. The User 5900 sends requests to a large language model 5902, which delegates tasks to agents 5904, 5906. The agents 5904, 5906 interact with a shared message pool 5908. Each Agent Process periodically saves its state to the message pool 5908. Checkpoint Storage 5918 serves as a central repository for agent states and can restore an agent's state in case of failure. The Shared Message Pool 5908 serves as the communication medium between the agents 5904, 5906. It incorporates several management features that may be managed by a message pool management module 5910 to ensure fault tolerance and efficient operation such as:
1. Replication to a Backup Message Pool 5912 for redundancy;
2. Integrity checking using a dedicated Integrity Checker 5914, which employs hash or parity bit mechanisms; and
3. A Priority Queue 5916 for message prioritization, ensuring critical or time-sensitive messages are handled promptly.

Agents read from and write to the Shared Message Pool 5908. In the event of agent failure, the system can restore the agent's state from the Checkpoint Storage 5918 via the Shared Message Pool 5908, ensuring minimal disruption to overall system operation. This architecture provides robust fault tolerance through state preservation, redundant and integrity-checked communication, and efficient message handling.

Figure 60:
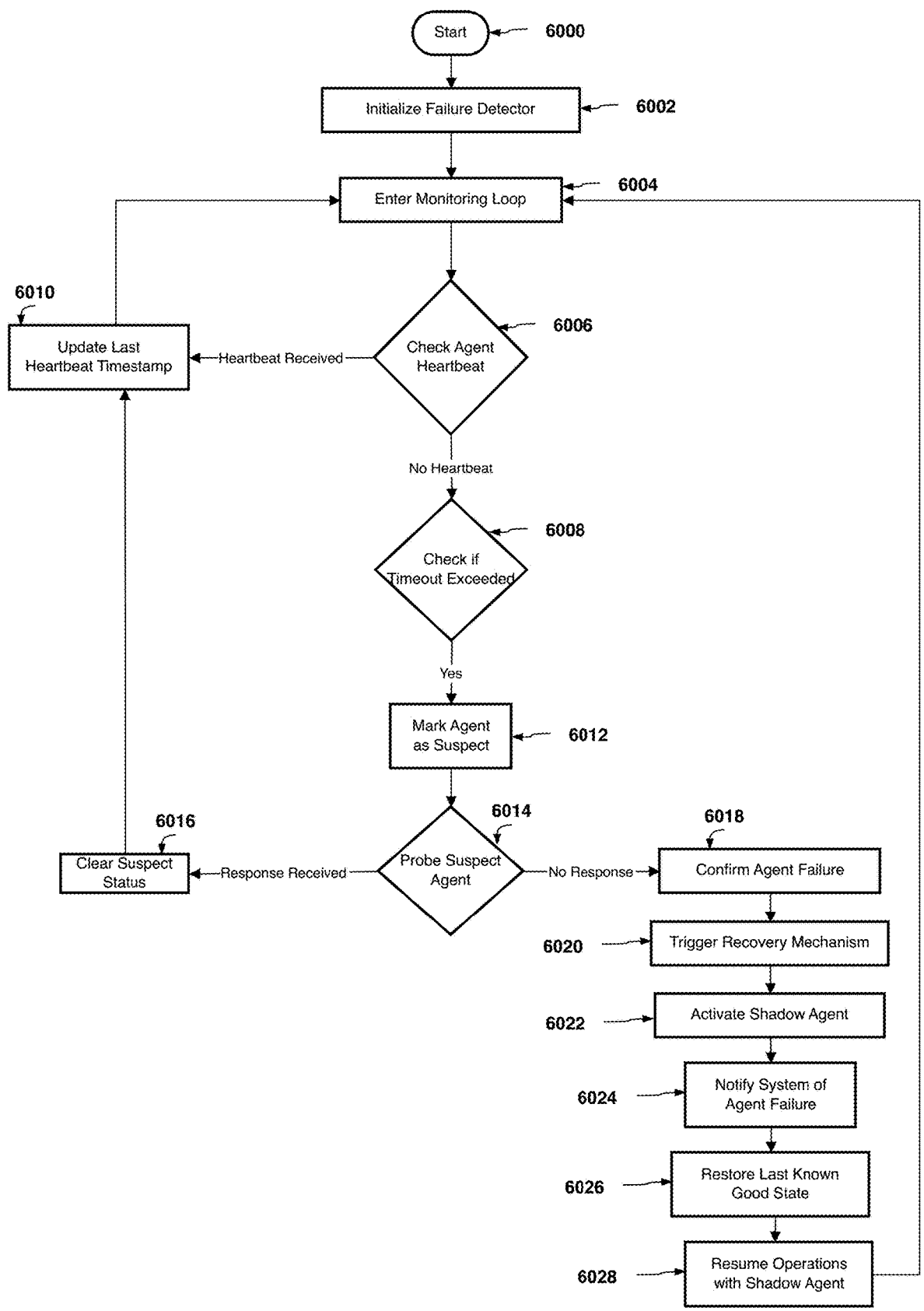
FIG. 60 is a flowchart illustrating a method of a failure detection algorithm for fault tolerance in agents, according to an embodiment of the invention.

Referring now to FIG. 60, an illustration of a flow chart of a Failure Detection Algorithm for fault tolerance in agents is described in more detail. The algorithm begins 6000 with the initialization of the Failure Detector 6002. It then enters a continuous monitoring loop 6004, where it regularly checks for heartbeats from each agent 6006. If a heartbeat is received, the last heartbeat timestamp for that agent is updated 6010, and the loop continues. If no heartbeat is received, the system checks if a predefined timeout threshold has been exceeded 6008. If the timeout exceeds, the agent is marked as a suspect 6012. The system then probes the suspect agent directly 6014. If a response is received from the probe, the suspect status is cleared from the agent 6016, and the system returns to the monitoring loop. If no response is received from the probe, the agent failure is confirmed 6018. This triggers a series of recovery actions:

1. The recovery mechanism is activated 6020;
2. A shadow agent is activated to take over the failed agent's responsibilities 6022;
3. The system is notified of the agent failure 6024;
4. The last known good state of the failed agent is restored 6026; and
5. Operations resume with the newly activated shadow agent 6028.

Following these recovery actions, the system returns to the monitoring loop 6004, now including the newly activated shadow agent in its monitoring activities. This algorithm provides a robust approach to maintaining system reliability in a multi-agent environment. It allows for quick detection of failures, seamless transition to backup agents, and ensures continuous operation of the system, thus providing a high degree of fault tolerance.

Figure 61:
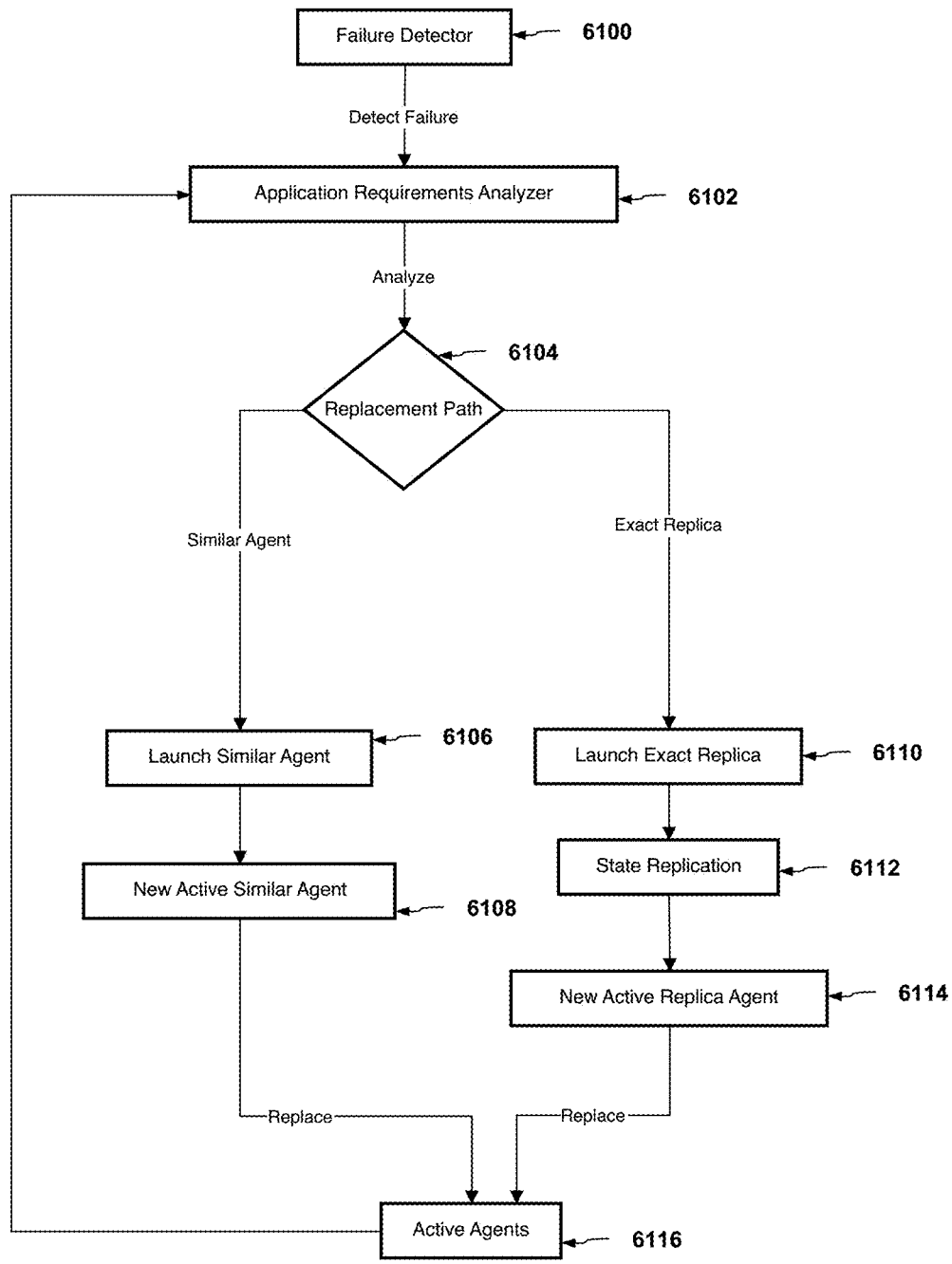
FIG. 61 is a flow chart illustrating a method of a flexible agent replacement mechanism for fault tolerance in a multi-agent system, according to an embodiment of the invention.

Referring now to FIG. 61, an illustration of the Flexible Agent Replacement mechanism for fault tolerance in a multi-agent system is described in more detail. A Failure Detector 6100 continuously monitors the Active Agents 6116 for any signs of failure or degradation. Upon detection of a failure in an Active Agent 6116, the system initiates the Flexible Agent Replacement process 6104. This process involves two possible paths:

1. Similar/LesserDegree of Similarity Agent Replacement 6106: In this path, the system launches a new agent from the Replacement Agent pool that performs similar functions and/or has a relatively lesser degree of similarity to the failed agent, but is not necessarily an exact replica. This new agent 6108 takes over the general responsibilities of the failed agent.
2. Exact Replica/GreaterDegree of Similarity Agent Replication 6110: For applications requiring strict state preservation or comparatively greater similarity between the agent and the replicated agent, this path involves launching a new agent that is an exact replica or a replication with a relatively greater degree of similarity of the failed agent. This is achieved through the use of a State Replication mechanism 6112, which ensures the new agent 6114 has the same state and knowledge as the failed agent at the time of its last checkpoint.

The choice between these two paths is determined by an Application Requirements Analyzer 6102, which assesses the specific needs of the current application or task. This Flexible Agent Replacement mechanism allows the system to maintain operational continuity while adapting to different application requirements, thus providing a versatile approach to fault tolerance. Regardless of which path is taken, the agent generated thereby is added to the active agents 6116. The Application Requirements Analyzer 6102 continues monitoring the active agents for any subsequent failures.

Figure 62:
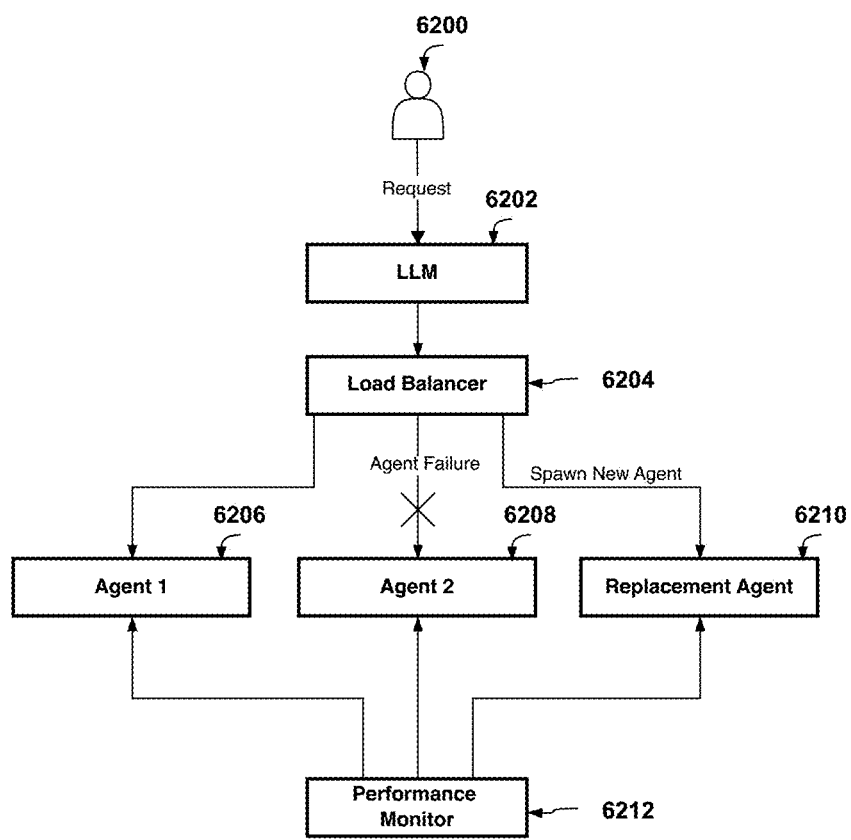
FIG. 62 is an illustration of the soft failure handling mechanism in a fault-tolerant agent system, according to an embodiment of the invention.

Referring now to FIG. 62, an illustration of a soft failure handling mechanism in a fault-tolerant agent system is described in more detail. The system comprises multiple Agent Processes (6206, 6208) managed by a Load Balancer 6204. A Performance Monitor 6212 continuously tracks the performance metrics of each agent, including response times, task completion rates, and resource utilization. When the Performance Monitor 6212 detects a soft failure condition, such as missed deadlines or performance degradation due to overload, it triggers the soft failure handling mechanism. This mechanism involves several steps:

1. Load Redistribution: The Load Balancer 6204 reassigns tasks from the overloaded agent 6208 to other available agents 6206, helping to alleviate the immediate performance issues;
2. Resource Allocation: Additional computational resources are allocated to the affected agent if available, potentially resolving resource-related performance issues;
3. Agent Scaling: If the overload persists, new agents are spawned 6210 from an Agent Template to share the workload. These new agents 6210 are added to the active agent pool and begin processing tasks; and
4. Gradual Recovery: As the system stabilizes, the Performance Monitor 6212 continues to track metrics, gradually returning to normal operation as performance improves.

This soft failure handling mechanism allows the system to address performance issues and overload scenarios without complete agent failure, maintaining system stability and ensuring continuous operation.

Figure 63:
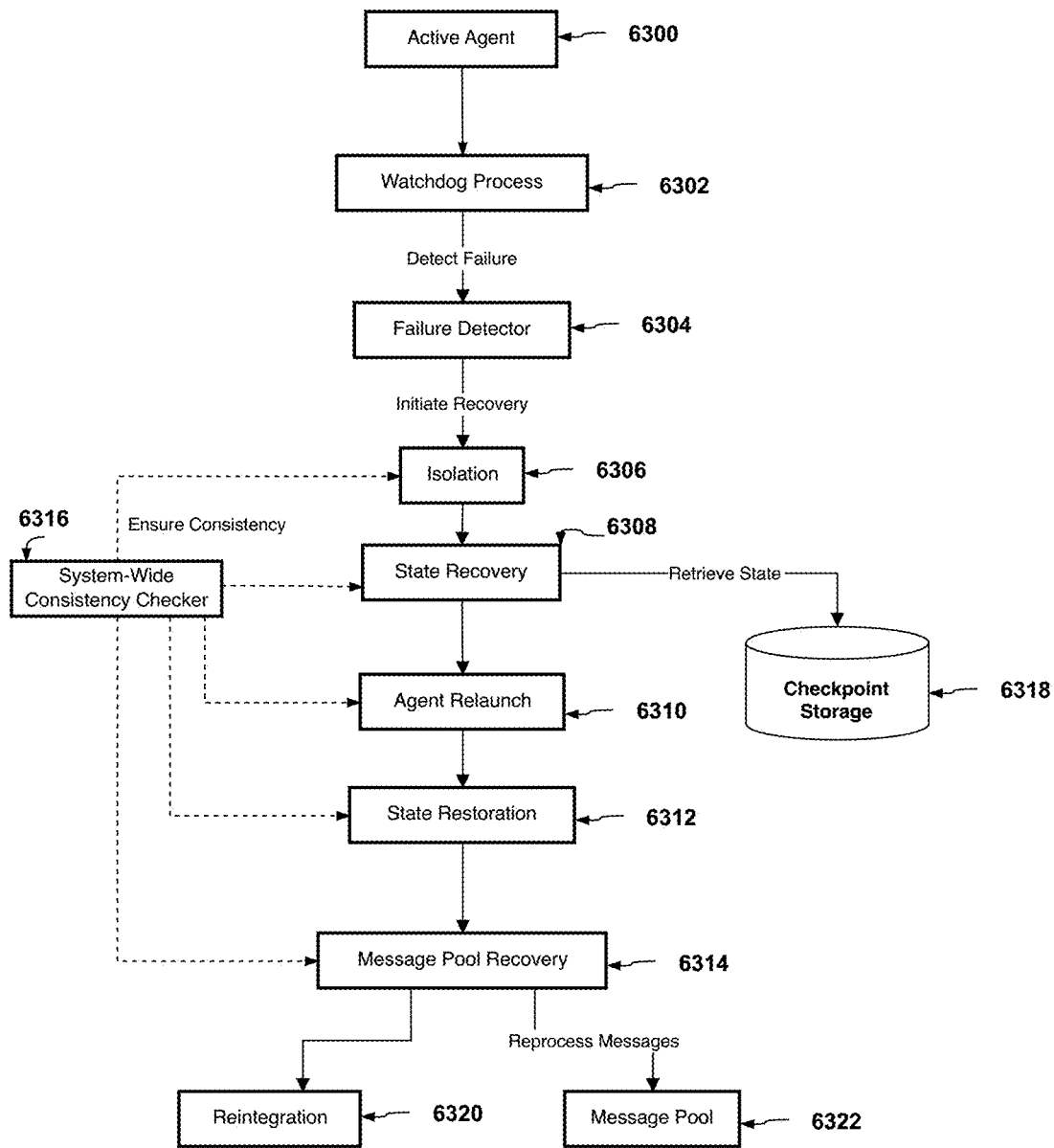
FIG. 63 is a flow chart illustrating a method of hard failure handling mechanism in a fault-tolerant agent system, according to an embodiment of the invention.

Referring now to FIG. 63, an illustration of a hard failure handling mechanism in a fault-tolerant agent system is described in more detail. The system comprises one or more Active Agents (6300), each with an associated Watchdog Process (6302). A Failure Detector 6304 oversees the entire system. In some embodiments, a Message Pool 6322 facilitates communication between agents. In other embodiments, an API service mesh that allows inter-agent communication may be employed.

When a hard failure occurs, such as an agent process termination or complete loss of communication, the following steps are initiated:

1. Failure Detection 6304: The Watchdog Process 6302 associated with the failed agent detects the failure and alerts the central Failure Detector 6304;
2. Isolation 6306: The failed agent is immediately isolated from the system to prevent cascading failures or corruption of the Message Pool 6322;
3. State Recovery 6308: The last known good state of the failed agent is retrieved from a Checkpoint Storage 6318;
4. Agent Relaunch 6310: A new agent process is launched, either as an exact replica of the failed agent or as a similar agent with comparable capabilities, depending on system requirements;
5. State Restoration 6312: The recovered state is applied to the newly launched agent, bringing it up to date with the system's current state;
6. Message Pool Recovery 6314: Any pending messages in the Message Pool associated with the failed agent are reprocessed or redirected to the new agent as appropriate. Alternatively, an API gateway and/or API service mesh may be provided for exchange of messages between the agents and/or a message storage database (See solo.io/topics/service-mesh/service-mesh-vs-api-gateway/to see how these terms may be described, the content of which is incorporated in its entirely by reference except to the extent disclosure therein is inconsistent with disclosure herein).
and
7. System Reintegration 6320: The new agent is reintegrated into the active system, resuming the tasks of the failed agent.

Throughout this process, a System-Wide Consistency Checker 6316 ensures that the overall system state remains consistent and that no critical information or tasks are lost during the transition. This Hard failure handling mechanism enables the system to recover from severe failures, maintaining data integrity and operational continuity even in the face of complete agent failures.

Figure 64:
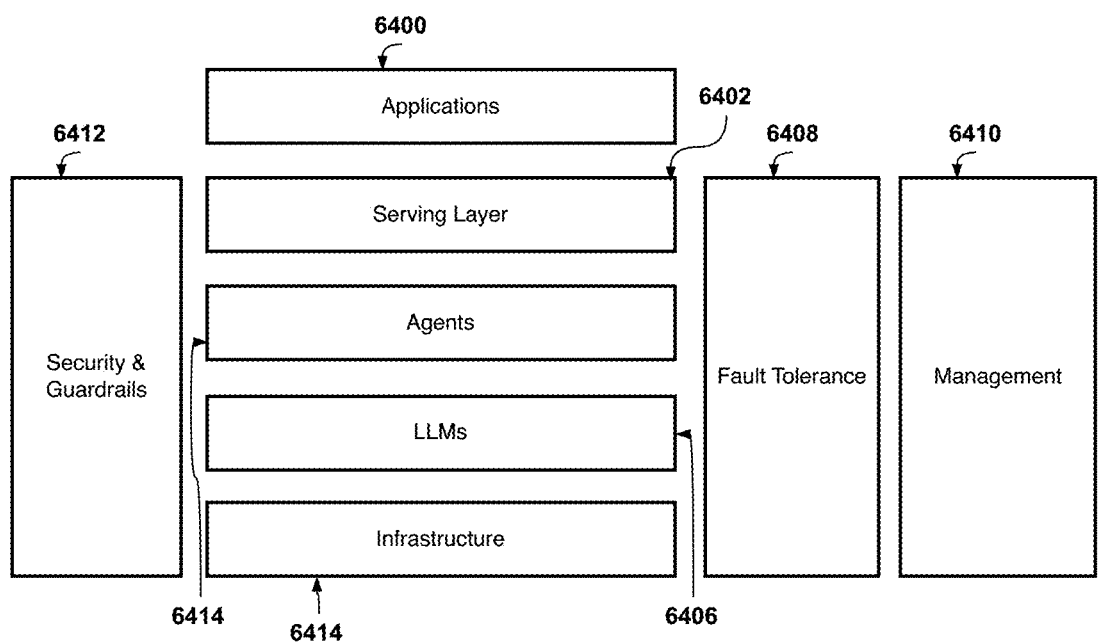
FIG. 64 is an illustration of Generative AI Agent Stack (AGES), according to an embodiment of the invention.

Referring now to FIG. 64, an illustration of generative AI Agent Stack (AGES) is described in more detail. AGES is designed to provide a generative AI stack for fault-tolerant agents. AGES comprises the following layers:

1. Application Layer 6400: This is the topmost layer where the end-user applications and interfaces reside. It is where the fault-tolerant agents are integrated into specific use cases or products.
2. Serving Layer 6402: This layer is responsible for deploying and serving the agents and models. It includes API endpoints for agent interactions, scaling mechanisms to handle varying loads, request routing and load distribution.
3. Agent Layer 6404: This layer contains the individual agents, including primary agents and shadow agents. It manages agent interactions, task delegation, and coordination between agents.
4. LLM Layer 6406: This layer comprises the Large Language Models that power the agents. It includes model inference, fine-tuning capabilities, and potentially multiple LLM options for different agent roles.
5. Fault Tolerance Layer 6408: This layer implements the fault tolerance mechanisms. It includes mechanisms like shadow agent management, checkpointing and state saving, failure detection algorithms, and message pool replication and management.
6. Management Layer 6410: This layer oversees the entire system. It handles agent lifecycle management (spawning, termination), load balancing and resource allocation, system monitoring and logging, and configuration management.
7. Security & Guardrails Layer 6412: This layer ensures the security and integrity of the entire system. It includes authentication and authorization mechanisms, encryption for data in transit and at rest, secure message passing between agents, and integrity checks for message pools and checkpoints. Guardrails and filters are included to ensure the generated results are safe, relevant, and align with predefined criteria.
8. Infrastructure Layer 6414: This is the foundation layer that provides the computational resources and storage. It includes cloud or on-premises servers, GPUs/TPUs for model inference, distributed storage systems for message pools and checkpoints, networking infrastructure, and blockchain network(s).

AGES incorporates architectural patterns and technologies similar in some ways, and different in other significant ways, to those used in Microservices, Containers, Service Meshes, Functions-as-a-Service (FaaS), and Blockchain to enhance the scalability, flexibility, trust, auditability, resilience, and manageability of agents and agentic applications, described as follows:

1. Microservices: Microservices architecture is applied across multiple layers (Agent, LLM, Fault Tolerance, Management, and Serving). Each agent, LLM instance, or specific functionality (like failure detection or load balancing) is implemented as a separate microservice using APIs. This allows for better scalability, easier updates, and more flexible deployment options.
2. Containers: Containers (like Docker) are used to package and deploy the specialized h-LLMs/agents. This ensures consistency across development and production environments, simplifies deployment, and enables easy scaling of individual components.
3. Service Mesh: A service mesh (like Istio or Linkerd) is implemented to manage communication (utilizing asynchronous or synchronous or gRPC-like mechanisms) between agents and specialized h-LLMs. It handles service discovery, load balancing, encryption, and provides additional observability and traffic management features.
4. Functions-as-a-Service (FaaS): FaaS are utilized for specific, event-driven tasks within the Agent, LLM, and Fault Tolerance layers. For example, spawning new agents, running inference on LLMs, or executing fault tolerance checks are implemented as serverless functions.
5. Orchestration: Orchestration tools and frameworks are used to manage the containers, service mesh, and FaaS components. It includes tools like Kubernetes for container orchestration, which handles scaling, load balancing, and self-healing of the containerized microservices that house these specialized agents.
6. Blockchain: Blockchain technology is leveraged to enhance AGES by providing a secure, transparent, and decentralized infrastructure for agent interactions and system management. A Blockchain network (as part of the infrastructure layer) enables decentralized identity management, smart contracts for agent governance, immutable audit trails, and tokenization of compute resources. This integration improves security through cryptographic mechanisms, enhances fault tolerance with distributed checkpointing, and enables transparent resource allocation and reputation systems for agents.
7. Agent-as-Code: AGES leverages a novel Agent-as-Code (AaC) model enabling automated deployment, scaling, and lifecycle management of agents. The AaC model introduces a declarative approach to defining and managing AI agents within the AGES framework. The AaC model allows developers to specify agent characteristics, behaviors, and interactions using a domain-specific language or configuration files. These definitions encompass the agent's cognitive architecture, learning parameters, API endpoints, and inter-agent communication protocols. By versioning these agent definitions in code repositories, teams can track changes, collaborate effectively, and ensure reproducibility across environments. This methodology facilitates rapid prototyping, easier testing, and more efficient updates to agent systems, while maintaining consistency and reducing manual configuration errors.

The term "agent" as used throughout this specification should be interpreted broadly to encompass a wide range of specialized h-LLMs applications, including use of AI brokers, and implementations and functionalities that can generate and/or use the "derived tasks" and "relevant context" of our inventive methods and systems. An agent may refer to but is not limited to: specialized autonomous or semi-autonomous software entities, AI-driven assistants, task-specific modules, multi-agent systems, language models with specialized capabilities, code interpreters, workflow automation tools, chatbots, virtual developers, research assistants, data analyzers, code generators, testing tools, or any combination thereof. Agents may operate independently or as part of a larger system, may be domain-specific and may utilize various specialized LLM technologies. The specific implementation, architecture, or capabilities of an agent or AI broker should not be construed as limiting the scope of the present invention. Agents may evolve, adapt, or be repurposed over time, and may incorporate new technologies or methodologies as they emerge. The term "agent"

also extends to systems that manage, coordinate, or facilitate the operation of multiple sub-agents or agent components.

Figure 65:
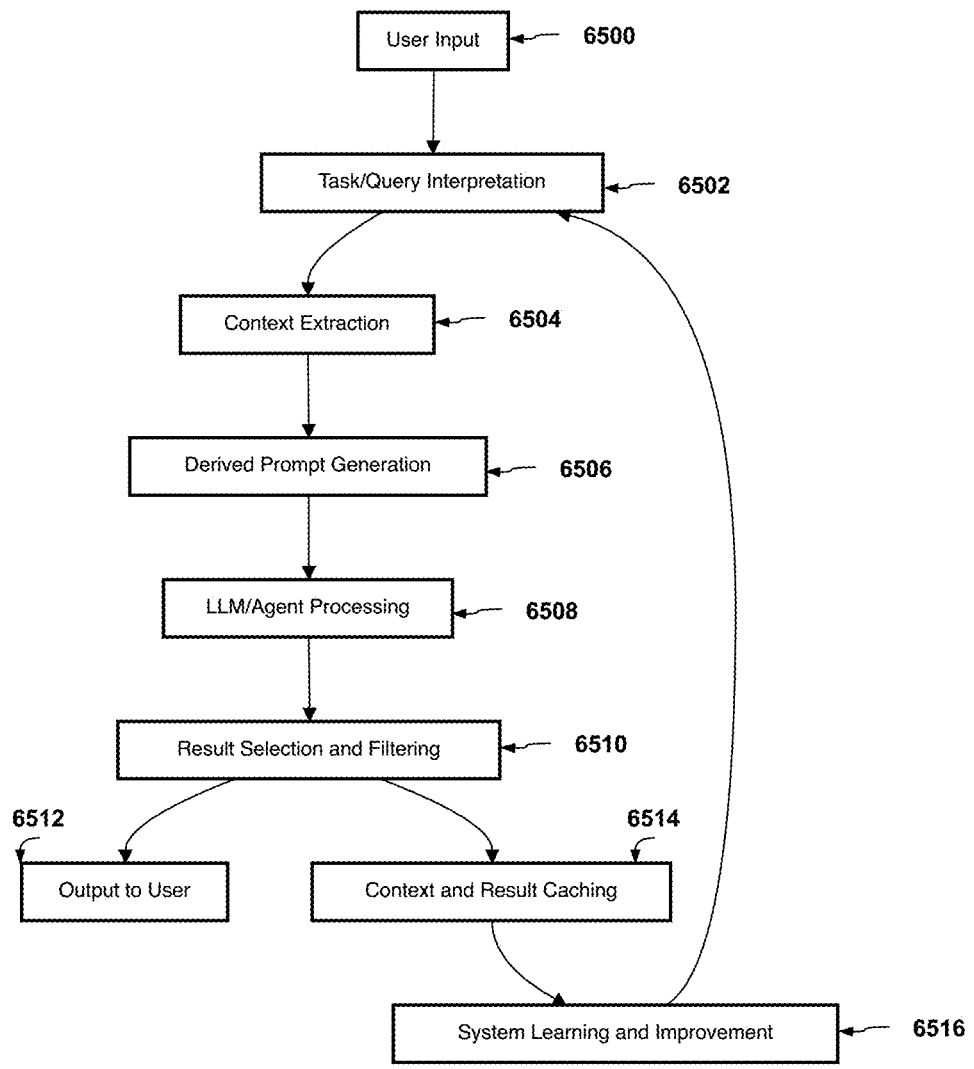
FIG. 65 is a flow chart illustrating a method of a Language Adaptive AI Processing (LEAP) model, according to an embodiment of the invention.

Referring now to FIG. 65, an illustration of Language Adaptive AI Processing (LEAP) model is described in more detail. LEAP is a new computing model that represents a significant departure from traditional computing paradigms such as ETL (Extract, Transform, Load), and instruction-set architectures like MIPS or RISC.

A method of a LEAP model comprises the following steps:
1. User Input 6500: Unlike traditional systems where inputs need to be precisely formatted, LEAP allows for natural language inputs. Users can directly express their needs, tasks, or queries without adhering to strict syntax or command structures.
2. Task and Query Interpretation 6502: The system interprets the user's input, understanding the intent and desired outcome. This step involves natural language understanding and requires context awareness.
3. Context Extraction and Generation 6504: At this step the system gathers relevant information needed to complete the task. It involves tasks such as retrieving information from databases or the internet, analyzing the user's history or preferences, and generating additional context or sub-tasks as needed.
4. Derived Prompt and/or Task Generation 6506: Based on the extracted context, the system may generate more specific or detailed prompts. These derived prompts are designed to elicit the most relevant and accurate responses from the LLM or agents who may in turn generate additional derived tasks or prompts for additional processing, including calling external tools, such as search tools or accessing external content.
5. LLM/Agent Processing 6508: The core computation happens here, where LLMs or specialized AI agents process the prompts, and/or generate derived tasks, and generate results. This step can involve multiple iterations or agent collaborations.
6. Result Selection and Filtering 6510: The system applies guardrails and filters to ensure the generated results are safe, relevant, and align with predefined criteria. This step might involve fact-checking, bias detection, or content moderation. The results can then be output to the user 6512.
7. Context and Result Caching 6514: The system caches both the context and results for future reference.
8. System Learning and Improvement 6516: The cached context and results improve efficiency for similar future queries and allows the system to learn and improve over time.

The benefits of LEAP as compared to traditional computation models includes:
1. Flexibility: Unlike rigid instruction-set architectures (ISA) like MIPS or RISC, LEAP adapts to user needs dynamically, by leveraging application or task specific agents.
2. Natural Interaction: It moves away from command-line interfaces or structured programming to natural language interactions.
3. Contextual Understanding: Unlike the load/store/execute model, LEAP incorporates
4. Continuous Learning: The feedback loop enables ongoing improvement, contrasting with static traditional models.
5. Task-Centric: While ETL focuses on data movement and transformation, LEAP is centered around completing user-defined tasks.
6. Abstraction: LEAP abstracts away low-level computational details, focusing on high-level problem-solving.
7. Improved Performance: The techniques used in the LEAP model lead to improvements in speed, accuracy, capability and automation.

Figure 30:
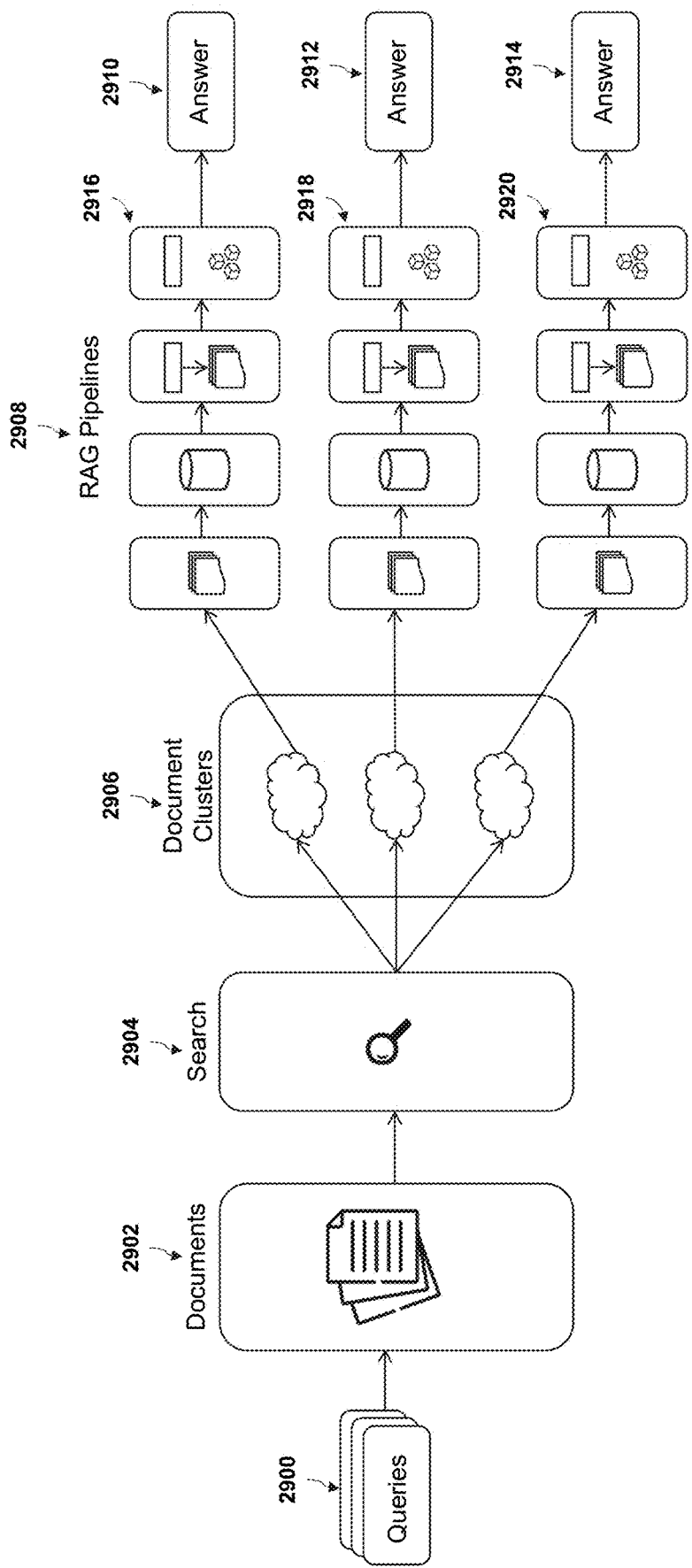
FIG. 30 is an illustration of an approach that uses multiple RAG pipelines with clusters of documents, according to an embodiment of the invention.
Figure 31:
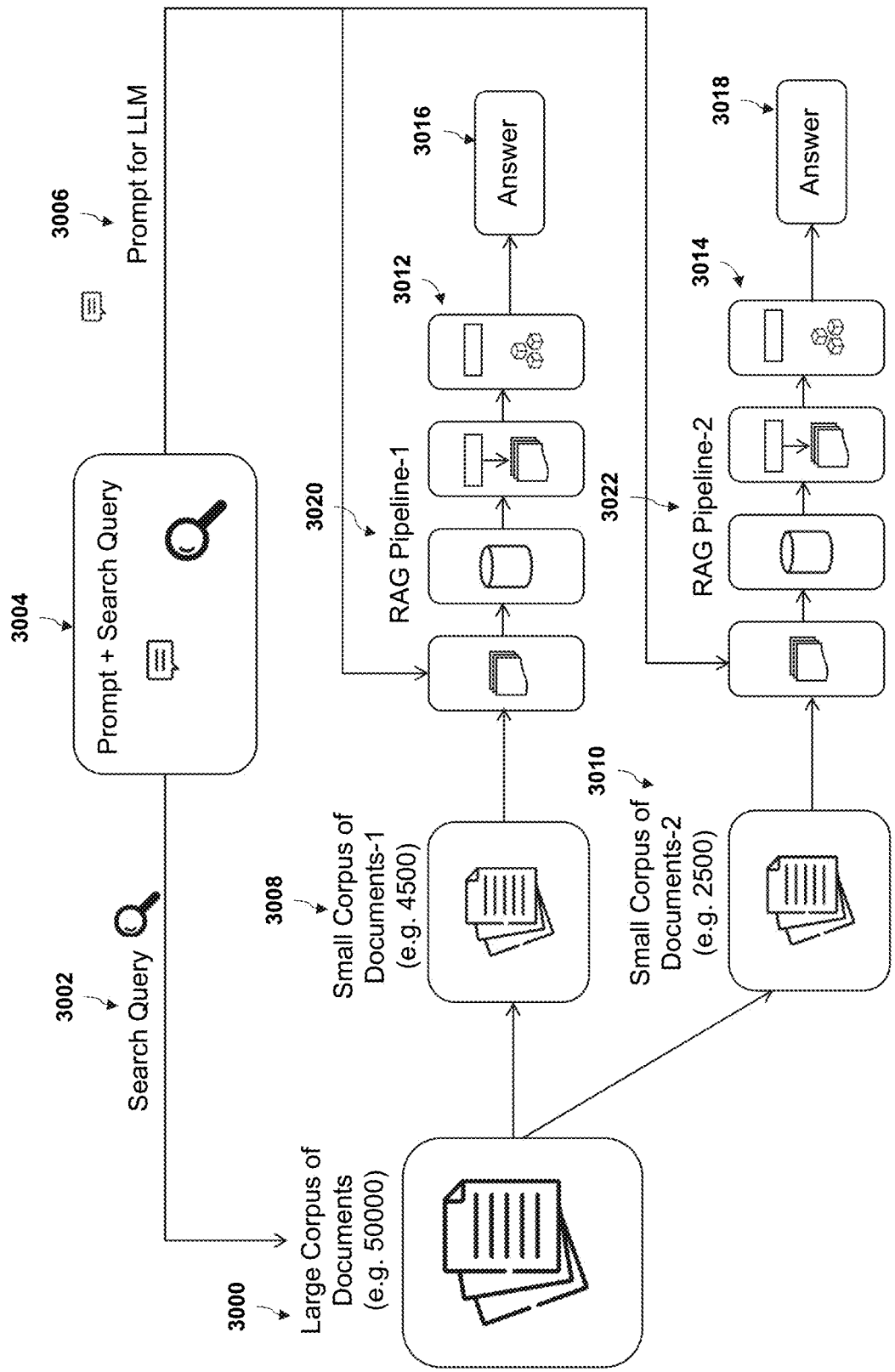
FIG. 31 is an illustration of an approach that uses a prompt augmented with a search query, according to an embodiment of the invention.
Figure 32:
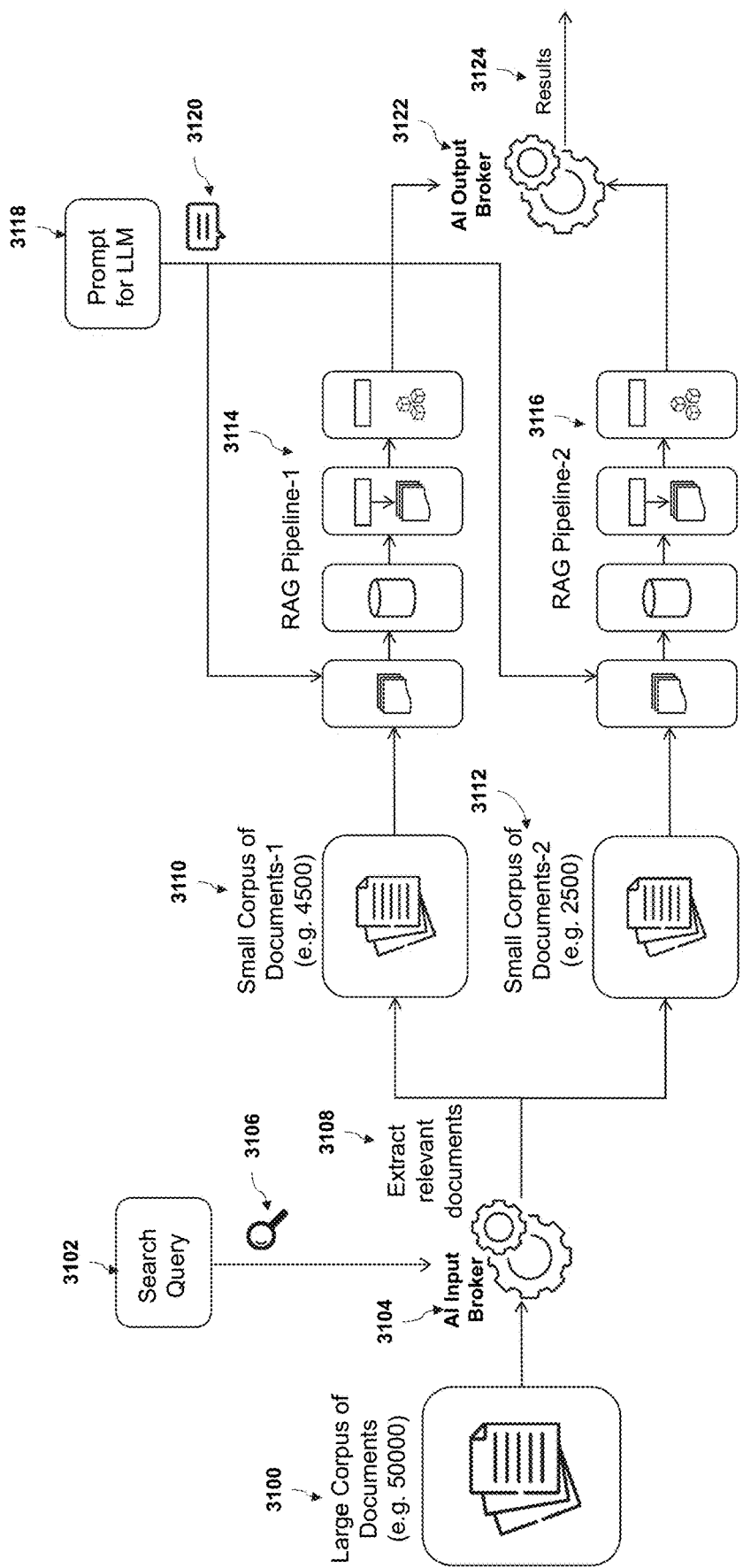
FIG. 32 is an illustration of an approach that uses a search query to extract relevant context for RAG pipelines, according to an embodiment of the invention.
Figure 33:
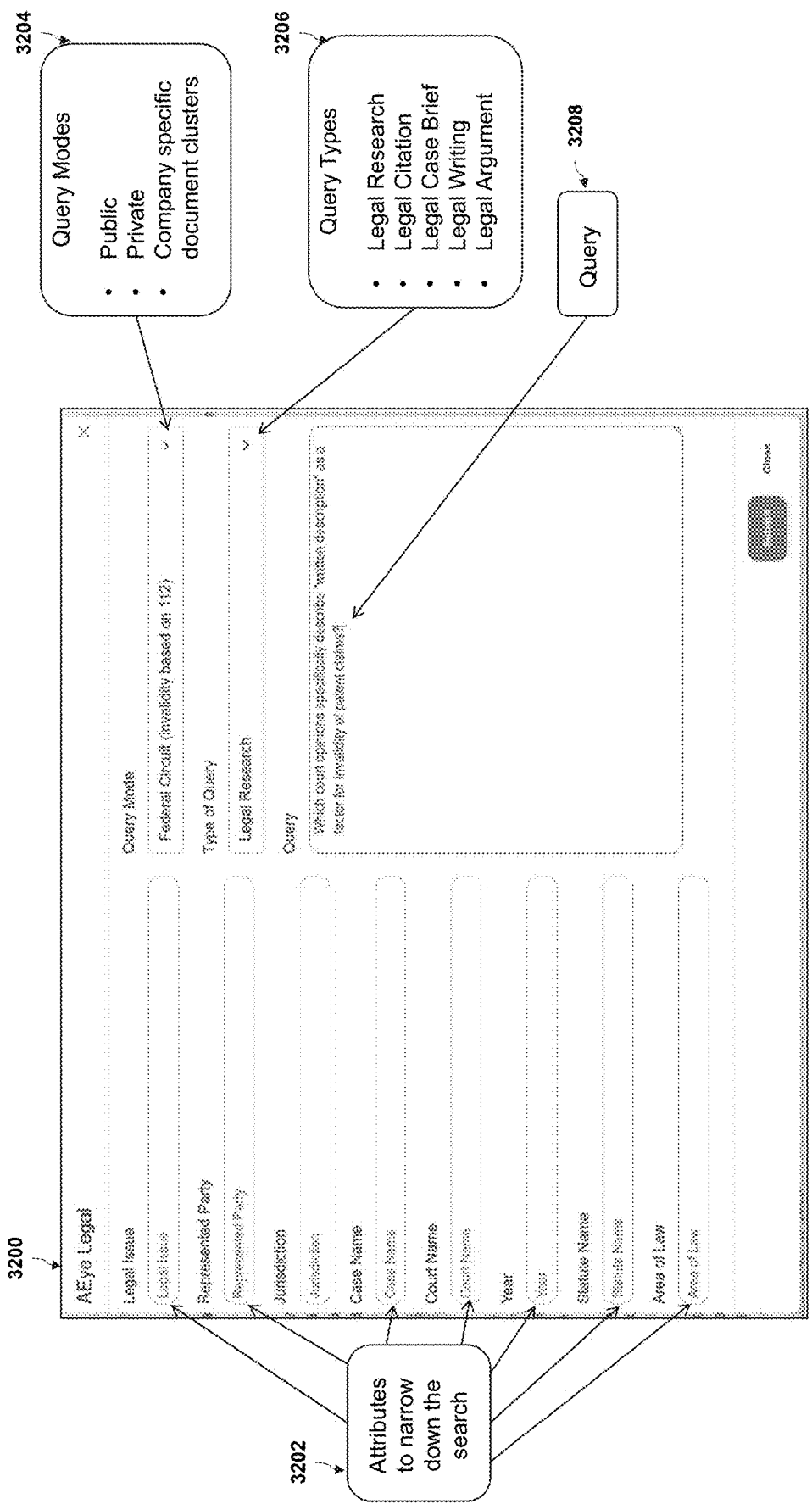
FIG. 33 is an exemplary interface of the CatchUp platform for RAG, according to an embodiment of the invention.
Figure 34:
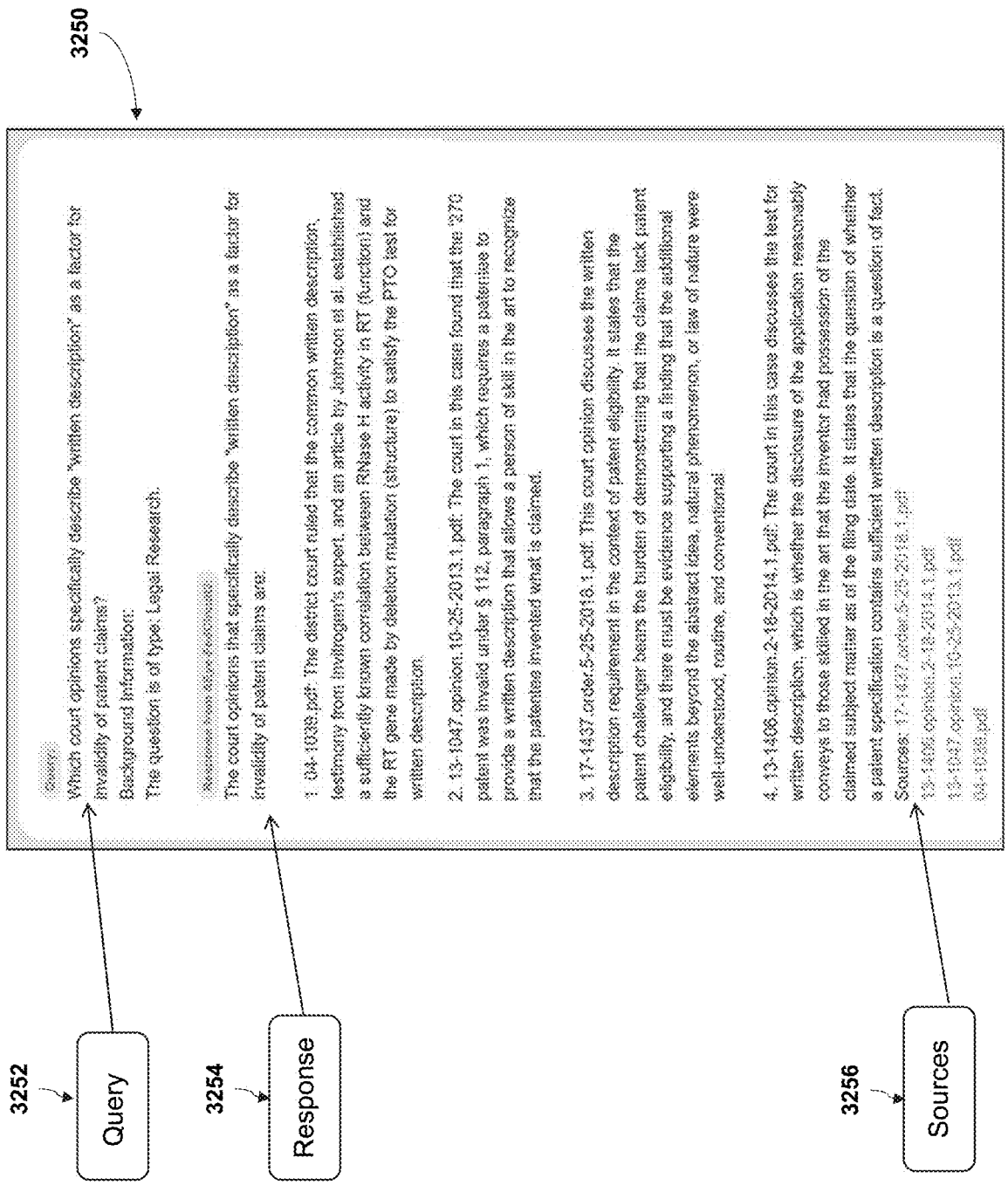
FIG. 34 is an exemplary interface of the CatchUp platform showing response a RAG pipeline, according to an embodiment of the invention.
Figure 35A:
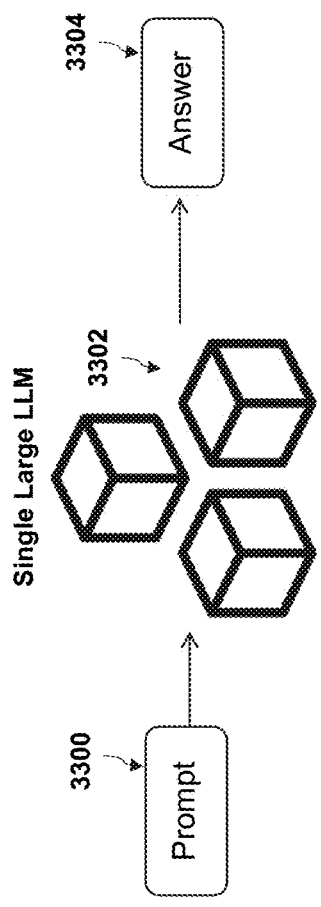
FIG. 35A is an illustration of a prior art embodiments of using a single LLM.
Figure 35B:
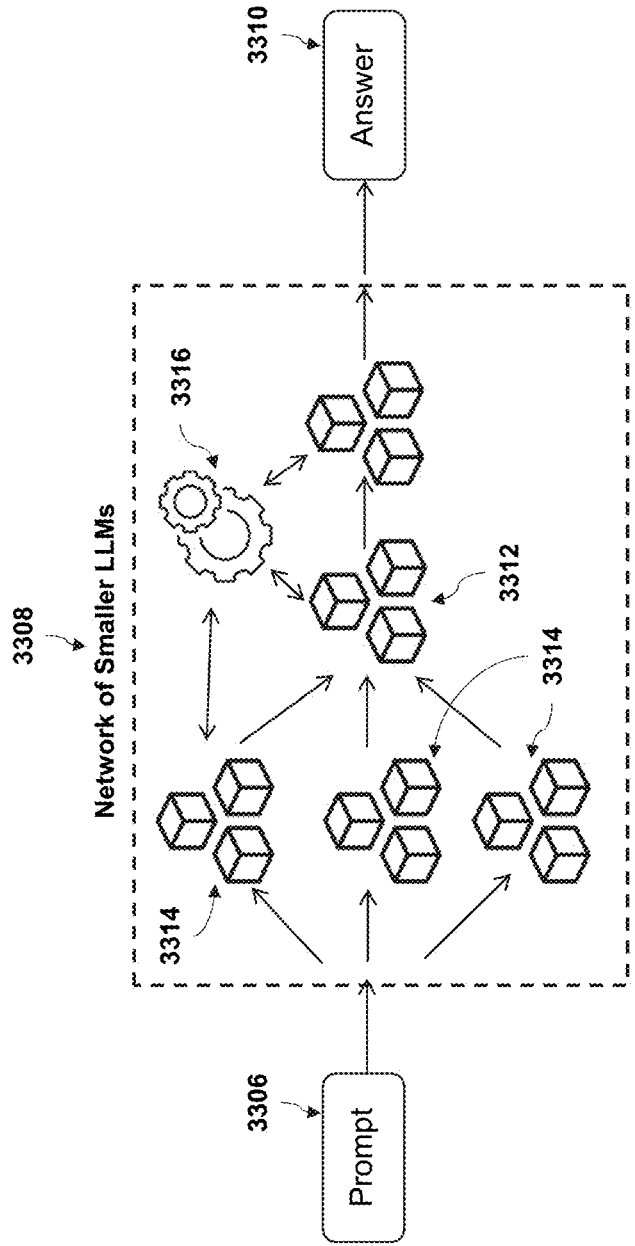
FIG. 35B is an illustration of using a network of LLMs, according to an embodiment of the invention.
Figure 36A:
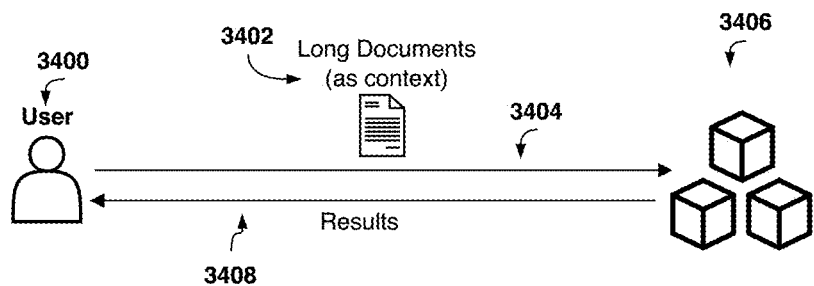
FIGS. 36A-C is a comparison of the current (36A) and proposed (36B, 36C) approaches of a long-document attention span enhancement through refinement (LASER) system and a scored context-optimized retrieval enhancement for retrieval augmented generation (SCORE-RAG) system according to an embodiment of the invention.
Figure 36B:
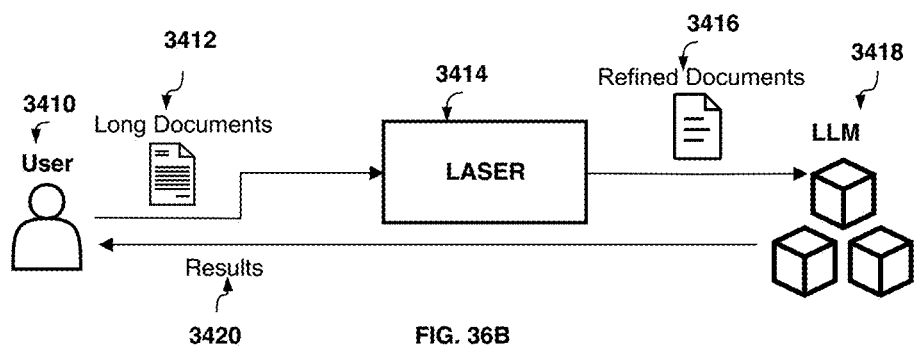
Figure 36C:
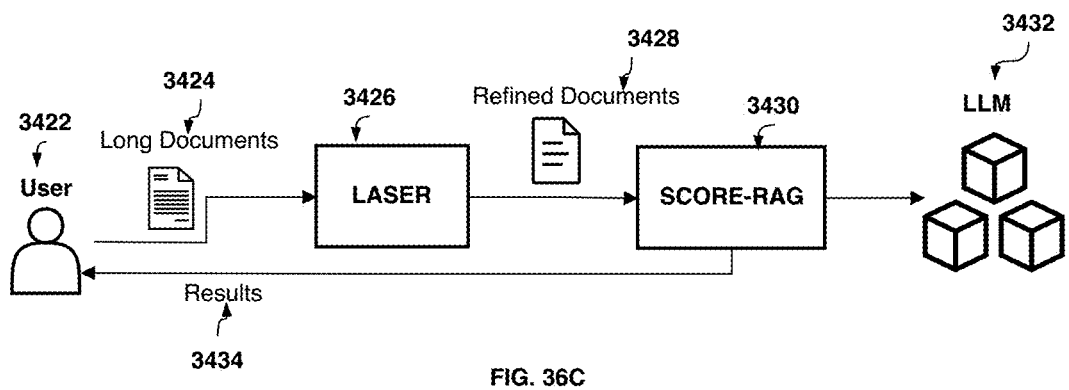
Figure 37:
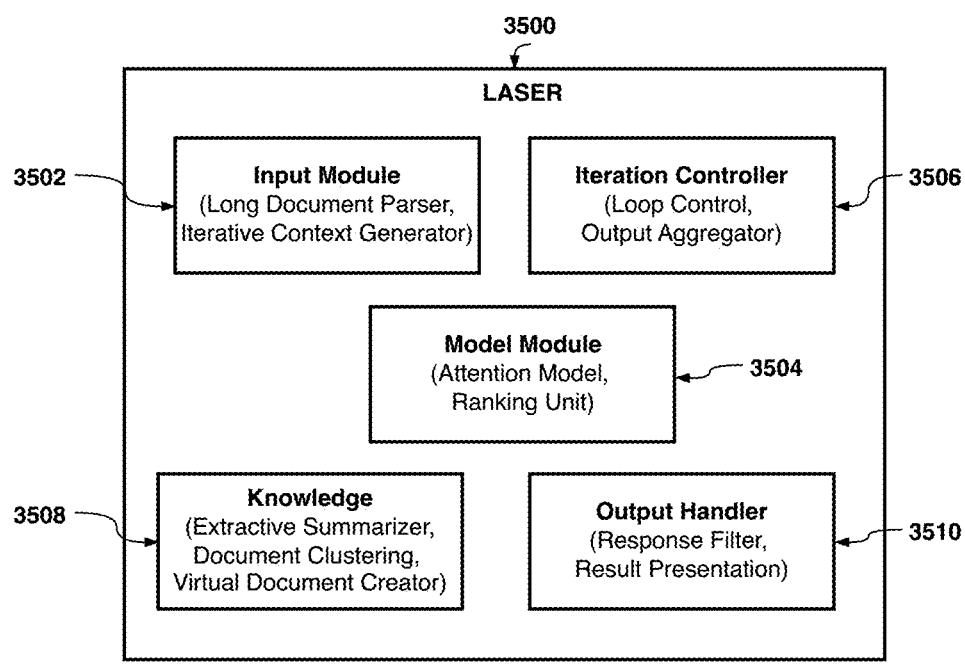
FIG. 37 is an illustration of the high-level architecture of a LASER system according to an embodiment of the invention.
Figure 38:
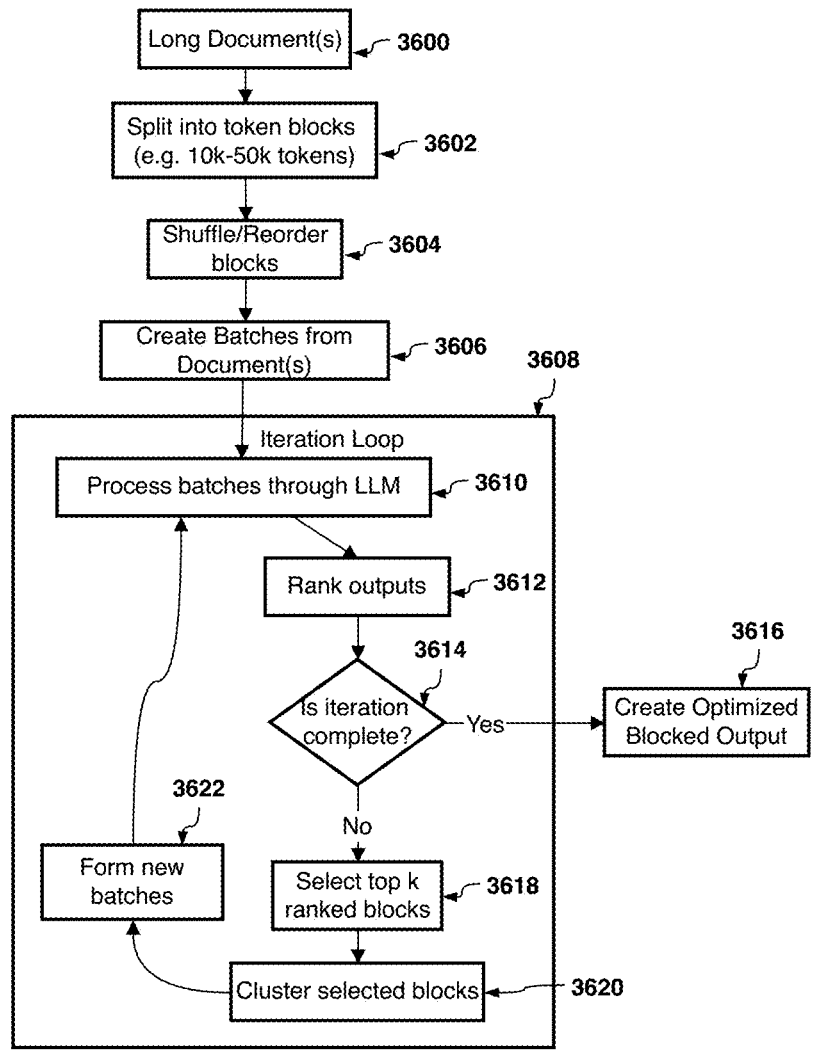
FIG. 38 is a flow chart illustrating a method performed by a LASER system by which long documents are processed and refined to enhance the attention span of LLMs according to an embodiment of the invention.
Figure 39:
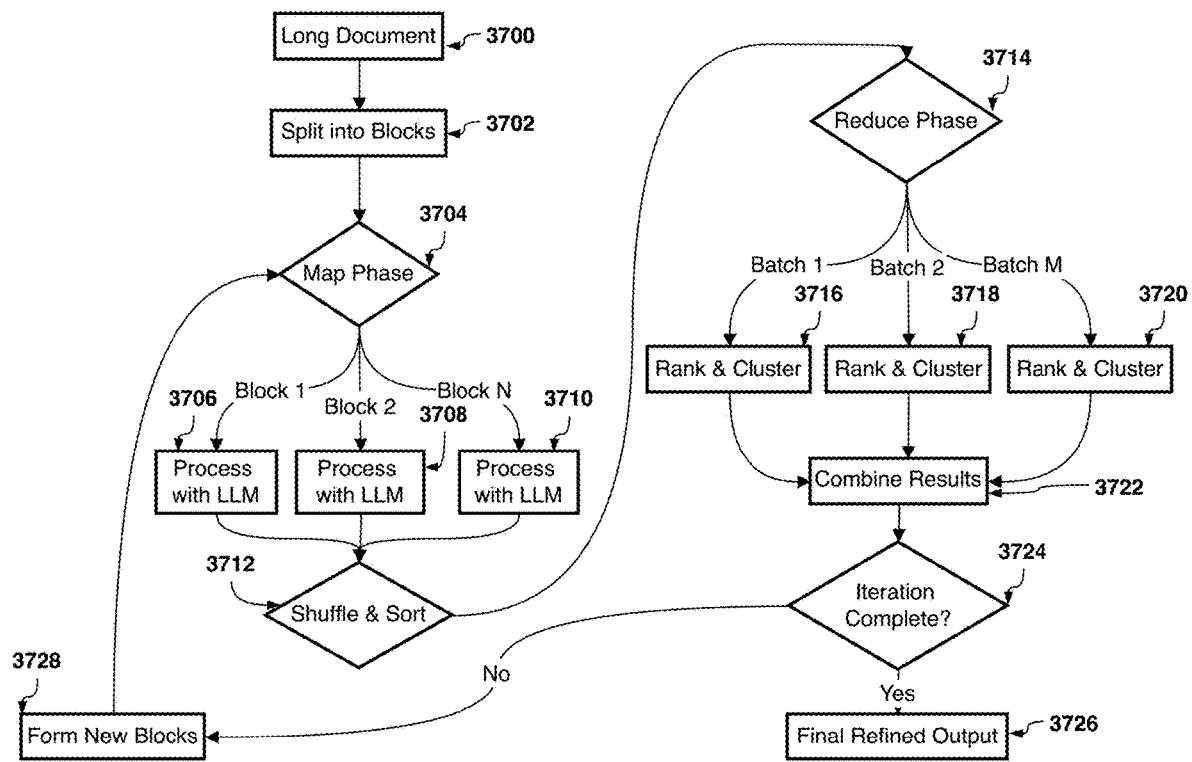
FIG. 39 is a flow chart illustrating a method of adapting a MapReduce model for the LASER system according to an embodiment of the invention.
Figure 40:
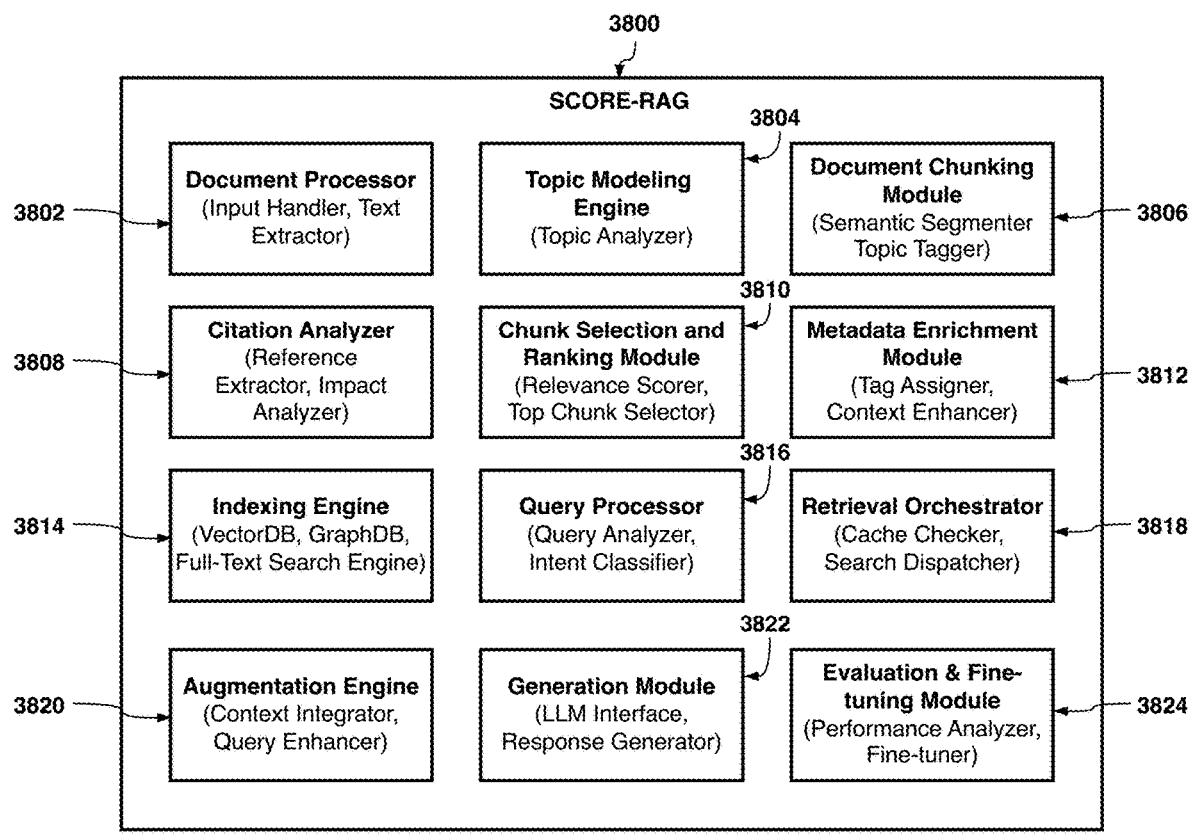
FIG. 40 is an illustration of the architecture of a SCORE-RAG system according to an embodiment of the invention.
Figure 41:
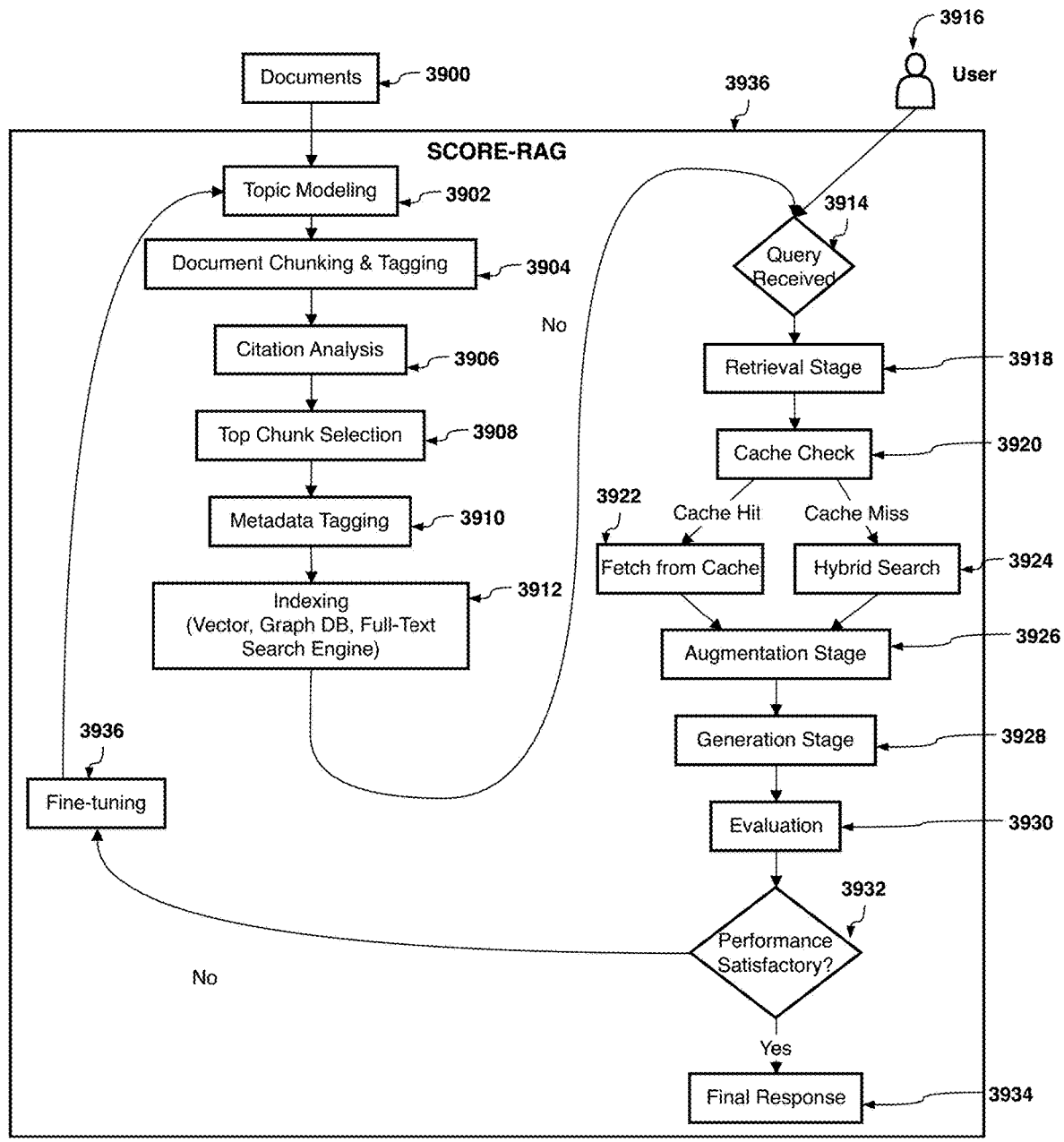
FIG. 41 is a flow chart illustrating a method of a SCORE-RAG system according to an embodiment of the invention.
Figure 42:
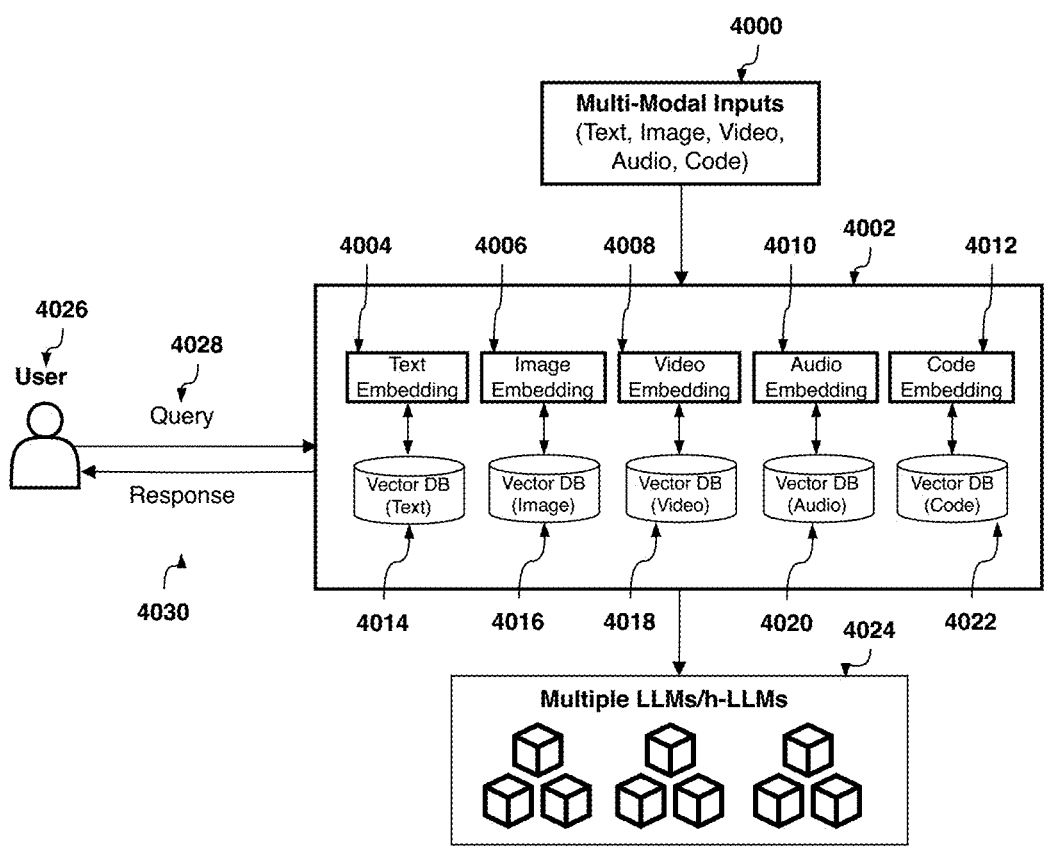
FIG. 42 is an illustration of an implementation of a SCORE-RAG system according to an embodiment of the invention for multi-modal RAG.
Figure 43:
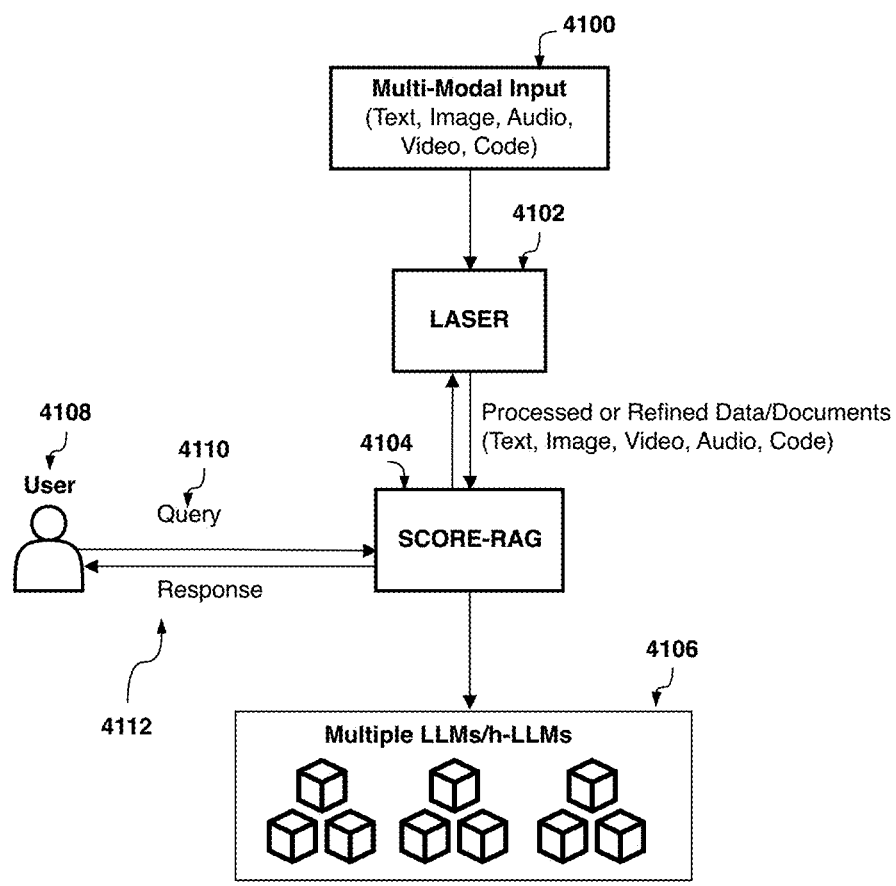
FIG. 43 is an illustration of an implementation of a LASER system and a SCORE-RAG system according to an embodiment of the invention for multi-modal RAG.
Figure 44:
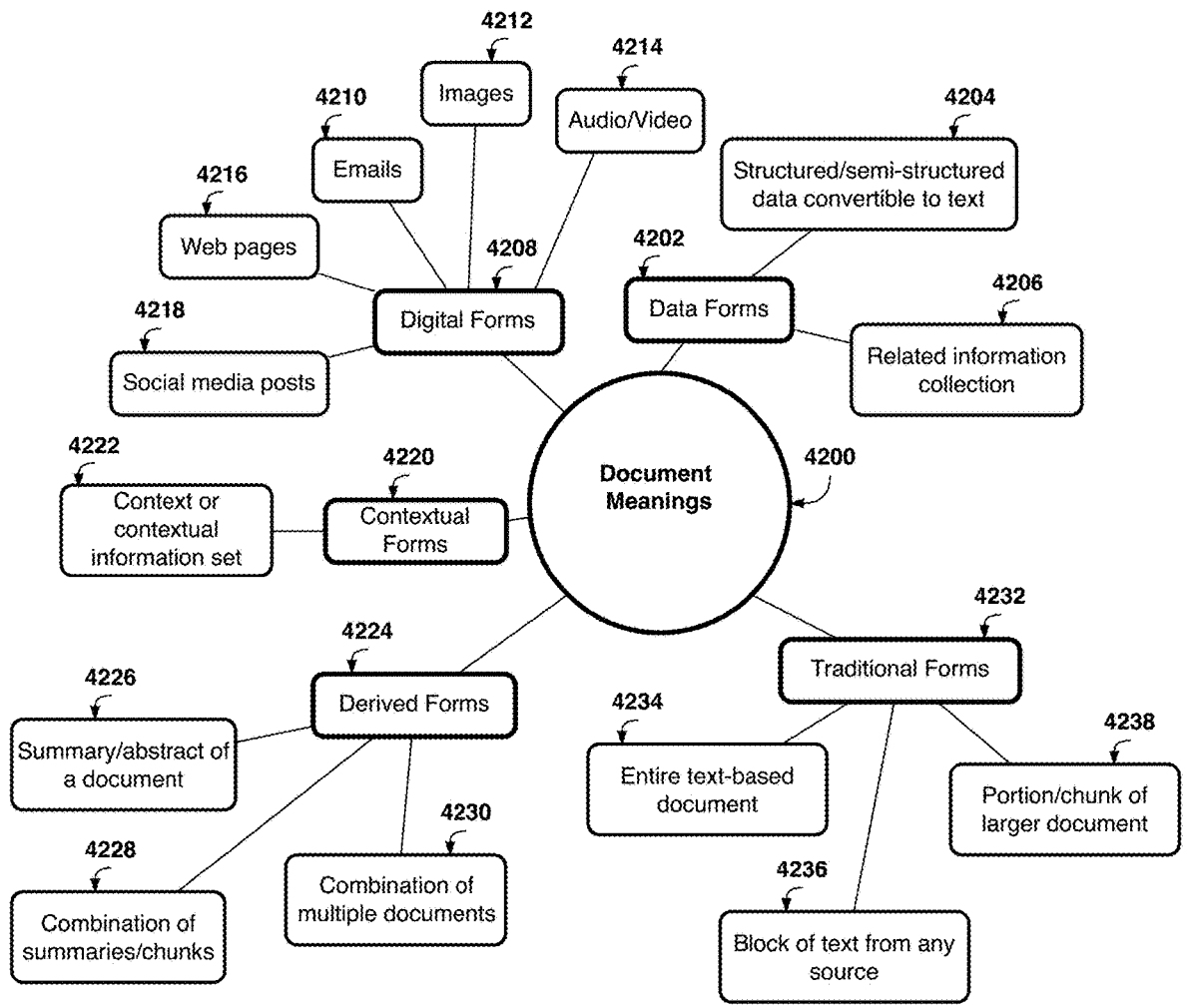
FIG. 44 is an illustration of different meanings of "document" in the context of the present invention.
Figure 45:
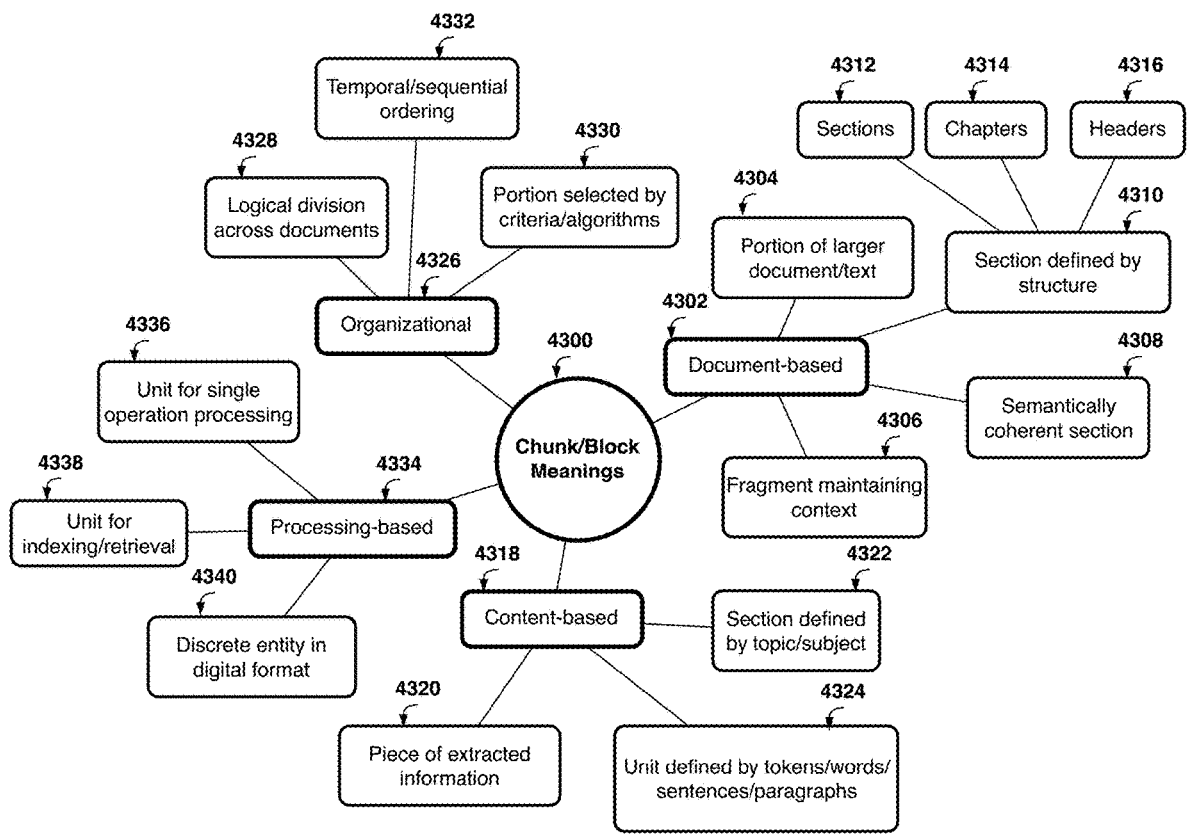
FIG. 45 is an illustration of different meanings of "chunk" and "block" in the context of the present invention.
Figure 46:
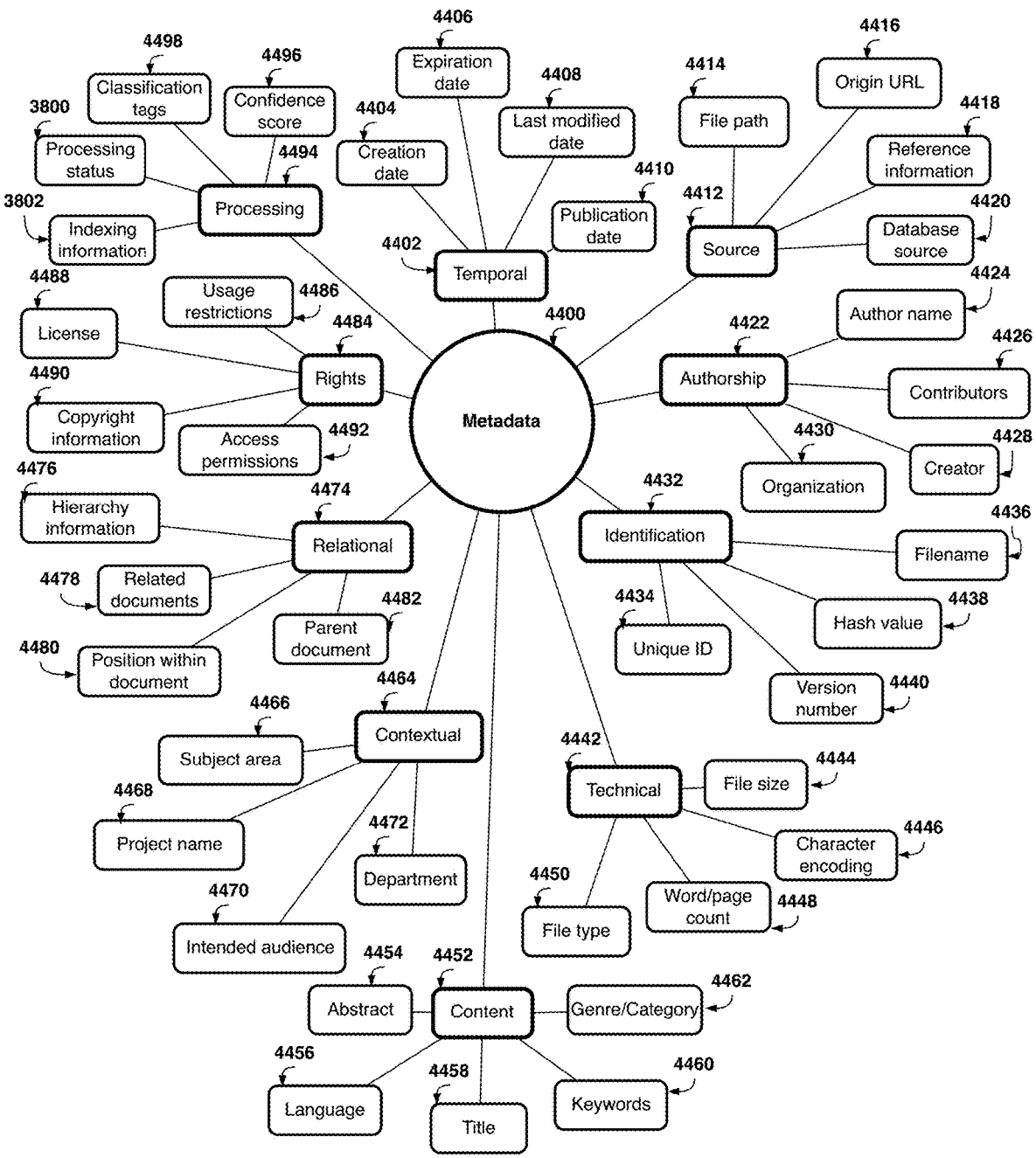
FIG. 46 is an illustration of different meanings of "metadata" in the context of the present invention.
Figure 47:
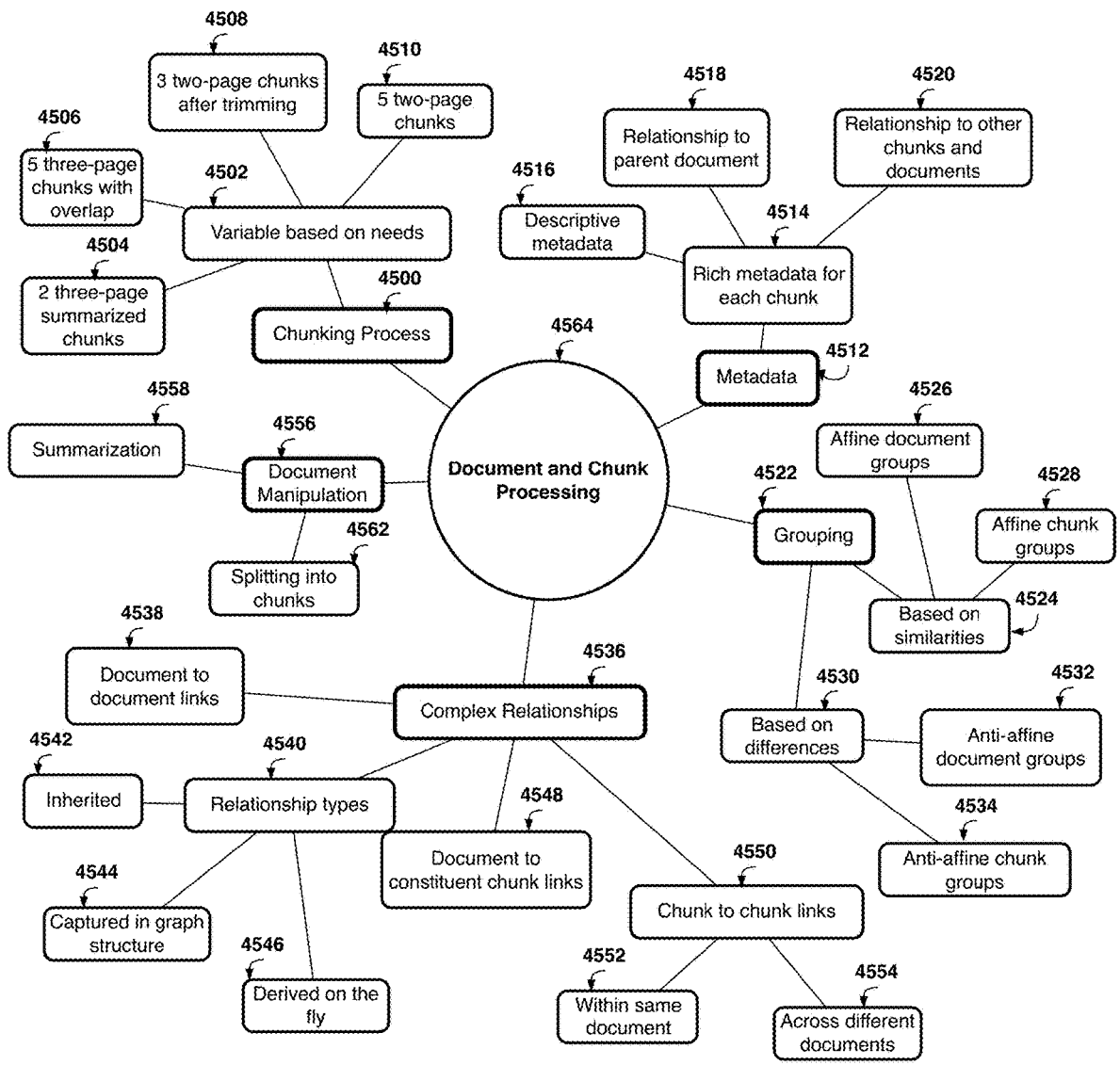
FIG. 47 is an illustration of different meanings of "document processing" or "chunk/block processing" in the context of the present invention.
Figure 48:
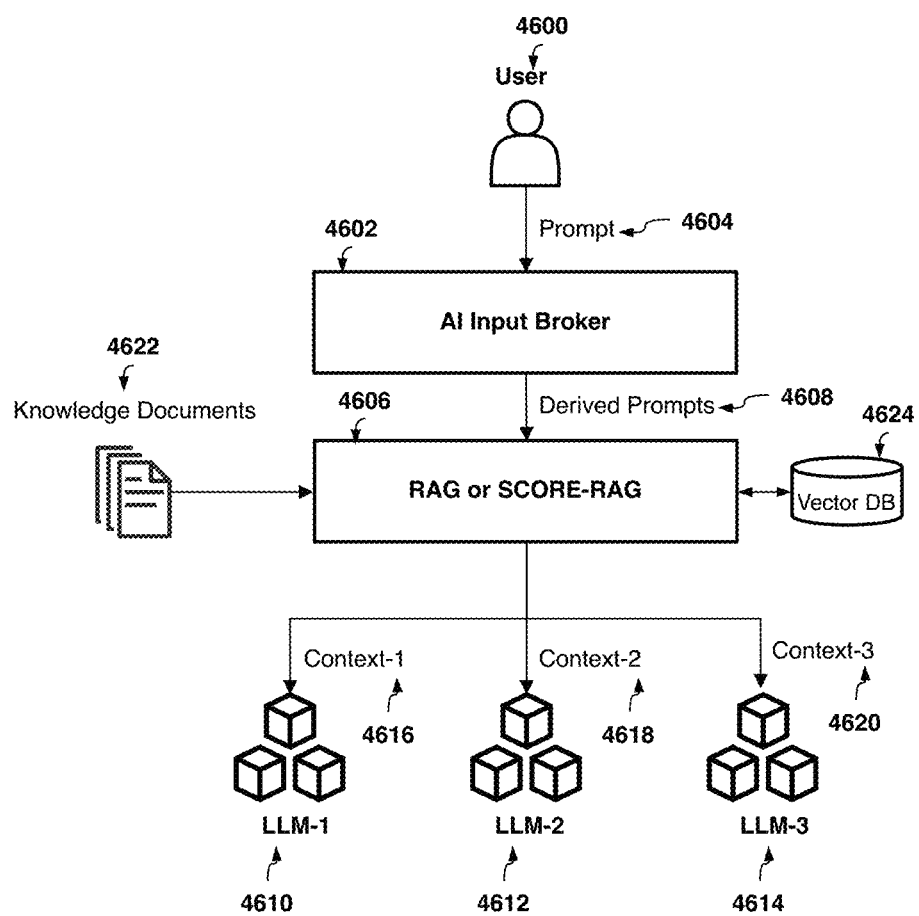
FIG. 48 is an illustration of an approach of generating derived prompts and using them with RAG or SCORE-RAG systems to generate improved results according to an embodiment of the invention.
Figure 49:
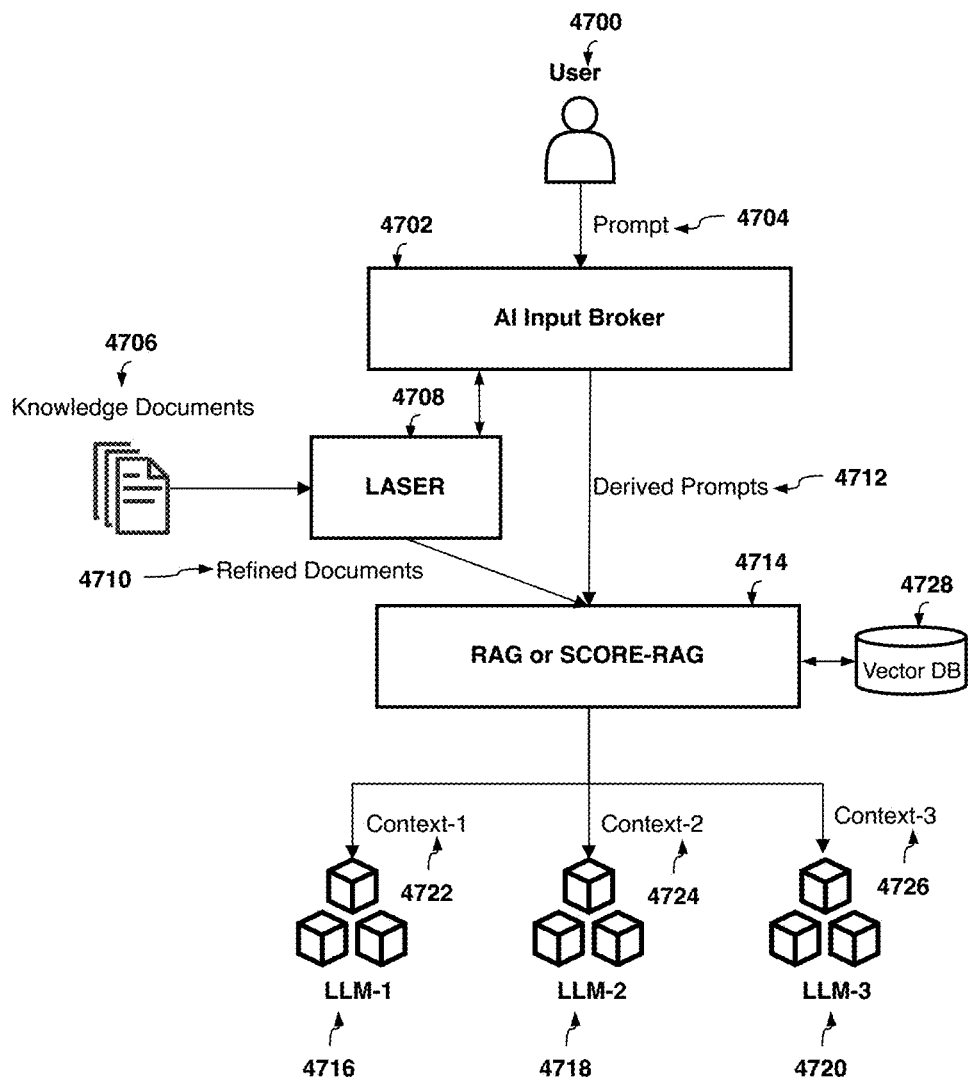
FIG. 49 is an illustration of an approach of generating derived prompts and using LASER and RAG or SCORE-RAG systems to generate improved results according to an embodiment of the invention.
Figure 50:
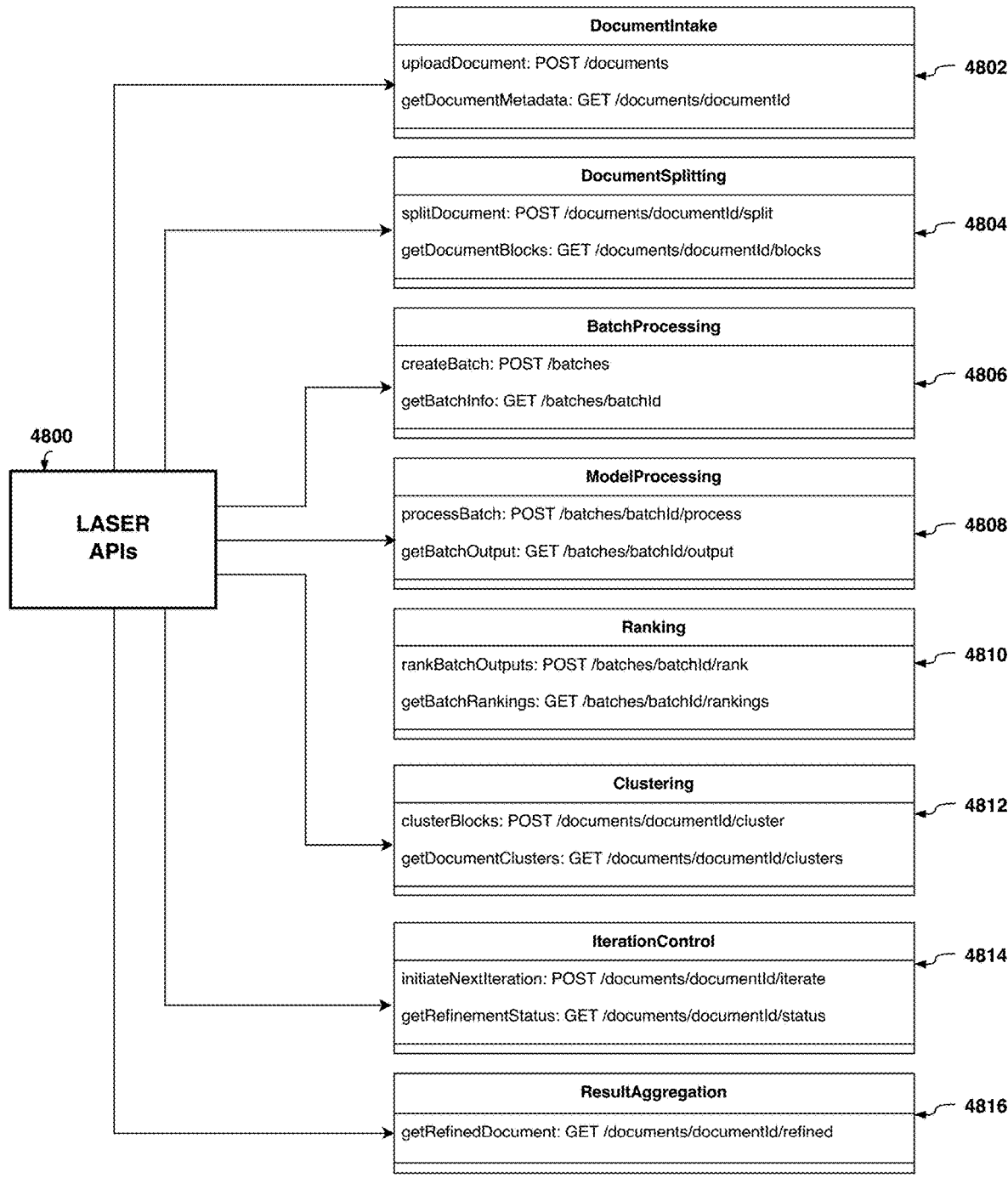
FIG. 50 is an illustration of an exemplary set of APIs of a LASER system according to an embodiment of the invention.
Figure 51:
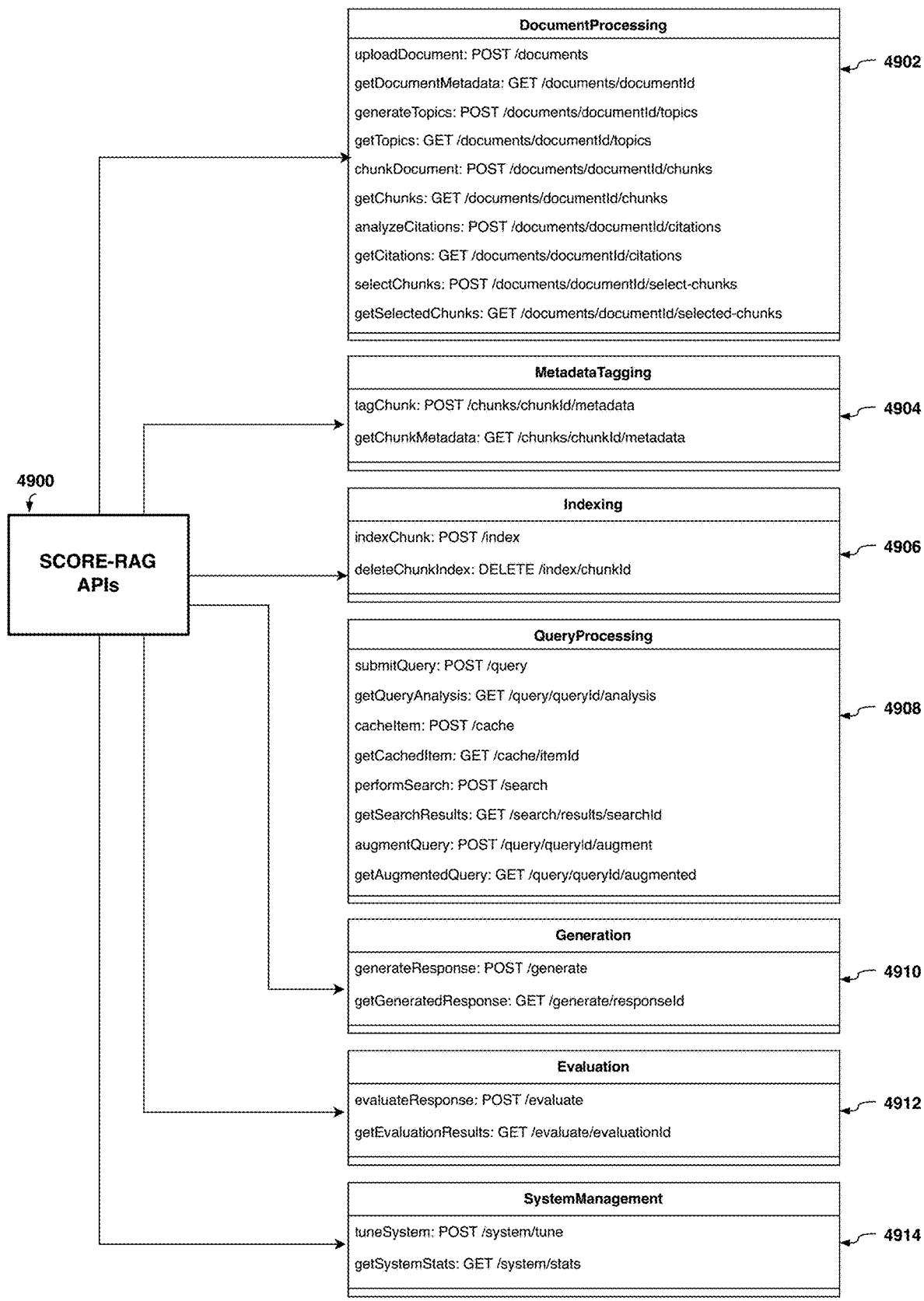
FIG. 51 is an illustration of an exemplary set of APIs of the SCORE-RAG system, according to an embodiment of the invention.
Figure 52:
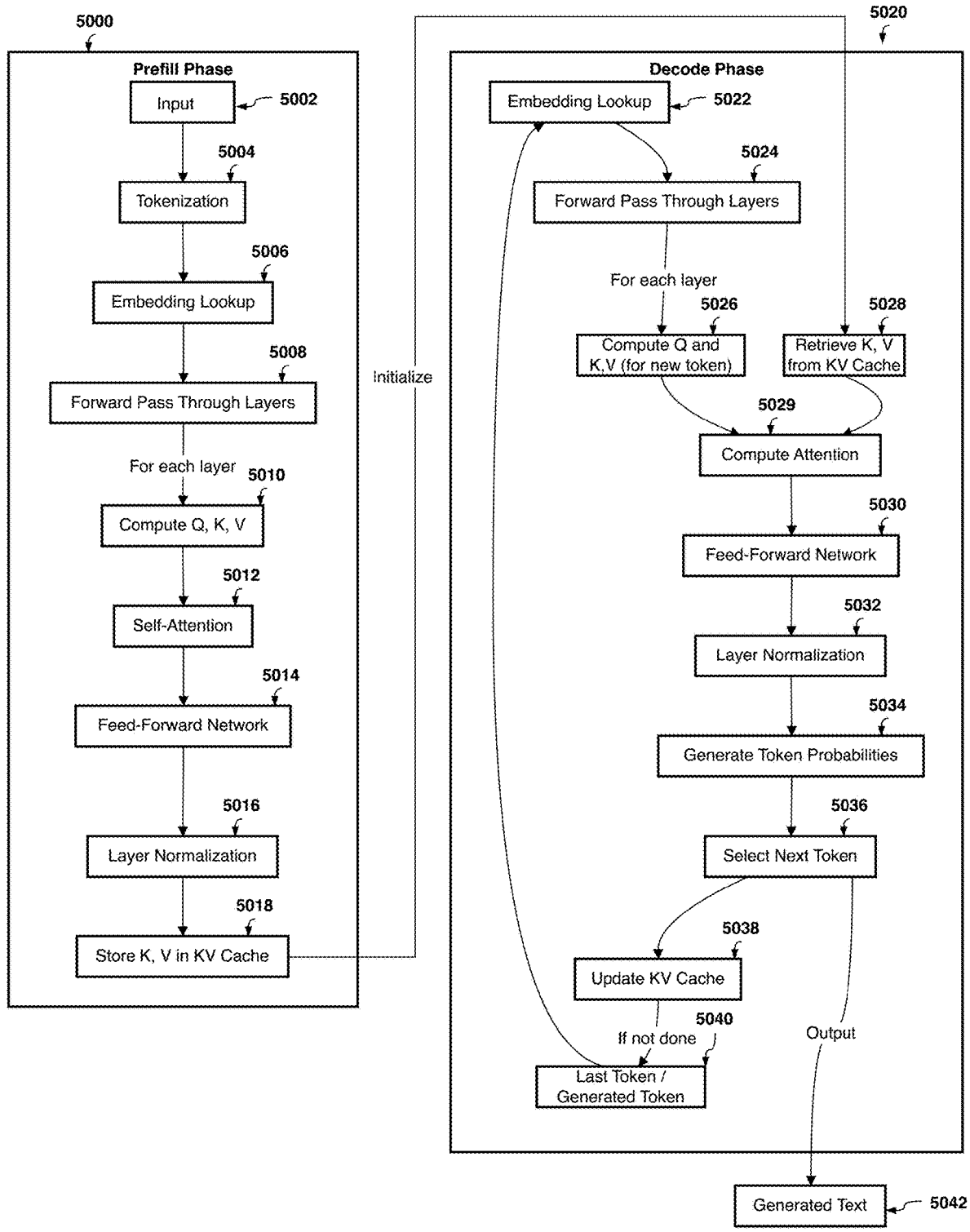
FIG. 52 is a flowchart illustrating methods of performing prefill and decode phases of an LLM inference process according to an embodiment of the invention.
Figure 53:
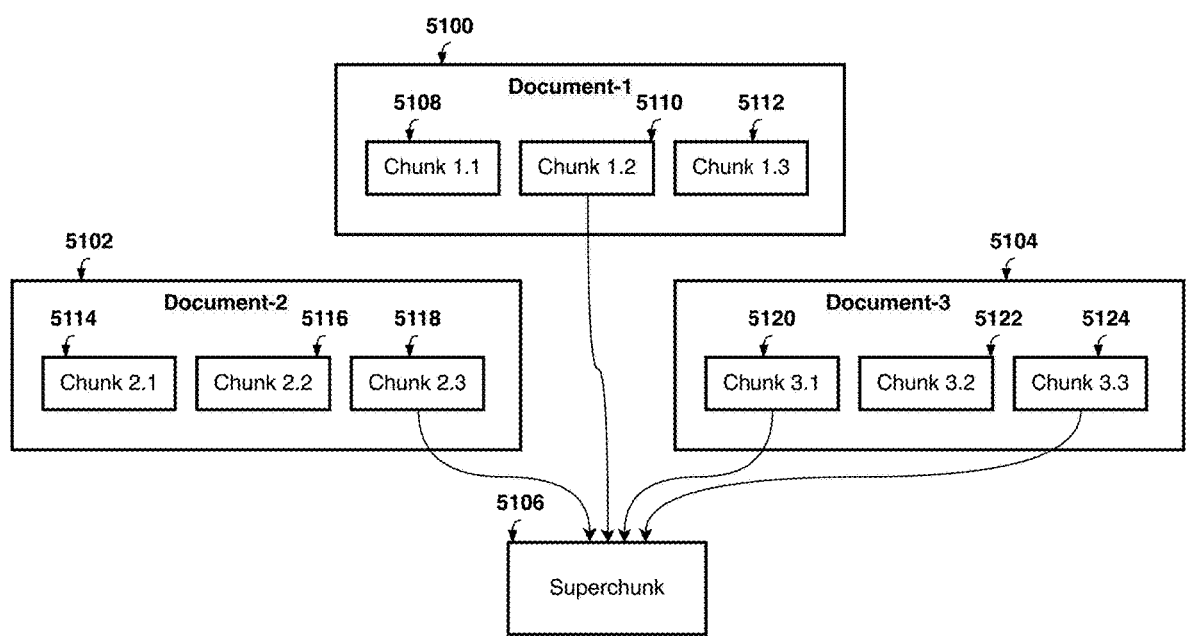
FIG. 53 is an illustration depicting the formation of a superchunk from several chunks from discrete documents according to an embodiment of the invention.
Figure 54:
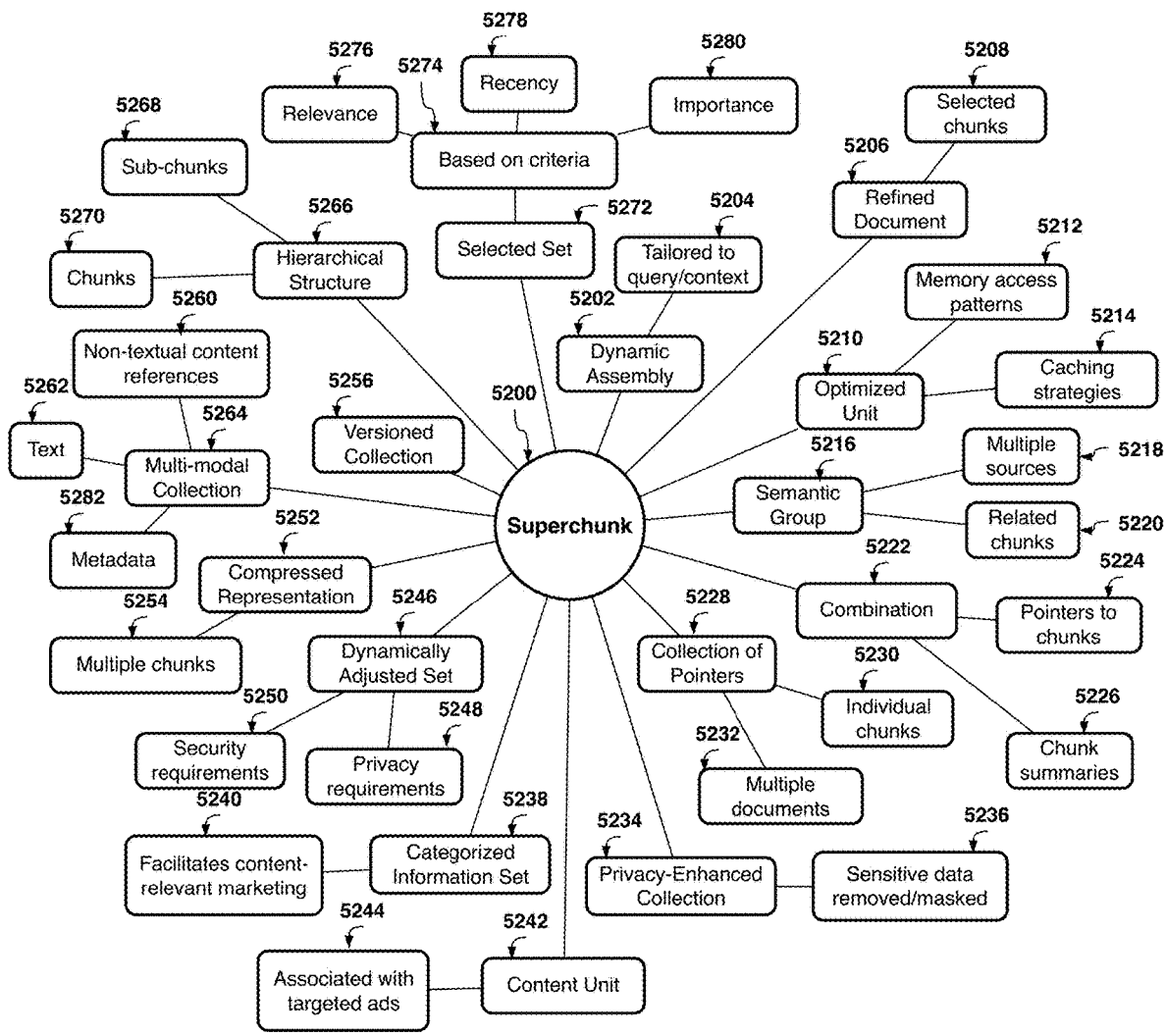
FIG. 54 is an illustration of different meanings of "superchunk" in the context of the present invention.
Figure 55:
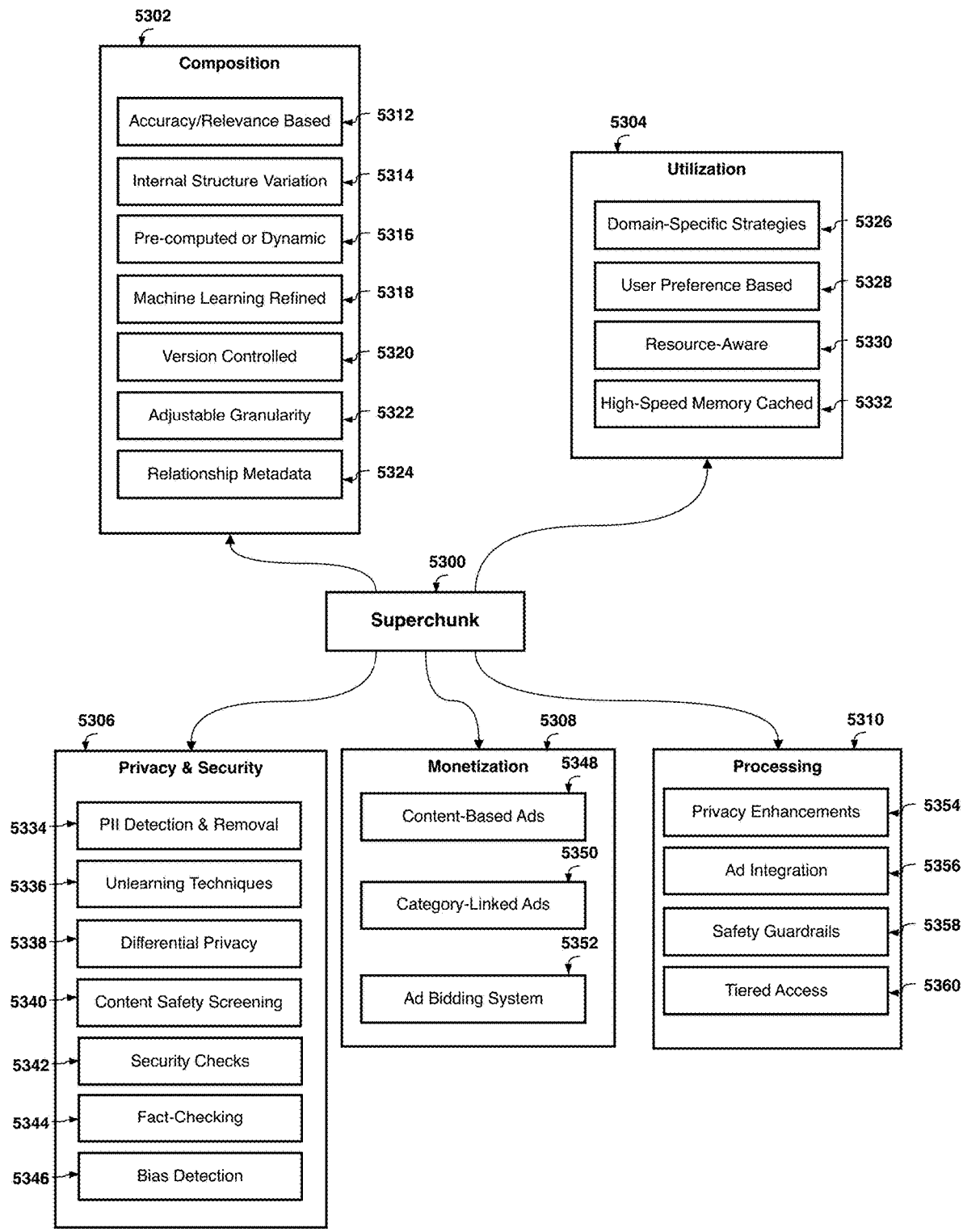
FIG. 55 is an illustration of characteristics of superchunks according to an embodiment of the invention.

The Language Adaptive AI Processing (LEAP) model described herein encompasses various implementations and configurations. The steps outlined in FIG. 30 may be executed in different orders, combined, or further subdivided based on specific applications or implementations. The acquisition, generation, or utilization of data, context, tools, or instructions may occur at any point within the LEAP processing pipeline, including but not limited to the initial stages, during agent task assignment, or as part of iterative processing loops. Context, as referenced in this specification, should be interpreted broadly to include, but not be limited to, data from databases, real-time data feeds, tools for data retrieval or manipulation, instructions for task execution, or any other information or resources that contribute to task comprehension and execution. The flexible nature of LEAP allows for dynamic adaptation of its processes based on the requirements of each unique task or query, and the specific implementation should not be limited to a fixed sequence of operations.

Figure 66:
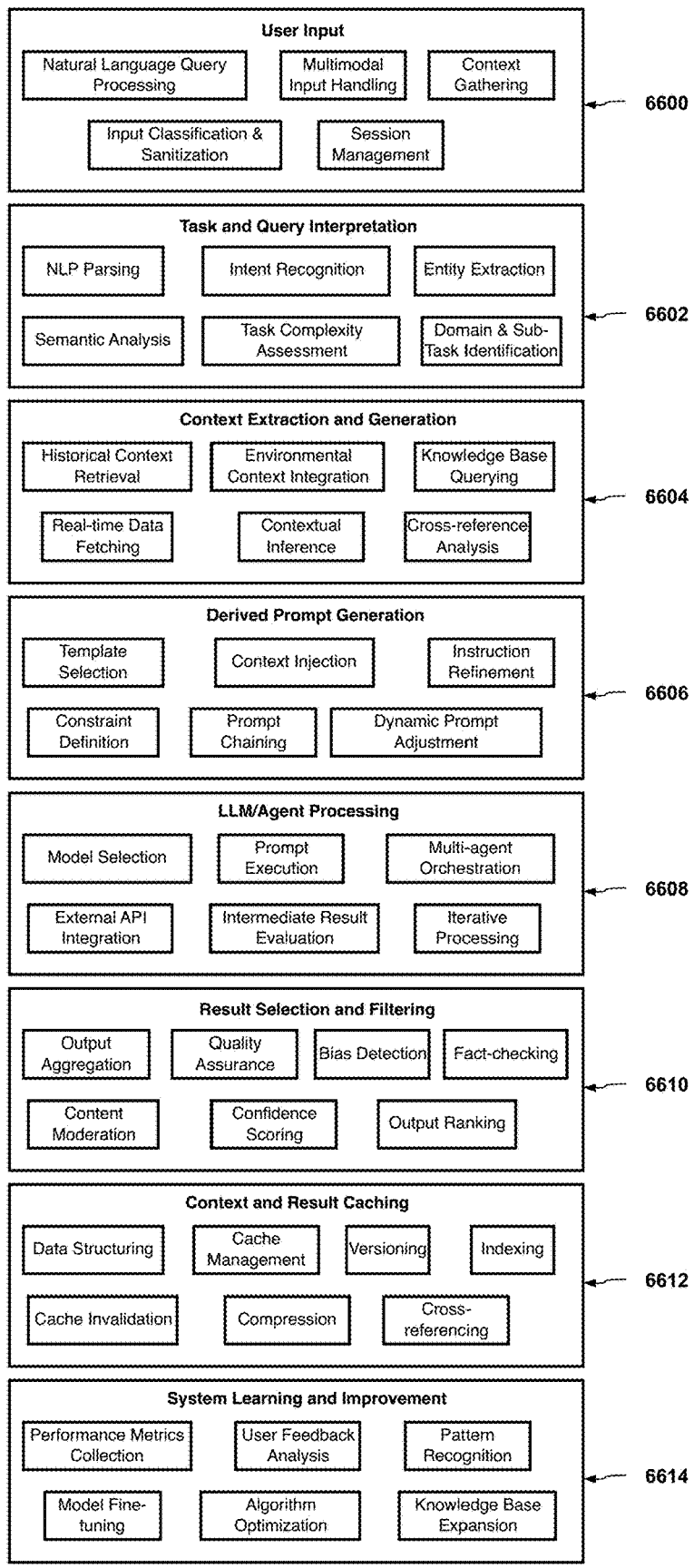
FIG. 66 is an illustration of the tasks/processes involved at each step of the LEAP model, according to an embodiment of the invention.

Referring now to FIG. 66, an illustration of the tasks/processes involved at each step of the LEAP model, is described in more detail. The list of tasks/processed for each step of the LEAP model includes:
1. User Input 6600:
   a) Natural Language Query Processing: Accept and parse user input in natural language form;
   b) Multimodal Input Handling: Process various input types (text, voice, images, video);
   c) Context Gathering: Collect relevant contextual information from user history, environment, or explicit user input;
   d) Input Classification & Sanitization: Categorize the type of input or task for appropriate routing. Clean and standardize input to prevent errors or security issues; and
   e) Session Management: Verify user identity and permissions if required. Maintain user session data for continuity in multi-session interactions.
2. Task and Query Interpretation 6602:
   a) NLP Parsing: Break down the input into analyzable components (tokens, phrases, sentences);
   b) Intent Recognition: Identify the user's primary goal or intent behind the query or task;
   c) Entity Extraction: Identify and categorize key entities, concepts, and parameters in the input;
   d) Semantic Analysis: Understand the meaning, relationships, and implications in the input;
   e) Task Complexity Assessment: Evaluate the complexity and scope of the requested task; and
   f) Domain & Subtask Identification: Determine the relevant domain(s) for the task or query; break down complex queries into component subtasks if necessary;
3. Context Extraction and Generation 6604:
   a) Historical Context Retrieval: Access and incorporate relevant past interactions or tasks;
   b) Environmental Context Integration: Incorporate time, location, device type, user profile, and other information;
   c) Knowledge Base Querying: Access relevant information from internal or external knowledge bases;

d) Real-time Data Fetching: Retrieve up-to-date information from APIs or databases as needed;
e) Contextual Inference: Generate additional context based on available information; integrations with external tools, APIs, data providers and brokers allows enhancing the context information; and
f) Cross-reference Analysis: Identify connections between the current task and related information;

4. Derived Prompt Generation 6606:
   a) Template Selection: Choose or create appropriate base prompts for the task;
   b) Context Injection: Integrate relevant context into the prompt structure;
   c) Instruction Refinement: Optimize instructions for clarity, specificity, and effectiveness;
   d) Constraint Definition: Set boundaries and limitations for the output in the prompt;
   e) Prompt Chaining: Create sequences of prompts for multi-step tasks; and
   f) Dynamic Prompt Adjustment: Modify prompts based on intermediate results or feedback;

5. LLM/Agent Processing 6608:
   a) Model Selection: Choose appropriate LLM(s), agent(s), and/or broker(s) for the task(s) or derived task(s);
   b) Prompt Execution: Submit derived prompts to the selected LLM(s), agent(s), and/or broker(s);
   c) Multi-agent Orchestration: Coordinate multiple AI agents for complex tasks;
   d) External API Integration: Interface with external services or tools as needed;
   e) Compute Resource Allocation: Manage and optimize computational resources;
   f) Intermediate Result Evaluation: Assess outputs at various stages of processing; and
   g) Iterative Processing: Conduct multiple rounds of processing if required;

6. Result Selection and Filtering 6610:
   a) Output Aggregation: Compile and organize results from various processing steps;
   b) Quality Assurance: Check output for accuracy, relevance, coherence, and safety;
   c) Bias Detection: Identify and mitigate potential biases in the output;
   d) Fact-checking: Verify factual claims against reliable sources;
   e) Content Moderation: Filter out inappropriate or harmful content;
   f) Confidence Scoring: Assign confidence levels to different parts of the output; and
   g) Output Ranking: Prioritize multiple results based on relevance and quality;

7. Context and Result Caching 6612:
   a) Data Structuring: Organize context and results in efficient data structures;
   b) Cache Management: Implement and maintain caching mechanisms for quick retrieval;
   c) Versioning: Track different versions of context and results over time;
   d) Indexing: Create indexes for fast searching and retrieval of cached data;
   e) Cache Invalidation: Determine when cached data should be updated or removed;
   f) Compression: Optimize storage of cached data to save space; and
   g) Cross-referencing: Link related cached items for comprehensive retrieval;

8. System Learning and Improvement 6614:
   a) Performance Metrics Collection: Gather data on system performance and user satisfaction;
   b) User Feedback Analysis: Process and learn from explicit and implicit user feedback;
   c) Pattern Recognition: Identify recurring patterns in tasks, contexts, and results;
   d) Model Fine-tuning: Adjust language models based on accumulated data and feedback;
   e) Algorithm Optimization: Improve task interpretation and context extraction algorithms; and
   f) Knowledge Base Expansion: Update and expand internal knowledge bases with new information.

Additional tasks, such as advertisement generation based on elicitation of attitudes, behavior, contextual history of purchases or queries, and derivation of intentions of the user by the LLMs can be used to provide a context for monetization of these AI agents.

The tasks, processes, and steps described in herein for the Language Adaptive AI Processing (LEAP) model are provided as exemplary and non-limiting illustrations. It should be understood that these examples are not exhaustive, and additional tasks or processes may be implemented at each step of the LEAP model. The specific tasks performed, their ordering, and their implementation may vary depending on the particular embodiment, application, or use case of the LEAP model.

Furthermore, the ordering of the steps and tasks presented in this specification is not fixed and may be altered, combined, subdivided, or rearranged in different embodiments or variations of the LEAP model. Some steps or tasks may be performed concurrently, iteratively, or in a different sequence than presented here. Certain steps or tasks may be omitted in some implementations, while additional steps or tasks not explicitly mentioned may be incorporated in others. The flexibility of the LEAP model allows for dynamic adaptation to various contexts, requirements, and technological advancements. As such, the scope of this present invention is not limited to the specific examples, orderings, or implementations described, but encompasses all variations and modifications that fall within the domain of the LEAP model. Additional details regarding these features may be found in U.S. patent application Ser. No. 18/812,707 which is incorporated by reference hereinabove.

Figure 67:
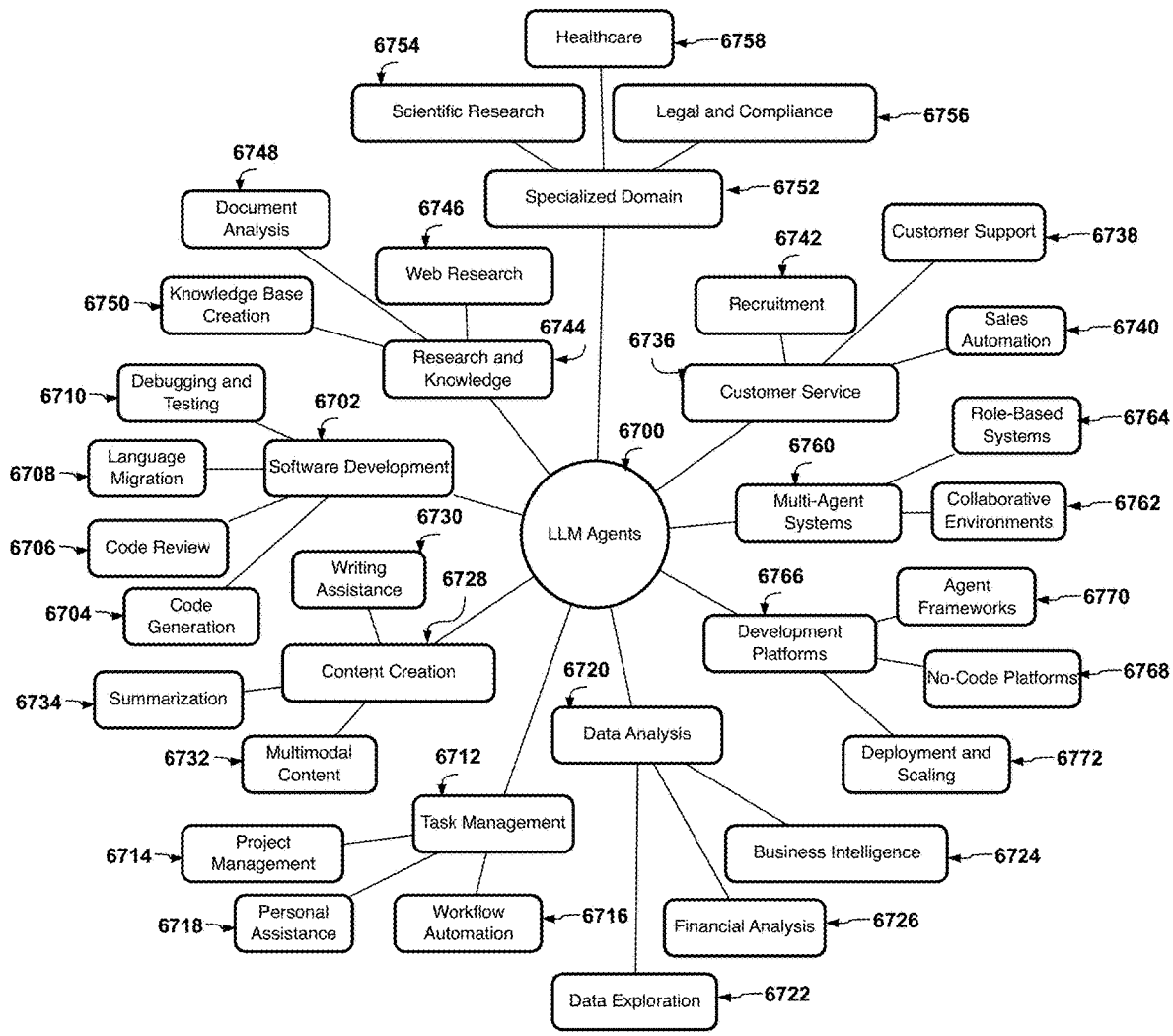
FIG. 67 is an illustration of types of LLM and AI Agents, and Agent Frameworks, according to an embodiment of the invention.

Referring now to FIG. 67, an illustration of types of LLM and AI Agents, and Agent Frameworks is described in more detail. LLM Agents are AI-powered systems that can perform a wide range of tasks autonomously or semi-autonomously. These agents leverage the capabilities of LLMs to understand and generate human-like text, enabling them to interact with users, process information, and complete various actions. The following categories describe different types of LLM Agents:

1. Software Development Agents 6702: These agents assist in various aspects of software development:
   a) Code Generation 6704: Agents that can generate entire codebases or specific functions based on natural language prompts;
   b) Code Review and Improvement 6706: Agents capable of reviewing code, suggesting improvements, and even creating pull requests;
   c) Language and Framework Migration 6708: Agents that can assist in migrating codebases between different programming languages or frameworks; and
   d) Debugging and Testing 6710: Agents designed to identify and fix bugs, as well as generate and run tests;

2. Task Management and Workflow Automation Agents 6712: These agents help organize and execute tasks:
   a) Project Management 6714: Agents that can manage and prioritize tasks within a project context;
   b) Workflow Automation 6716: Agents capable of automating complex workflows and business processes; and
   c) Personal Assistance 6718: Agents that can help with daily tasks, note-taking, and personal organization.
3. Data Analysis and Business Intelligence Agents 6720: These agents specialize in processing and analyzing data:
   a) Data Exploration 6722: Agents that can explore and analyze datasets, generate insights, and visualize results;
   b) Business Intelligence 6724: Agents capable of providing business insights and performing market analysis; and
   c) Financial Analysis 6726: Agents that can assist with financial modeling and analysis;
4. Content Creation and Management Agents 6728: These agents help create, edit, and manage various types of content:
   a) Writing Assistance 6730: Agents that can generate written content for various purposes, such as marketing or documentation;
   b) Multimodal Content Creation 6732: Agents capable of creating or manipulating images, audio, or video alongside text; and
   c) Content Summarization and Organization 6734: Agents that can summarize content and create quizzes or other derivative materials;
5. Customer Service and Sales Agents 6736: These agents interact with customers or assist with sales processes:
   a) Customer Support 6738: Agents that can handle customer inquiries, provide product information, and troubleshoot issues;
   b) Sales Automation 6740: Agents capable of assisting with lead generation, follow-ups, and sales processes; and
   c) Recruitment 6742: Agents that can assist with various aspects of the recruiting process;
6. Research and Knowledge Management Agents 6744: These agents help gather, organize, and synthesize information:
   a) Web Research 6746: Agents capable of searching the internet for information on specific topics;
   b) Document Analysis 6748: Agents that can analyze and extract information from large document collections; and
   c) Knowledge Base Creation 6750: Agents that can help create and maintain knowledge bases or wikis for organizations;
7. Specialized Domain Agents 6752: These agents focus on specific industries or domains;
   a) Scientific Research 6754: Agents that specialize in domain-specific tasks and research, such as chemistry or biology;
   b) Legal and Compliance 6756: Agents that can assist with legal research, contract analysis, and compliance checks; and
   c) Healthcare 6758: Agents capable of helping with medical research, patient data analysis, and treatment recommendations;
8. Multi-Agent Systems 6760: These are frameworks or platforms that allow multiple agents to work together:
   a) Collaborative Environments 6762: Systems that enable multiple agents to interact and solve problems collectively; and
   b) Role-Based Systems 6764: Frameworks that allow for the creation of teams of agents with specific roles and responsibilities;
9. Development and Deployment Platforms 6766: These are tools and platforms for creating, managing, and deploying LLM Agents:
   a) No-Code Platforms 6768: Systems that allow users to create and deploy agents without programming knowledge;
   b) Agent Frameworks 6770: Tools that provide developers with frameworks for building custom agents; and
   c) Deployment and Scaling 6772: Platforms that help deploy and scale agent applications in production environments.

The above categorization and description of LLM and Generative AI Agents is provided for illustrative purposes only and is not intended to be exhaustive or limiting in nature. The present invention encompasses these described types of agents as well as other types of agents not explicitly mentioned herein. The categorization is exemplary, and it is understood that agents may fall into multiple categories, combine features from different categories, or represent entirely new categories not described below. The scope of the present invention includes any and all types of LLM and Generative AI Agents that utilize AI models to perform tasks autonomously or semi-autonomously.

Figure 68:
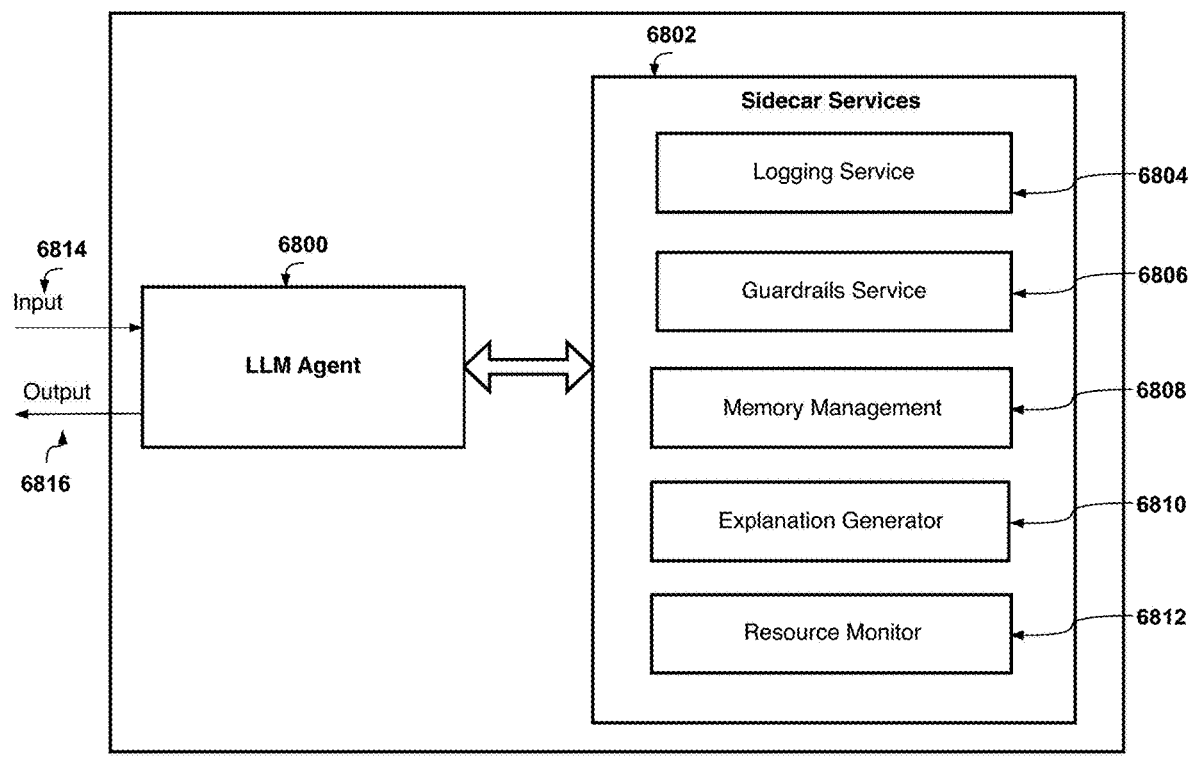
FIG. 68 is an illustration a sidecar pattern for agents, according to an embodiment of the invention.

Referring now to FIG. 68, an illustration of a sidecar pattern for agents according to an embodiment of the invention is described in more detail. The sidecar pattern provides a method for attaching auxiliary services to a main LLM agent without modifying its core logic. The main LLM agent 6800 is surrounded by multiple sidecar services 6802, including but not limited to a logging service 6804, a guardrails service 6806, a memory management service 6808, an explanation generator service 6810, and a resource monitor service 6812. The logging service 6804 tracks at least some and/or of interactions, decisions, and internal states of the agent, providing a comprehensive audit trail of the agent's operations. The guardrails service 6806 enforces ethical constraints and safety measures on the agent's actions, ensuring that the agent operates within predefined boundaries. The memory management service 6808 handles short-term and long-term memory storage and retrieval for the agent, enabling more consistent and context-aware responses over extended interactions. The explanation generator service 6810 provides human-readable explanations for the agent's decisions, enhancing transparency and interpretability of the agent's actions. The resource monitor 6812 tracks and optimizes resource usage, including API calls and compute resources, ensuring efficient operation of the agent. External input 6814 flows into the LLM agent, and external output 6816 flows out, with all sidecar services 6802 potentially influencing or monitoring this flow. The sidecar services 6802 may operate in its own container within a pod that it shares with an agent or broker's container.

Figure 69:
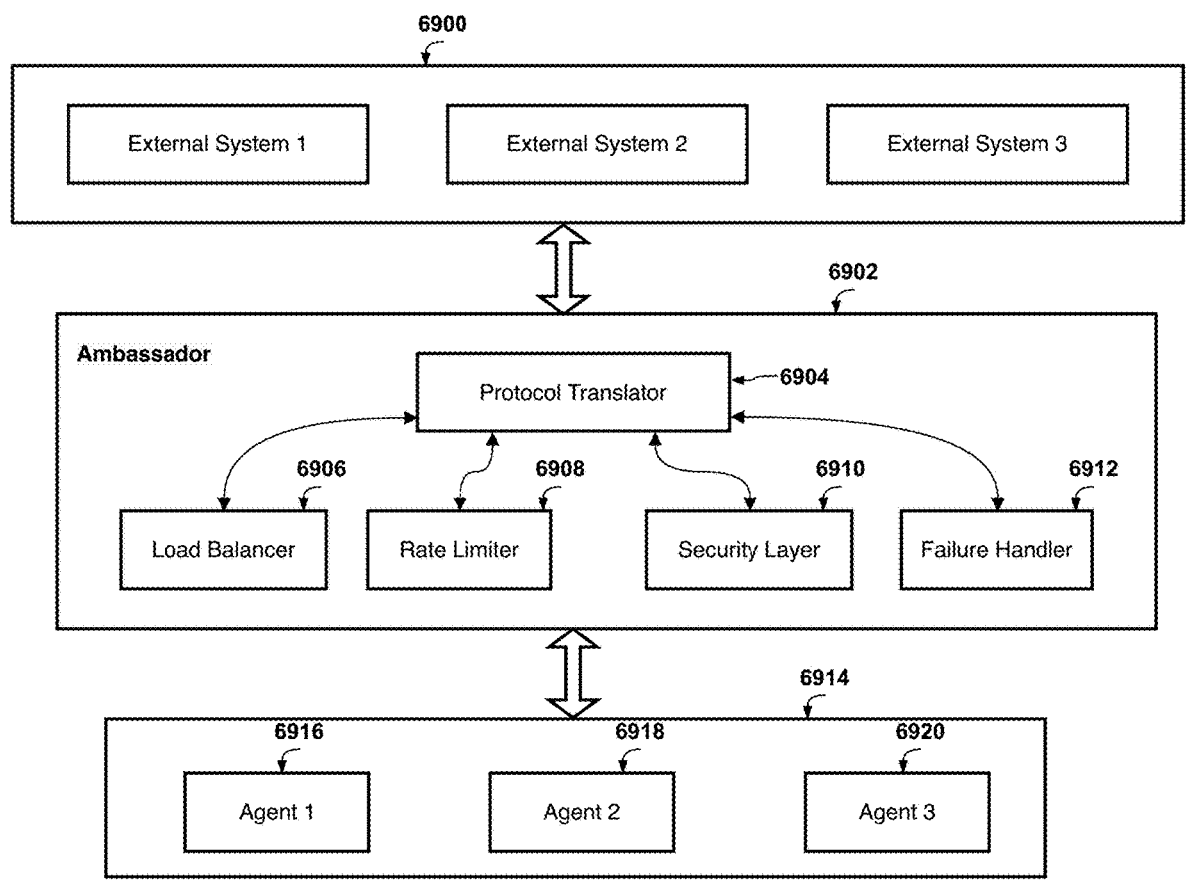
FIG. 69 is an illustration of an ambassador pattern for agent communication, according to an embodiment of the invention.

Referring now to FIG. 69, an illustration of an ambassador pattern for agent communication according to an embodiment of the invention is described in more detail. The ambassador pattern provides a method for managing communication between agents and external systems. An ambassador component 6902 acts as an intermediary between external systems 6900 and an agent cluster 6914. The ambassador pattern comprises a protocol translator 6904, which handles the conversion of various communication protocols between external systems and agents. Connected to the protocol translator 6904 are four services: a load balancer 6906, a rate limiter 6908, a security layer 6910, and a failure handler 6912. The load balancer 6906 distributes incoming requests across multiple agents in the cluster, ensuring efficient utilization of resources. The rate limiter 6908 prevents overwhelming of individual agents or external services by controlling the rate of requests. The security layer 6910 implements authentication and authorization mechanisms, ensuring secure communication between external systems and agents. The failure handler 6912 implements retry logic and fallback mechanisms for failed agent responses, enhancing the overall reliability of the system.

Figure 70:
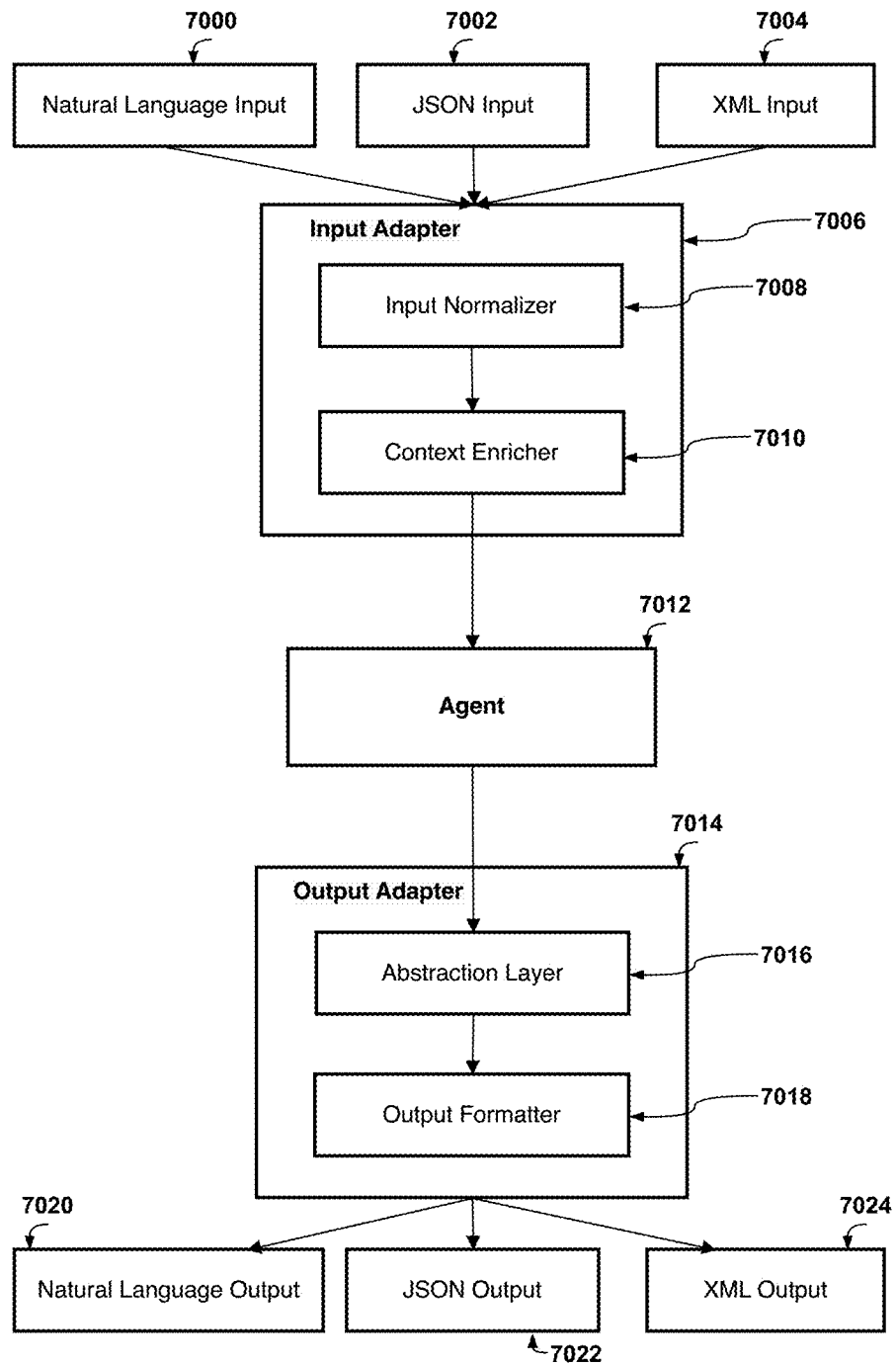
FIG. 70 is an illustration of an adapter pattern for input/output transformation, according to an embodiment of the invention.

Referring now to FIG. 70, an illustration of an adapter pattern for input/output transformation according to an embodiment of the invention is described in more detail. The adapter pattern provides a method for standardizing inputs to and outputs from an LLM Agent. The adapter pattern comprises an input adapter 7006, an output adapter 7014, and an agent 7012. The input adapter 7006 comprises, and in some embodiments consists of, an input normalizer 7008 and a context enricher 7010. The input normalizer 7008 standardizes various input formats 7000, 7002, 7004 (e.g., natural language, JavaScript Object Notation (JSON), and/or extensible markup language (XML)) into a consistent structure for the agent. The context enricher 7010 augments the normalized input with additional context before passing it to the agent. The output adapter 7014 comprises, and in some embodiments consists of, an abstraction layer 7016 and an output formatter 7018. The abstraction layer 7016 simplifies complex agent outputs and the output formatter 7018 transforms the abstracted output into required formats for external consumption, for example natural language output 7020, JSON output 7022, and/or XML output 7024. This arrangement facilitates the agent 7012 operating on a standardized input format and produce a standardized output, regardless of the varying requirements of different external systems.

The sidecar, ambassador, and adapter patterns described above offer several advantages for LLM agents and agentic applications:
1. Modularity: Each pattern allows for the addition or modification of functionality without altering the core agent logic.
2. Scalability: The patterns facilitate easy scaling of agent systems to handle increased load or complexity.
3. Maintainability: By separating concerns, these patterns make it easier to update, debug, and maintain different aspects of the agent system independently.
4. Flexibility: The patterns allow for easy adaptation to different use cases and integration with various external systems.
5. Reliability: Through features like load balancing and failure handling, these patterns enhance the overall reliability of agent systems.

Throughout the application, reference may be made to various computer hardware, including servers, GPUs, storage, cloud storage, and the like. It is contemplated and included within the scope of the invention that the systems described above and its various components may be software executed on computer devices, including servers, personal computers, smartphone devices, and the like, each comprising a processor configured to execute commands received from software (such as microprocessors, field-programmable gate arrays, integrated circuits, and the like), a non-transitory computer-readable storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method executable by a server for large language model (LLM) agent failure detection of an LLM system comprising one or more LLMs and one or more agents interacting with the one or more LLMs comprising:
   listening for an agent heartbeat signal from an agent of the one or more agents;

upon receiving the agent heartbeat signal from the agent, updating a most recent heartbeat timestamp for the agent;
upon a heartbeat threshold length of time elapsing without hearing receiving the agent heartbeat signal from the agent, designating the agent as a suspect agent;
probing the agent for a response;
upon receiving the response from the agent:
  removing the suspect agent designation from the agent; and
  updating the most recent heartbeat timestamp;
upon a response threshold length of time elapsing without receiving the response from the agent:
  designating the agent as a failed agent;
  sending a message to at least one of a service mesh or a message pool associated with the one or more agents regarding the agent being designated a failed agent;
  receiving a requirement comprising at least one of an application to be executed by the agent or receiving a task to be performed by the agent;
  analyzing the requirement to determine whether the requirement requires a replacement with a lesser degree of similarity or requires a replacement with a greater degree of similarity;
  activating a shadow agent associated with the agent responsive to analyzing the requirement, comprising upon determining the requirement requires a replacement with a greater degree of similarity:
    removing the agent from the at least one of the service mesh or messaging pool between the one or more agents; and
    launching a shadow agent configured to have a greater degree of similarity to the agent relative to a replacement with a lesser degree of similarity;
    integrating the shadow agent into the at least one of the service mesh or messaging pool between the one or more agents; and
    restoring a known good state of the agent to the shadow agent, comprising:
      retrieving the known good state of the agent from a checkpoint storage;
      applying the known good state to the shadow agent;
      receiving an alert that the agent has failed from a watchdog process associated with the agent; and
    resuming operation of the LLM system with the shadow agent replacing the agent.

2. The method of claim 1, wherein the one or more agents is a plurality of agents.

3. The method of claim 1 further comprising, upon determining the requirement requires a replacement with a lesser degree of similarity relative to a replacement with a greater degree of similarity, launching a shadow agent operable to perform a similar function to the agent.

4. The method of claim 1 further comprising, upon the heartbeat threshold length of time elapsing without receiving the response from the agent, performing one or more of:
reassigning one or more tasks assigned to the agent to another agent of the one or more agents;
allocating additional resources to one or more other agents of the one or more agents; and
spawning one or more new agents to supplement the one or more agents.

5. The method of claim 1 further comprising operating one or more auxiliary services operable to support the operation of at least one agent of the one or more agents.

6. The method of claim 5 wherein the one or more auxiliary services comprises at least one of:
a logging service configured to track at least one of interactions, decisions, and internals states of the agent;
a guardrails service operable to enforce at least one of ethical constraints and safety measures on actions performed by the agent;
a memory management service operable to manage at least one of short-term memory storage and retrieval and long-term memory storage and retrieval for the agent;
an explanation generator service operable to generate human-readable explanations for decisions produced by the agent; and
a resource monitor service operable to at least one of track resource usage and optimize resource usage of the agent.

7. The method of claim 6, wherein the auxiliary services are carried out by a sidecar service within a service mesh.

8. A large language model (LLM) system having agent fault-tolerance comprising:
a non-transitory computer-readable medium having stored thereon software comprising code executed by a processor implementing a method for a large language model (LLM) agent failure detection of the LLM system comprising:
one or more LLMs;
a plurality of agents operable to interact with the one or more LLMs a communication module network operable to establish at least one of a message pool or a service mesh configured to facilitate communication between the agents comprised by the plurality of agents;
a failure detection algorithm comprising:
  listen for an agent heartbeat signal from an agent of the plurality of agents;
  upon receiving the agent heartbeat signal from the agent, update a most recent heartbeat timestamp for the agent;
  upon a heartbeat threshold length of time elapsing without hearing receiving the agent heartbeat signal from the agent, designate the agent as a suspect agent;
  probe the agent for a response;
  upon receiving the response from the agent:
    remove the suspect agent designation from the agent; and
    update the most recent heartbeat timestamp;
  upon a response threshold length of time elapsing without receiving the response from the agent:
    designate the agent as a failed agent;
    send a message to the at least one of a message pool or a service mesh regarding the agent being designated a failed agent;
    receive a requirement comprising at least one of an application to be executed by the agent or receiving a task to be performed by the agent;
    analyze the requirement to determine whether the requirement requires a replacement with a lesser degree of similarity or requires a replacement with a greater degree of similarity:
    activate a shadow agent associated with the agent responsive to analyzing the requirement, comprising upon determining the requirement requires a replacement with a greater degree of similarity:
    removing the agent from the at least one of the service mesh or messaging pool between the one or more agents; and
    launching a shadow agent configured to have a greater degree of similarity to the agent relative to a replacement with a lesser degree of similarity:
        integrating the shadow agent into the at least one of the service mesh or messaging pool between the one or more agents; and
        restoring a known good state of the agent to the shadow agent, comprising:
            retrieving the known good state of the agent from a checkpoint storage;
            applying the known good state to the shadow agent;
            receiving an alert that the agent has failed from a watchdog process associated with the agent; and
        resume operation of the LLM system with the shadow agent replacing the agent; and
    a communication device positioned in electronic communication with the processor and operable to send and receive electronic communication.

9. The system of claim 8 wherein the failure detection algorithm is further configured to, upon determining the requirement requires a replacement with a lesser degree of similarity relative to a replacement with a greater degree of similarity, launch a shadow agent operable to perform a similar function to the agent.

10. The system of claim 8 wherein the failure detection algorithm is further configured to, upon the heartbeat threshold length of time elapsing without receiving the response from the agent, perform one or more of:
    reassign one or more tasks assigned to the agent to another agent of the plurality of agents;
    allocate additional resources to one or more other agents of the plurality of agents; and
    spawn one or more new agents to supplement the plurality of agents.

11. The system of claim 8 wherein the plurality of agents is configured to send an agent state to a checkpoint storage via the at least one of the message pool or the service mesh.

12. The system of claim 8 wherein the communication network is operable to maintain a backup of messages received by the at least one of the message pool or the service mesh.

13. The system of claim 8 wherein the communication network comprises an integrity checking network operable to maintain the integrity of messages received by the at least one of the message pool or the service mesh.

14. The system of claim 8 wherein the software further comprises code that is executable for at least one of:
    a logging service operable to track at least one of interactions, decisions, and internals states of the agent;
    a guardrails service operable to enforce at least one of ethical constraints and safety measures on actions performed by the agent;
    a memory management service operable to manage at least one of short-term memory storage and retrieval and long-term memory storage and retrieval for the agent;
    an explanation generator service operable to generate human-readable explanations for decisions produced by the agent; and
    a resource monitor service operable to at least one of track resource usage and optimize resource usage of the agent.

* * * * *

UNITED STATES PATENT AND TRADEMARK OFFICE
CERTIFICATE OF CORRECTION

| | | |
|---|---|---|
| PATENT NO. | : 12,475,151 B1 | Page 1 of 1 |
| APPLICATION NO. | : 18/921852 | |
| DATED | : November 18, 2025 | |
| INVENTOR(S) | : Vijay Madisetti and Arshdeep Bahga | |

It is certified that error appears in the above-identified patent and that said Letters Patent is hereby corrected as shown below:

In the Claims

Claim 8, Column 34, Lines 31-32:
"a plurality of agents operable to interact with the one or more LLMs a communication module network operable ..."
Should state:
"a plurality of agents operable to interact with the one or more LLMs;
a communication network operable ..."

Signed and Sealed this
Twenty-third Day of December, 2025

John A. Squires
*Director of the United States Patent and Trademark Office*